US012199275B2

(12) United States Patent
Feng et al.

(10) Patent No.: US 12,199,275 B2
(45) Date of Patent: Jan. 14, 2025

(54) CATHODE ACTIVE MATERIAL COMPOSITION, CATHODE PLATE, SECONDARY BATTERY, BATTERY MODULE, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Lingyun Feng, Ningde (CN); Yanhuang Fan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/629,954

(22) Filed: Apr. 9, 2024

(65) Prior Publication Data
US 2024/0347707 A1   Oct. 17, 2024

Related U.S. Application Data

(63) Continuation of application No. PCT/CN2022/084887, filed on Apr. 1, 2022.

(51) Int. Cl.
*H01M 4/36* (2006.01)
*H01M 4/58* (2010.01)
(Continued)

(52) U.S. Cl.
CPC ......... *H01M 4/366* (2013.01); *H01M 4/5825* (2013.01); *H01M 4/583* (2013.01);
(Continued)

(58) Field of Classification Search
None
See application file for complete search history.

(56) References Cited

U.S. PATENT DOCUMENTS

2008/0248396 A1* 10/2008 Jung ............... H01M 4/13
                                                        429/231.95
2020/0028174 A1*  1/2020 Ahn ............... H01M 10/0525

FOREIGN PATENT DOCUMENTS

CN     105355885 A     2/2016
CN     106058225 A    10/2016
(Continued)

OTHER PUBLICATIONS

International Search Report received in the corresponding international application PCT/CN2022/084887, mailed on Nov. 8, 2022.
(Continued)

*Primary Examiner* — Wyatt P McConnell
(74) *Attorney, Agent, or Firm* — Kilpatrick Townsend & Stockton LLP

(57) ABSTRACT

Provided are a cathode active material composition, a cathode plate, a secondary battery, a battery module, a battery pack, and an electric device. In particular, the present application provides a cathode active material composition, including a cathode active material and a dispersant. The cathode active material composition of the present application can improve the poor dispersion of the cathode active material powder and the high viscosity of the slurry during the preparation of the cathode slurry, and further improve flexibility of the cathode plate.

20 Claims, 4 Drawing Sheets

(51) Int. Cl.
     *H01M 4/583*     (2010.01)
     *H01M 4/62*      (2006.01)
     *H01M 10/0525*    (2010.01)
     *H01M 4/02*      (2006.01)

(52) U.S. Cl.
     CPC ....... *H01M 4/622* (2013.01); *H01M 10/0525* (2013.01); *H01M 2004/021* (2013.01); *H01M 2004/028* (2013.01)

(56) References Cited

FOREIGN PATENT DOCUMENTS

| | | |
|---|---|---|
| CN | 106816600 A | 6/2017 |
| CN | 109845005 A | 6/2019 |
| CN | 110431697 A | 11/2019 |
| WO | 2021121714 A1 | 6/2021 |

OTHER PUBLICATIONS

Written Opinion of ISA received in the corresponding international application PCT/CN2022/084887, mailed on Nov. 8, 2022.

\* cited by examiner

1) Surface tension of the sensing platinum plate is much greater than that of the liquid, so that the liquid can effectively wet the platinum plate and climb up on the plate;
2) The liquid forms an angled arc around the platinum plate;
3) Surface molecular forces act on and pull the platinum plate down.

CATHODE ACTIVE MATERIAL COMPOSITION, CATHODE PLATE, SECONDARY BATTERY, BATTERY MODULE, BATTERY PACK AND ELECTRIC DEVICE

CROSS REFERENCE TO RELATED MATTER

This application is a continuation of international application PCT/CN2022/084887, filed Apr. 1, 2022 and entitled "CATHODE ACTIVE MATERIAL COMPOSITION, CATHODE PLATE, SECONDARY BATTERY, BATTERY MODULE, BATTERY PACK AND ELECTRIC DEVICE", the entire content of which is hereby incorporated by reference in its entirety.

TECHNICAL FIELD

The present application relates to the field of battery technology, and in particular, to a cathode active material composition, a cathode plate, a secondary battery, a battery module, a battery pack, and an electric device.

BACKGROUND

Secondary batteries are widely used in different fields such as new energy vehicles and energy storage power plants because of their advantages of high energy density, long service life and energy saving and environmental protection. The cathode plate of a secondary battery mainly includes a current collector and an electrode film layer containing a cathode active material. The cathode active material can be formed into a cathode slurry together with a dispersion medium and coated on the current collector of the electrode to form the cathode plate.

The cathode active material is usually used in the form of powder. Due to the large specific surface area and small particles of the cathode material powder, it is difficult to disperse the powder during the preparation of cathode slurry, the slurry viscosity is high and the solid content is difficult to increase, which in turn leads to defects such as cracks, stripes, uneven weight, particle scratches or pinholes easily during the coating of the electrode plate.

SUMMARY

The present application is carried out in view of the above subject matter, and one of the objectives is to provide a composition including a cathode active material and a flexible dispersant to improve the poor dispersion of the cathode active material powder and the high viscosity of the slurry during the preparation of the cathode slurry.

To achieve the above objective, the present application provides a cathode active material composition, a cathode plate, a secondary battery, a battery module including the secondary battery, a battery pack including the battery module, and an electric device including the secondary battery, the battery module or the battery pack.

A first aspect of the present application provides a cathode active material composition including a cathode active material and a dispersant, where the cathode active material includes a core and a shell coating the core, the core has a chemical formula of $Li_{1+x}Mn_{1-y}A_yP_{1-z}R_zO_4$, where x is any value in a range of −0.100-0.100, y is any value in a range of 0.001-0.500, and z is any value in a range of 0.001-0.100; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally one element of B, Si, N, and S; the values of x, y, and z satisfy a condition that: the entire core is electrically neutral; and the shell includes a first coating layer coating the core, a second coating layer coating the first coating layer, and a third coating layer coating the second coating layer, where the first coating layer includes a crystalline pyrophosphate $MP_2O_7$ and/or $M_b(P_2O_7)_c$, where $0 \leq a \leq 2$, $1 \leq b \leq 4$, $1 \leq c \leq 6$, and values of a, b, and c satisfy a condition that the crystalline pyrophosphate $MP_2O_7$ or $M_b(P_2O_7)_c$ is kept electrically neutral; the M in the crystalline pyrophosphate $MP_2O_7$ and $M_b(P_2O_7)_c$ is respectively independently one or more elements selected from Fe, Ni, Mg Co, Cu, Zn, Ti, Ag, Zr, Nb, or Al;

the second coating includes a crystalline phosphate $XPO_4$, where the X is one or more elements selected from Li, Fe, Ni, Mg, Co, Cu, Zn, Ti, Ag, Zr, Nb, or Al; and the third coating layer is carbon;

the dispersant includes a polymer, and the polymer includes:

a first monomeric unit represented by Formula 1;

a second monomeric unit, being at least one selected from the group consisting of a monomeric unit represented by Formula 2 and a monomeric unit represented by Formula 3; and a third monomeric unit, being at least one selected from the group consisting of a monomeric unit represented by Formula 4 and a monomeric unit represented by Formula 5;

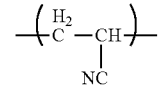

Formula 1

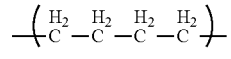

Formula 2

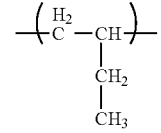

Formula 3

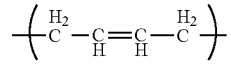

Formula 4

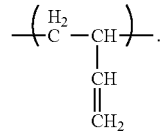

Formula 5

In some embodiments, with respect to a total mass of the polymer, the first monomeric unit has a mass percentage content of M1, M1 being 10%-55%, optionally 25%-55%.

In some embodiments, with respect to a total mass of the polymer, the second monomeric unit has a mass percentage content of M2, M2 being 40%-80%, optionally 50%-70%.

In some embodiments, with respect to a total mass of the polymer, the third monomeric unit has a mass percentage content of M3, M3 being 0%-10%, optionally 0.001%-2%.

In some embodiments, M3/(M2+ M3) is 0%-5%, optionally 0.001%-1%.

In some embodiments, the polymer is hydrogenated nitrile butadiene rubber.

In some embodiments, the polymer has a weight average molar mass of 50,000-500,000, optionally 150,000-350,000.

In some embodiments, with respect to a total mass of the cathode active material, the dispersant has a mass percentage content of X1, with X1 being 0.05%-1%, optionally 0.1%-0.5%.

In some embodiments, the cathode active material composition further includes an infiltrant, the infiltrant has a surface tension of 20 mN/m-40 mN/m, and a molecular structure of the infiltrant includes at least one of the following functional groups: —CN, —NH$_2$, —NH—, —N—, —OH, —C=O, —COO—, —C(=O)—O—C(=O)—.

In some embodiments, the infiltrant includes one or more selected from a small-molecule organic solvent and a low-molecular-weight polymer;
  the small-molecule organic solvent includes one or more selected from an alcohol amine compound, an alcohol compound, and a nitrile compound, optionally, the number of carbon atoms of the alcohol amine compound is 1-16, optionally 2-6;
  the low-molecular-weight polymer includes one or more selected from a maleic anhydride-styrene copolymer, polyvinylpyrrolidone, polysiloxane, optionally, the low-molecular-weight polymer has a weight average molar mass of 6000 or less, optionally 3000-6000.

In some embodiments, with respect to a total mass of the cathode active material, the infiltrant has a mass percentage content of X2, with X2 being 0.05%-2%, optionally 0.2%-0.8%.

In some embodiments, X1/X2 is 0.05-20, optionally 0.1-1, and further 0.3-0.8.

In some embodiments, the crystalline pyrophosphate in the first coating layer has a crystal plane spacing of 0.293-0.470 nm and an angle of 18.00°-32.00° in a crystal direction (111); the crystalline phosphate of the second coating layer has a crystal plane spacing of 0.244-0.425 nm and an angle of 20.00°-37.00° in the crystal direction (111).

In some embodiments, a ratio of y to 1−y in the core is 1:10 to 10:1, optionally 1:4 to 1:1.

In some embodiments, a ratio of z to 1−z in the core is 1:9 to 1:999, optionally 1:499 to 1:249.

In some embodiments, the carbon of the third coating layer is a mixture of SP2 form carbon and SP3 form carbon, optionally, a molar ratio of the SP2 form carbon to the SP3 form carbon is any value in a range of 0.1-10, optionally any value in a range of 2.0-3.0.

In some embodiments, the first coating layer has an amount of coating greater than 0 and less than or equal to 6 wt %, optionally greater than 0 and less than or equal to 5.5 wt %, further optionally greater than 0 and less than or equal to 2 wt %, with respect to the weight of the core; and/or
  the second coating layer has a coating amount greater than 0 and less than or equal to 6 wt %, optionally greater than 0 and less than or equal to 5.5 wt %, further optionally of 2-4 wt %, with respect to the weight of the core.

In some embodiments, the third coating layer has a coating amount greater than 0 and less than or equal to 6 wt %, optionally greater than 0 and less than or equal to 5.5 wt %, and further optionally greater than 0 and less than or equal to 2 wt %, with respect to the weight of the core.

In some embodiments, the first coating layer has a thickness of 1-10 nm.

In some embodiments, the second coating layer has a thickness of 2-15 nm.

In some embodiments, the third coating layer has a thickness of 2-25 nm.

In some embodiments, with respect to a weight of the cathode active material, a content of elemental manganese is in a range of 10 wt %-35 wt %, optionally in a range of 15 wt %-30 wt %, optionally in a range of 17 wt %-20 wt %, and a content of elemental phosphorus is in a range of 12 wt %-25 wt %, optionally in a range of 15 wt %-20 wt %, and a weight ratio of the elemental manganese to the elemental phosphorus is in a range of 0.90-1.25, optionally 0.95-1.20.

In some embodiments, the cathode active material having a core-shell structure has a lattice change rate of less than 4%, optionally less than 3.8%, and further optionally 2.0-3.8% before and after complete lithium intercalation and deintercalation.

In some embodiments, the cathode active material having the core-shell structure has a Li/Mn-antisite-defect concentration of 4% or less, optionally 2.2% or less, further optionally 1.5-2.2%.

In some embodiments, the cathode active material having the core-shell structure has a compaction density at 3 T of 2.2 g/cm$^3$ or more, optionally 2.2 g/cm$^3$-2.8 g/cm$^3$.

In some embodiments, the cathode active material having the core-shell structure has a surface oxygen valence state of −1.90 or less, optionally −1.90 to −1.98.

A second aspect of the present application provides a cathode slurry including the cathode active material composition of the first aspect of the present application; optionally also including one or more of a solvent, a cathode conductive agent, and a cathode binder.

In some embodiments, the solvent includes N-methylpyrrolidone (NMP).

In some embodiments, the cathode binder includes one or more selected from polyvinylidene fluoride (PVDF), polytetrafluoroethylene (PTFE), vinylidene fluoride-tetrafluoroethylene-propylene terpolymers, vinylidene fluoride-hexafluoropropylene-tetrafluoroethylene terpolymers, vinylidene fluoride-hexafluoropropylene copolymers, and fluorinated acrylate resin.

In some embodiments, the cathode conductive agent includes one or more selected from superconducting carbon, acetylene black, carbon black, Ketjen black, carbon dots, carbon nanotubes, graphene, and carbon nanofibers.

In some embodiments, the cathode slurry has a solid content of 40%-70%, optionally 55%-65%.

In some embodiments, the cathode slurry has a viscosity of 3000 mpa·s-50,000 mpa·s at 20° C., optionally 10,000 mpa·s-20,000 mpa·s.

A third aspect of the present application provides a cathode electrode plate including a cathode current collector and a cathode film layer disposed on at least one surface of the cathode current collector, the cathode film layer includes the cathode active material composition of the first aspect of the present application or is made by coating the cathode slurry of the second aspect of the present application.

Optionally, a coating method is selected from lifting method, film-pulling method, electrostatic spraying method, and spin coating method.

In some embodiments, with respect to a total mass of the cathode film layer,
  the cathode active material has a mass percentage content of W1, with W1 being 90%-99.5%, optionally 95%-99%; and/or, in some embodiments, the dispersant has a mass percentage content of W2, with W2 being 1% or less, optionally 0.1%-0.5%; and/or, in some embodiments, the infiltrant has a mass percentage content of W3, with W3 being 2% or less, optionally 0.1%-0.5%; and/or, in some embodiments, the cathode binder has a mass percentage content of W4, with W4 being 5.5% or less, optionally 1%-3%; and/or, In some embodiments, the cathode conductive agent has a mass percentage content of W5, with W5 being 2.5% or less, optionally 0.1%-1%.

A fourth aspect of the present application provides a secondary battery, which includes the cathode plate of the third aspect of the present application.

A fifth aspect of the present application provides a battery module including the cathode plate of the third aspect of the present application, or the secondary battery of the fourth aspect of the present application.

A sixth aspect of the present application provides a battery pack including the cathode plate of the third aspect of the present application, the secondary battery of the fourth aspect of the present application, or the battery module of the fifth aspect of the present application.

A seventh aspect of the present application provides an electric device including the cathode plate of the third aspect of the present application, or the secondary battery of the fourth aspect of the present application, or the battery module of the fifth aspect of the present application, or the battery pack of the sixth aspect of the present application.

The cathode active material composition provided in the present application can solve the problems of poor dispersion of cathode active material powder and high viscosity of slurry in the preparation of cathode slurry, and improve the processing performance of the cathode slurry as well as the performance of the secondary battery.

Figure 1:
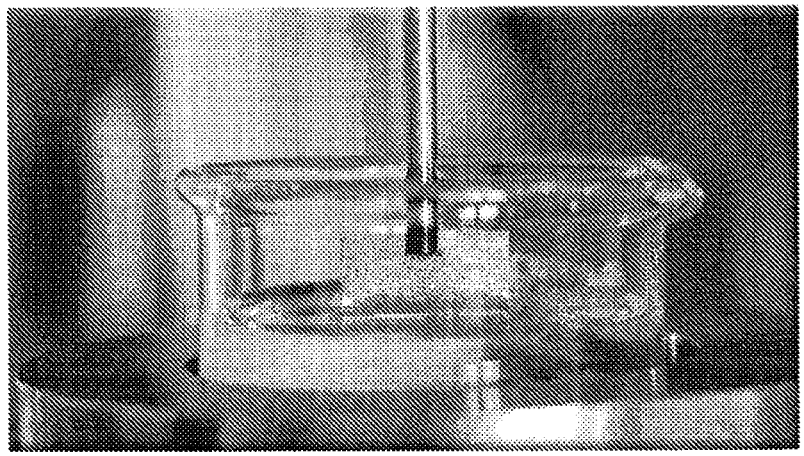
FIG. 1 exemplarily shows the measurement device and measurement principle of a platinum plate method.
Figure 2:
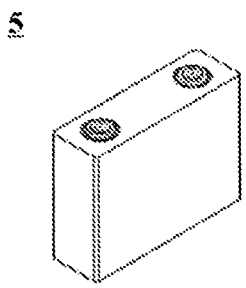
FIG. 2 is a schematic diagram of a secondary battery of an embodiment of the present application.
Figure 3:
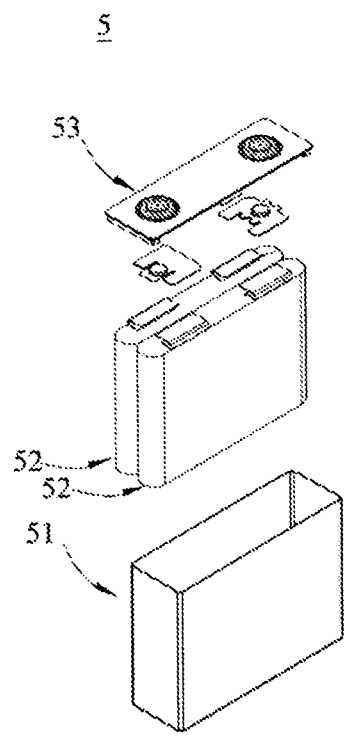
FIG. 3 is an exploded view of the secondary battery of the embodiment of the present application shown in FIG. 2.

Reference numbers in the drawings are as follows:

1 battery pack; 2 upper container body; 3 lower container body; 4 battery module; 5 secondary battery; 51 casing; 52 electrode assembly; and 53 top cover assembly.

DETAILED DESCRIPTION OF THE EMBODIMENTS

The implementations of the present application are described in further detail below in conjunction with the embodiments. The detailed description of the following embodiments is used to exemplarily illustrate the principles of the present application, but is not to be used to limit the scope of the present application, namely, the present application is not limited to the described embodiments.

Hereinafter, implementations of the cathode active material composition, the cathode plate, the secondary battery, the battery module, the battery pack and the electric device of the present application will be specifically disclosed in detail with reference to the accompanying drawings. However, unnecessary detailed description may be omitted. For example, detailed descriptions of well-known items and repeated descriptions of substantially the same configurations may be omitted. This is to avoid the following description from becoming unnecessarily lengthy and to facilitate the understanding of those skilled in the art. In addition, the drawings and the following descriptions are provided for those skilled in the art to fully understand the present application, and are not intended to limit the subject matter described in the claims.

The "range" disclosed in the application is defined in the form of lower limit and upper limit, and the given range is limited by selecting a lower limit and an upper limit, and the selected lower limit and upper limit define the boundary of a special range. Ranges defined in this manner may be inclusive or exclusive and may be combined arbitrarily, i.e., any lower limit may be combined with any upper limit to form a range. For example, if ranges of 60-120 and 80-110 are listed for a particular parameter, it is understood that ranges of 60-110 and 80-120 are contemplated. Additionally, if the minimum range values 1 and 2 are listed, and if the maximum range values 3, 4, and 5 are listed, the following ranges are all expected: 1-3, 1-4, 1-5, 2-3, 2-4, and 2-5. In the present application, unless otherwise stated, the numerical range "a-b" represents an abbreviated representation of any combination of real numbers between a and b, where a and b are both real numbers. For example, the numerical range "0-5" indicates that all real numbers between "0-5" have been listed in this article, and "0-5" is only an abbreviated representation of the combination of these values. In addition, when expressing that a certain parameter is an integer ≥2, it is equivalent to disclosing that the parameter is an integer such as 2, 3, 4, 5, 6, 7, 8, 9, 10, 11, 12, etc.

Unless otherwise specified, all implementation modes and optional implementation modes of the present application may be combined with each other to form new technical proposals.

Unless otherwise specified, all technical features and optional technical features of the present application may be combined with each other to form new technical proposals.

Unless otherwise specified, all the steps in the present application may be performed sequentially or randomly, preferably sequentially. For example, the method including steps (a) and (b) means that the method may include steps (a) and (b) performed in sequence, and may also include steps (b) and (a) performed in sequence. For example, mentioning that the method may also include step (c), means that step (c) may be added to the method in any order, for example, the method may include steps (a), (b) and (c), may also include steps (a), (c) and (b), and may also include steps (c), (a) and (b).

Unless otherwise specified, "include" and "comprise" mentioned in the application represent an open type or a closed type. For example, the "include" and "comprise" may mean that other components not listed may be included or comprised, or only listed components may be included or comprised.

Unless otherwise specified, in the present application, the term "or" is inclusive. For example, the phrase "A or B" means "A, B, or both A and B." More specifically, the condition "A or B" is satisfied by either: A is true (or exists) and B is false (or does not exist); A is false (or does not exist) and B is true (or exists); or both A and B are true (or exist).

It should be noted that, herein, the median particle size $Dv_{50}$ is the particle size corresponding to a cumulative volume distribution of 50% of the cathode active material. In the present application, the median particle size $Dv_{50}$ of the cathode active material can be determined using laser diffraction particle size analysis. For example, with reference to the standard GB/T 19077-2016, a laser particle size analyzer (e.g. Malvern Master Size 3000) is used for the determination.

Herein, the term "coating layer" refers to a layer of material that is coated on the core, and the layer of material may completely or partially coat the core, and the term "coating layer" is used for descriptive purposes only and is not intended to limit the present application. Likewise, the term "thickness of the coating layer" refers to the thickness of the layer of substance coating the core in the radial direction of the core.

Herein, the term "source" refers to a compound that is a source of an element, and as examples, the types of "sources" include, but are not limited to, carbonates, sulfates, nitrates, monomers, halides, oxides, and hydroxides.

[Cathode Active Material Composition]

A first aspect of the present application provides a cathode active material composition including a cathode active material and a dispersant, where, the cathode active material includes a core and a shell coating the core, the core has a chemical formula of $Li_{1+x}Mn_{1-y}A_yP_{1-z}R_zO_4$, where x is any value in a range of −0.100 to 0.100, y is any value in a range of 0.001-0.500, and z is any value in a range of 0.001-0.100; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally one element selected from B, Si, N, and S; the values of x, y, and z satisfy a condition that: the entire core is electrically neutral; and the shell including a first coating layer coating the core, a second coating layer coating the first coating layer, and a third coating layer coating the second coating layer, where the first coating layer includes a crystalline pyrophosphate $MP_2O_7$ and/or $M_b(P_2O_7)_c$, where 0≤a≤2, 1≤b≤4, 1≤c≤6, and values of a, b, and c satisfy a condition that the crystalline pyrophosphate $MP_2O_7$ or $M_b(P_2O_7)_c$ is kept electrically neutral; the M in the crystalline pyrophosphate $MP_2O_7$ and $M_b(P_2O_7)_c$ is respectively independently one or more elements selected from Fe, Ni, Mg Co, Cu, Zn, Ti, Ag, Zr, Nb, or Al;

the second coating includes a crystalline phosphate $XPO_4$, where the X is one or more elements selected from Li, Fe, Ni, Mg, Co, Cu, Zn, Ti, Ag, Zr, Nb, or Al; and the third coating layer is carbon;

the dispersant includes a polymer, and the polymer includes:

a first monomeric unit represented by Formula 1;

a second monomeric unit, being at least one selected from the group consisting of a monomeric unit represented by Formula 2 and a monomeric unit represented by Formula 3; and a third monomeric unit, being at least one selected from the group consisting of a monomeric unit represented by Formula 4 and a monomeric unit represented by Formula 5;

Formula 1

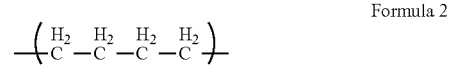

Formula 2

Formula 3

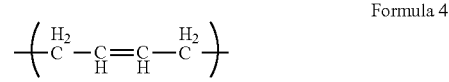

Formula 4

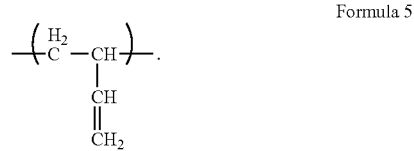

Formula 5

The inventors found that the ratio between the first, second, and third monomeric units may have an effect on the dispersing effect of the dispersant, which in turn affects the flowability, viscosity, and filterability performance of the cathode slurry and may also have an effect on the battery performance.

In some embodiments, with respect to a total mass of the polymer, a mass percentage content of the first monomeric unit is M1, with M1 being 10%-55% (e.g. 10%, 15%, 20%, 25%, 30%, 32%, 35%, 40%, 45%, 50%, or 55%), optionally 25%-55%. The mass percentage content of M1 affects the solubility of the polymer and brittleness of the electrode plate. If the mass percentage content of M1 exceeds 55%, it may lead to poor dispersion and/or poor electrode plate brittleness, and if the mass percentage content of M1 is below 10%, the polymer becomes less soluble in the solvent (e.g., NMP), which in turn makes the slurry inhomogeneous.

In some embodiments, with respect to the total mass of the polymer, a mass percentage content of the second monomeric unit is M2, with M2 being 40%-80% (e.g. 40%, 45%, 50%, 55%, 58%, 60%, 64%, 65%, 68%, 70%, 71%, 75%, or 80%), optionally 50%-70%. The mass percentage content of M2 affects the swelling of the polymer, the mass percentage content of M2 in the range of 40%-80% can ensure the weak polarity of the polymer and a better effect as a dispersant.

In some embodiments, with respect to the total mass of the polymer, the mass percentage content of the third monomeric unit is M3, with M3 being 0%-10% (e.g., 0.001%, 0.005%, 0.01%, 0.050%, 0.10%, 0.30%, 0.4%, 0.50%, 10%, 1.30%, 1.8%, 2%, 3%, 3.8%, 4%, 5%, 5.2%, 6%, 7%, 8%, 9%, or 10%), optionally 0.001%-2%. The mass percentage content of M3 affects the solubility of the polymer and the bonding with the cathode current collector (e.g., aluminum foil). If the percentage of M3 is too low, the bonding of the slurry is poor, and if the mass percentage content of M3 is too high, the polymer tends to dissolve in the electrolyte and affects the battery performance.

In some embodiments, M3/(M2+ M3) is 0%-5% (e.g., 0.001%, 0.005%, 0.01%, 0.05%, 0.1%, 0.5%, 1%, 2%, 3%, 4%, or 5%), optionally 0.001%-1%.

In some embodiments, the polymer is a random copolymer.

In some embodiments, the polymer is hydrogenated nitrile butadiene rubber.

Nitrile butadiene rubber (NBR) is a random copolymer made by polymerizing acrylonitrile with butadiene monomers (e.g. emulsion polymerization), and its structural general formula is:

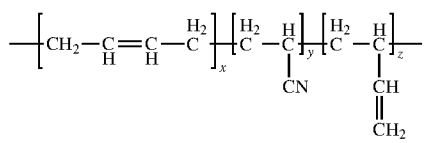

In NBR, the linkage of butadiene (B) and acrylonitrile (A) links is generally BAB, BBA or ABB, and ABA and BBB ternary groups, but with the increase of acrylonitrile content, there are also those who present as a AABAA quintuple linkage, and even become bulk polymers of acrylonitrile. In NBR, the sequence distribution of butadiene is mainly trans-1,4 structure, and its microstructure is related to the polymerization conditions. High polymerization temperatures decrease the trans-1,4 structure and increase the cis-1,4 and 1,2-structures.

Hydrogenated butadiene nitrile rubber (HNBR) is the product obtained by hydrogenation and saturation of the carbon-carbon double bond in the molecular chain of nitrile rubber, so it is also called highly saturated nitrile rubber. The chemical formula of hydrogenated nitrile butadiene rubber is as follows:

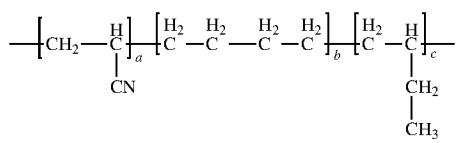

there are three main methods for the preparation of HNBR: ethylene-acrylonitrile copolymerization, NBR solution hydrogenation, and NBR emulsion hydrogenation.

Due to its weak polarity and good affinity with carbon-containing materials, HNBR can act on the particle surface of cathode active materials (especially carbon-containing cathode active materials) and avoid inter-particle agglomeration through steric hindrance, while HNBR also has high strength and low glass transition temperature, which can improve the flexibility of the electrode plate.

In some embodiments, the polymer has a weight average molar mass of 50,000-500,000 (e.g., 50,000, 60,000, 70,000, 80,000, 90,000, 100,000, 150,000, 200,000, 250,000, 300,000, 350,000, 400,000, 450,000, or 500,000), optionally 150,000-350,000. When the molar mass of the polymer is lower than 50,000, the film-forming property of the slurry is poor, and it is viscoelastic in the cathode, and the electrode plate is prone to sticking to the roller when cold pressed; while when the molar mass of the polymer is larger, the solubility of the polymer becomes poor, which is not conducive to the dispersion of the slurry.

The dispersant hydrogenated nitrile butadiene rubber absorbs and swells more in the electrolyte and may affect the room-temperature direct current resistance (DCR) when added in excessive amounts. In some embodiments, with respect to a total mass of the cathode active material, the mass percentage of the dispersant is X1, with X1 being 0.05%-1% (e.g., 0.05%, 0.1%, 0.2%, 0.25%, 0.3%, 0.4%, 0.5%, 0.6%, 0.7%, 0.8%, 0.9%, or 1%), optionally 0.1%-0.5%. When X1 is 0.05%-1%, it can provide good dispersion effect, at the same time can avoid too much dispersant addition to affect the room-temperature DCR and influence the energy density of the battery.

In some cases, the cathode active material has a poor wettability in NMP (N-methylpyrrolidone) and in turn the slurry stability is poor, as evidenced by low solid content of the slurry, decrease in viscosity after placement, etc., which in turn cannot be used properly. The inventors found that functional groups containing N (such as —CN/—NH$_2$—/—N—, etc.), oxygen (such as —C=O/—COOH/—COOR/ epoxy, etc.), or benzene rings have a better affinity for cathode active materials (especially those with a highly graphitized carbon coating layer on the surface and with a microporous structure), and small-molecule infiltrant containing these functional groups can effectively improve the wettability of the cathode active material in solvents (e.g., N-methylpyrrolidone).

In some embodiments, the cathode active material composition further includes an infiltrant, the infiltrant has a surface tension of 20 mN/m-40 mN/m, and the molecular structure of the infiltrant includes at least one (e.g., two or more) of the following functional groups: —CN, —NH$_2$, —NH—, —N—, —OH, —C=O, —COO—, —C(=O)—O—C(=O)—, epoxy group, and phenyl group. The surface tension of the infiltrant can be obtained from the supplier or by using a surface tension meter following the measuring methods already known in the art.

An exemplary measuring method can be the platinum plate method, which is based on the principle that when the sensing platinum plate is immersed into the measured liquid, the surface tension around the platinum plate will be affected, and the surface tension of the liquid will pull the platinum plate down as far as possible. When the surface tension of the liquid and other related forces and the equilibrium force reach an equilibrium, the immersion of the sensing platinum plate in the liquid will stop. At this point, the balance sensor of the instrument measures the immersion depth and translates it into a surface tension value of the liquid.

In the specific testing process, the testing steps of the platinum plate method are: (1) gradually immersing the platinum plate into a liquid; (2) sensing the equilibrium value by the sensor in the state of being immersed beneath the liquid surface; and (3) converting the sensed equilibrium value into the surface tension value and displaying the value.

The surface tension is calculated as follows:

$$P = mg + L\gamma \cdot \cos\theta - sh\rho g$$

Equilibrium force=gravity of the plate+sum of surface tension−buoyant force on the plate (Upward) (Downward) (Upward)

m: Weight of platinum plate g: Gravity (9.8 N/Kg)

L: Perimeter of the platinum plate

γ: Surface tension of the liquid
θ: Contact angle between liquid and platinum plate
s: Cross-sectional area of platinum plate
h: Depth of immersion of the platinum plate
ρ: Density of the liquid FIG. 1 exemplarily shows the measurement device and measurement principle of the platinum plate method. As shown in FIG. 1, (1) Surface tension of the sensing platinum plate is much greater than that of the liquid, so that the liquid can effectively wet the platinum plate and climb up on the plate; (2) The liquid forms an angled arc around the platinum plate; (3) Surface molecular forces act on and pull the platinum plate down.

In some embodiments, the infiltrant includes one or more selected from small-molecule organic solvents and low-molecular-weight polymers.

The small-molecule organic solvent includes one or more selected from an alcoholic amine, an alcoholic compound, a nitrile compound, optionally, the number of carbon atom in the alcoholic amine is 1-16, optionally 2-6; for example, isopropanolamine, 2-amino-2methyl-1-propanol;

The low-molecular-weight polymer includes one or more selected from maleic anhydride-styrene copolymers, polyvinylpyrrolidone, polysiloxanes, optionally, the low-molecular-weight polymer has a weight average molar mass of 6000 or less, such as 70-6000 (e.g., 70-100, 100-500, 500-1000, 1000-2000, 2000-3000, 3000-4000, 4000-5000, or 5000-6000), optionally 3000-6000.

In some embodiments, with respect to the total mass of the cathode active material, the mass percentage content of the infiltrant is X2, with X2 being 0.05%-2% (e.g., 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, or 2%), and optionally 0.2%-0.8%. When X2 is 0.05%-2%, it can provide a good infiltration effect, but also avoid too much infiltrant addition that can affect the stability of the cathode or electrolyte or affect the performance of the battery (e.g. cycling performance).

In some embodiments, X1/X2 is 0.05-20 (e.g., 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 10, 15, or 20), optionally 0.1-1, further 0.3-0.8. When the ratio of the dispersant to the infiltrant is within the above range, the cathode slurry has lower viscosity and better flowability and filterability.

[Cathode Active Material]

The inventors of the present application found in actual operation that the manganese exsolution from the lithium manganese phosphate cathode active material is relatively serious during intensive charging and discharging process. Although there are attempts in the existing technology to coat lithium iron phosphate on lithium manganese phosphate so as to reduce the interfacial side reactions, such coating cannot prevent the migration of exsolved manganese into the electrolyte. After the exsolved manganese migrates to the anode, it is reduced to manganese metal. The resulting manganese metal is equivalent to a "catalyst" that catalyzes the decomposition of the SEI film (solid electrolyte interphase) on the cathode surface, and the resulting by-products are partly gas, which can easily lead to the expansion of the battery and affect the safety performance of the secondary battery; the other part is deposited on the surface of the anode, which obstructs the passage of lithium ions to and from the anode, causing an increase in the impedance of the secondary battery and affecting the kinetic performance of the battery. In addition, to replace the lost SEI film, the electrolyte and the active lithium inside the cell are continuously consumed, which brings irreversible effects on the capacity retention of the secondary battery.

After extensive research, the inventors found that a novel cathode active material with a core-shell structure can be obtained by modifying lithium manganese phosphate and multi-layer coating of lithium manganese phosphate. The cathode active material can achieve significantly lower manganese exsolution and reduced lattice change rate. It can be used in secondary batteries to improve the cycling performance, rate performance, and safety performance of the batteries and increase the battery capacity.

The present application provides a novel doped lithium manganese phosphate cathode active material with a core-shell structure, which enables the secondary battery adopting the cathode active material to have a high gram capacity, good cycling performance, and safety performance.

In order to achieve the above objectives, a first aspect of the present application provides a cathode active material composition having a core-shell structure, which includes a core and a shell coating the core, the core has a chemical formula of $Li_{1+x}Mn_{1-y}A_yP_{1-z}R_zO_4$, where x is any value in a range of −0.100 to 0.100, y is any value in a range of 0.001-0.500, and z is any value in a range of 0.001-0.100; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally one element selected from B, Si, N, and S;

the values of x, y, and z satisfy a condition that: the entire core is electrically neutral; and the shell includes a first coating layer coating the core, a second coating layer coating the first coating layer, and a third coating layer coating the second coating layer, where, the first coating layer includes a crystalline pyrophosphate $MP_2O_7$ and/or $M_b(P_2O_7)_c$, where, 0≤a≤2, 1≤b≤4, 1≤c≤6, and values of a, b, and c satisfy a condition that the crystalline pyrophosphate $MP_2O_7$ or $M_b(P_2O_7)_c$ is kept electrically neutral;

the M in the crystalline pyrophosphate $MP_2O_7$ and $M_b(P_2O_7)_c$ is respectively independently one or more elements selected from Fe, Ni, Mg Co, Cu, Zn, Ti, Ag, Zr, Nb, or Al;

the second coating includes a crystalline phosphate $XPO_4$, where the X is one or more elements selected from Li, Fe, Ni, Mg, Co, Cu, Zn, Ti, Ag, Zr, Nb, or Al; and the third coating layer is carbon.

Unless otherwise specified, in the chemical formula of the above core, when A is more than two elements, the limits of the range of y values above is not only for the stoichiometric number of each element as A, but also for the sum of the stoichiometric numbers of each element as A. For example, when A is more than two elements A1 and A2 . . . An, the stoichiometric numbers y1 and y2 . . . yn of each of A1 and A2 . . . An must each fall within the range of values for The sum of y1 and y2 . . . yn must also fall within the range of the value of y defined in the present application. Similarly, in the case where R is more than two elements, the limits of the numerical range of the stoichiometric number of R in the present application also have the above meaning.

In an optional embodiment, when A is one, two, three or four elements selected from Zn, Al, Na, K, Mg, Mo, W, Ti, V, Zr, Fe, Ni, Co, Ga, Sn, Sb, Nb and Ge, $A_y$ is $Q_{n1}D_{n2}E_{n3}K_{n4}$, where n1+n2+n3+n4=y, and n1, n2, n3, n4 are all positive numbers and not simultaneously zero, Q, D, E, and K are each independently one selected from Zn, Al, Na, K, Mg, Mo, W, Ti, V, Zr, Fe, Ni, Co, Ga, Sn, Sb, Nb, and Ge, optionally, at least one of Q, D, E, and K is Fe. Optionally, one of n1, n2, n3, and n4 is zero and the rest is not zero; further optionally, two of n1, n2, n3, and n4 are zero and the rest are not zero; optionally, three of n1, n2, n3, n4 are zero and the rest is not zero. In the core of $Li_{1+x}Mn_{1-y}A_yP_{1-z}R_zO_4$, it is advantageous to dope one, two, three or four of the element A in the manganese site and, optionally, doping one, two or three of the element A; furthermore, it is advantageous to dope one or two element R in the phosphorus site, which facilitates a uniform distribution of the doped elements.

In the core of $Li_{1+x}Mn_{1-y}A_yP_{1-z}R_zO_4$, the value of X is influenced by the valence states of A and R and the values of y and z, to ensure that the whole system is electrically neutral. If the value of x is too small, it will lead to a lower lithium content of the whole core system, affecting the gram capacity of the material. y value limits the total amount of all doped elements, if y is too small, i.e. too little doping, the doped elements will not exhibit any effect, if y is more than 0.5, it will lead to less Mn content in the system, affecting the voltage plateau of the material. The element R is doped in the sites of P. Since P—O tetrahedra are relatively stable, and the z value being too large will affect the stability of the material, so that the z value is limited to 0.001-0.100.

The cathode active material of the present application can improve the gram capacity, cycling performance and safety performance of the secondary battery. Although the mechanism is still unclear, it is presumed that the lithium manganese phosphate cathode active material of the present application has a core-shell structure. By doping the manganese and phosphorus sites of the lithium manganese phosphate core with element A and element R, respectively, not only can effectively reduce the manganese exsolution, and thus reduce the manganese ions migrating to the anode, reduce the electrolyte consumed due to the decomposition of the SEI film, and improve the cycle performance and safety performance of the secondary battery, but also promote the adjustment of Mn—O bond, thus reducing the lithium-ion migration barrier, promoting lithium-ion migration and improving the rate performance of the secondary battery. By coating the core with the first coating layer including crystalline pyrophosphate, it can further increase the migration resistance of manganese, reduce its exsolution, and reduce the content of heterogeneous lithium on the surface, reduce the contact between the core and electrolyte, thus reducing the interfacial side reactions, reducing gas production, and improving the high-temperature storage performance, cycling performance, and safety performance of the secondary battery. By further coating a crystalline phosphate coating layer with excellent lithium-ion conductivity, the interfacial side reactions on the surface of the cathode active material can be effectively reduced, thus improving the high-temperature cycling and storage performance of the secondary battery; by further coating a carbon layer as the third coating layer, the safety and kinetic performance of the secondary battery can be further improved.

Furthermore, element A doped at the manganese site of lithium manganese phosphate in the core also helps reduce the lattice change rate of lithium manganese phosphate during intercalation and deintercalation of lithium, improve the structural stability of the lithium manganese phosphate cathode material, greatly reduce manganese exsolution, and reduce the oxygen activity on the particle surface. Element R doped at the phosphorus site helps ease the change of Mn—O bond length, thus reducing the lithium-ion migration barrier, promoting lithium-ion migration and improving the rate performance of the secondary battery.

In addition, the entire core system remains electrically neutral, which ensures that there are as few defects and heterogeneous phases as possible in the cathode active material. If excess transition metal (e.g., manganese) is present in the cathode active material, the excess transition metal is likely to precipitate out in the form of a elementary substance or form a heterogeneous phase inside the lattice due to the inherently stable structure of the material system, and by maintaining electrical neutrality, such heterogeneous phases are kept to a minimum. In addition, ensuring the electrical neutrality of the system also allows the creation of lithium vacancies in the material in some situations, resulting in better kinetic properties of the material.

The average particle size of the core prepared in the present application is in the range of 50-500 nm and Dv50 is 200-300 nm. Primary particle sizes of the cores are all in the range of 50-500 nm and Dv50 is 200-300 nm. if the average particle size of the core is too large (over 500 nm), the gram capacity of the secondary battery using this material will be affected; if the core average particle size is too small, then the specific surface area thereof is large and it is easy to agglomerate, making it difficult to achieve uniform coating.

Herein, the median particle size $Dv_{50}$ is the particle size corresponding to a cumulative volume distribution of 50% of the cathode active material. In the present application, the median particle size $Dv_{50}$ of the material can be determined using laser diffraction particle size analysis. For example, with reference to the standard GB/T 19077-2016, a laser particle size analyzer (e.g. Malvern Master Size 3000) is used for the determination.

Through process control (e.g., adequate mixing and grinding of materials from various sources), it is possible to ensure that the elements are uniformly distributed in the lattice without aggregation. the positions of the main characteristic peaks in the XRD plots of the lithium manganese phosphate doped with element A and element R are consistent with those of the undoped $LiMnPO_4$, indicating that the doping process does not introduce impurity phases, and therefore, the improvement of the core properties is mainly from element doping rather than from the impurity phase. After preparing the cathode active material in the present application, the inventor of the present application cut the middle region of the prepared cathode active material particles by focused ion beam (abbreviated as FIB) and tested the specimen by transmission electron microscopy (abbreviated as TEM) as well as X-ray energy spectrum analysis (abbreviated as EDS) and found that the elements were evenly distributed and did not appear to be aggregated.

Herein, crystalline means crystallinity of 50% or higher, i.e. 50%-100%. A crystallinity of less than 50% is referred to as the glassy state. The crystalline pyrophosphates and crystalline phosphates in the present application have a crystallinity of 50% to 100%. The pyrophosphate and phosphate with a certain degree of crystallinity not only promote the functions that the pyrophosphate coating layer hinders the exsolution of manganese and the phosphate coating layer has excellent ability to conduct lithium ions and reduce interfacial side reactions, but also enable the pyrophosphate coating layer and the phosphate coating layer has a better lattice match so that a close bond between the coating layers can be achieved.

In the present application, the crystallinity of the first coating layer substance, the crystalline pyrophosphate, and the second coating layer substance, the crystalline phosphate, of the cathode active material can be tested by conventional technical means in the art, for example by density methods, infrared spectroscopy, differential scanning calorimetry, and nuclear magnetic resonance absorption, and also by, for example, X-ray diffraction.

Specifically, the X-ray diffraction for testing the crystallinity of the crystalline pyrophosphate of the first coating layer and the crystalline phosphate of the second coating layer of the cathode active material may include the following steps:

a certain amount of the cathode active material is taken, the total scattering intensity is measured by X-ray, the total scattering intensity is the sum of the scattering intensity of the whole space material, is only related to the intensity of the primary rays, the chemical structure of the cathode active material powder, the total number of electrons participating in the diffraction, i.e., mass, but not to the order state of the sample; then the crystalline scattering and non-crystalline scattering are separated from the diffraction diagram, and the crystallinity is the ratio of a scattering intensity from the crystalline part to the total scattering intensity.

It should be noted that in the present application, the crystallinity of pyrophosphate and phosphate in the coating layers can be adjusted, for example, by adjusting the process conditions of the sintering process such as sintering temperature, sintering time, and the like.

In the present application, since metal ions are difficult to migrate in pyrophosphate, pyrophosphate as the first coating layer can effectively isolate the doped metal ions from the electrolyte. The structure of crystalline pyrophosphate is stable, therefore, the crystalline pyrophosphate coating can effectively inhibit the exsolution of transition metals and improve the cycling performance.

The bond between the first coating layer and the core is similar to a heterojunction, and the firmness of the bond is limited by the degree of lattice matching. When the lattice mismatch is below 5%, the lattice match is better and the two are easily bonded tightly. The tight bond can ensure that the coating layer will not fall off during subsequent cycles, which is conducive to ensuring the long-term stability of the material. The measurement of the degree of bonding between the first coating layer and the core is mainly carried out by calculating the degree of mismatch between the lattice constants of the core and each coating. In the present application, after the doping of elements A and R in the core, the matching degree between the core and the first coating layer is improved and the core and the pyrophosphate coating layer can be more tightly bonded to each other compared to the undoped elements.

Crystalline phosphate is chosen as the second coating layer, firstly, because it has a high lattice match with the first coating layer of crystalline pyrophosphate (the mismatch is only 3%); secondly, the stability of phosphate itself is better than that of pyrophosphate, and using crystalline phosphate to coat pyrophosphate is conducive to improving the stability of the material. The structure of crystalline phosphate is very stable, and it has excellent lithium-ion conductivity. Therefore, using crystalline phosphate for coating can effectively reduce the interfacial side reactions on the surface of the cathode active material, thus improving the high-temperature cycling and storage performance of the secondary battery. The lattice match between the second coating layer and the first coating layer, for example, is similar to the above-mentioned bonding between the first coating layer and the core, and the lattice match is better when the lattice mismatch is below 5%, and the two are easily bonded tightly.

The main reason for using carbon as the third coating layer is the relatively good electron conductivity of the carbon layer. Since electrochemical reactions will occur in secondary battery applications, which require the participation of electrons, carbon with excellent electrical conductivity can be used to coat the cathode active material in order to increase the electron transfer between the particles and between different locations on a particle. Carbon coating can effectively improve the electrical conductivity and desolvation ability of the cathode active material.

In some embodiments, the average particle size of the primary particles of the cathode active material is in the range of 50-500 nm, with a volumetric median particle size Dv50 in the range of 200-300 nm. The actual measured size of agglomerated secondary particles due to agglomeration may be 500-40,000 nm. The size of the particles of the cathode active material affects the processing of the material and the compaction density of the electrode plate. By choosing the average particle size of the primary particles to be within the above range, it is thus possible to avoid the problems that: the average particle size of the primary particles of the cathode active material that is too small may cause particle agglomeration, difficult dispersion and require more binder, resulting in less brittle electrode plates; the average particle size of the primary particles of the cathode active material that is too large may result in larger inter-particle voids and lower compaction density.

The above proposals can effectively suppress the lattice change rate and Mn exsolution of lithium manganese phosphate in the process of lithium intercalation and deintercalation, thus improving the high-temperature cycle stability and high-temperature storage performance of the secondary battery.

The present application provides a novel lithium manganese phosphate cathode active material with a core-shell structure by doping element A in the manganese site of lithium manganese phosphate and doping element R in the phosphorus site to obtain a doped core of lithium manganese phosphate and applying three coating layers on the surface of the core in sequence, which can significantly improve the high-temperature cycling performance, cycling stability and high-temperature storage performance of the secondary battery by applying the cathode active material to the secondary battery.

In any embodiment, the crystalline pyrophosphate in the first coating layer has a crystalline surface spacing in the range of 0.293-0.470 nm and an angle in a crystalline direction (111) in the range of 18.00°-32.00°; the crystalline phosphate in the second coating layer has a crystalline surface spacing in the range of 0.244-0.425 nm and an angle in a crystalline direction (111) in the range of 20.00°-37.00°.

Both the first coating layer and the second coating layer in the cathode active material described in the present application utilize a crystalline material, and their crystal plane spacing and angle are within the above-mentioned ranges. As a result, the impurity phase in the coating layer can be effectively avoided, thereby improving the gram capacity, cycling performance and rate performance of the material.

The crystalline pyrophosphate and crystalline phosphate in the coating layer can be characterized by conventional technical means in the art or, for example, by means of transmission electron microscopy (TEM). Under TEM, the distinction between the core and the coating layer can be observed by examining the crystalline surface spacing.

A specific method of testing the crystalline surface spacing and the angles of the crystalline pyrophosphate and the crystalline phosphate in the coating layers may include the following steps:

A certain amount of the coated cathode active material sample powder was taken in a test tube, and a solvent such as alcohol is injected in the test tube, then is stirred and dispersed thoroughly, an appropriate amount of the above solution was taken with a clean disposable plastic pipette and added dropwise on a 300-mesh copper net, at this time, part of the powder remained on the copper net, the copper net with the sample was transferred to the TEM sample chamber for testing, and the original TEM test image was obtained, and saved as the original image format.

The original image from the above TEM test was opened in a diffractometer software and Fourier transform was performed to obtain the diffraction pattern, the distance from the diffraction spot to the center of the diffraction pattern was measured to obtain the crystal plane spacing, and the angle was calculated according to the Bragg equation.

The difference between the ranges of crystal plane spacing of crystalline pyrophosphate and that of the crystalline phosphate can be determined directly by the values of crystal plane spacing.

Crystalline pyrophosphate and crystalline phosphate within the above-mentioned ranges of crystalline surface spacing and angles can more effectively suppress the lattice change rate and Mn exsolution of lithium manganese phosphate during lithium intercalation and deintercalation, thus enhancing the high-temperature cycling performance, cycling stability and high-temperature storage of secondary batteries.

In some embodiments, the ratio of y to 1−y in the core is from 1:10 to 10:1, optionally from 1:4 to 1:1. Here y denotes the sum of the stoichiometric numbers of the Mn-site doping elements. The energy density and cycling performance of the cathode active material can be further improved when the above conditions are met.

In some embodiments, the ratio of z to 1−z in the core is from 1:9 to 1:999, optionally from 1:499 to 1:249. y herein denotes the sum of the stoichiometric numbers of the P-site doping elements. The energy density and cycling performance of the cathode active material can be further improved when the above conditions are met.

In some embodiments, the carbon of the third coating layer is a mixture of SP2 form carbon and SP3 form carbon, optionally, the molar ratio of SP2 form carbon to SP3 form carbon is any value in the range of 0.1-10, optionally any value in the range of 2.0-3.0.

In some embodiments, the molar ratio of SP2 form carbon to SP3 form carbon may be about 0.1, about 0.2, about 03, about 0.4, about 0.5, about 0.6, about 0.7, about 0.8, about 0.9, about 1, about 2, about 3, about 4, about 5, about 6, about 7, about 8, about 9, or about 10, or in any range between any of the above values.

In the present application, the term "about" a value indicates a range, indicating a range of ±10% of that value.

By selecting the morphology of carbon in the carbon coating layer, the overall electrical performance of the secondary battery can be improved. Specifically, by using a mixture of SP2 carbon and SP3 carbon and limiting the ratio of SP2 carbon to SP3 carbon to a certain range, the following problems can be avoided: if all the carbon in the coating layer has an amorphous SP3 morphology, the electrical conductivity is poor; if all the carbon is graphitized to have an SP2 morphology, although the electrical conductivity is good, there are few lithium-ion pathways, which is not conducive to lithium intercalation and deintercalation. In addition, limiting the molar ratio of SP2 carbon to SP3 carbon to the above range can achieve both good electrical conductivity and lithium-ion pathway, thus facilitating realizing functions of the secondary battery and its cycling performance.

The mixing ratio between the SP2 and SP3 forms of carbon in the third coating layer can be controlled by sintering conditions such as sintering temperature and sintering time. For example, in the case where sucrose is used as the carbon source for the third coating layer, the sucrose is subjected to cracking at high temperature and deposited on the second coating layer while, under a high temperature, resulting in a carbon coating layer with both SP3 and SP2 forms. The ratio between SP2 and SP3 forms of carbon can be adjusted by selecting high-temperature cracking conditions and sintering conditions.

The structure and characteristics of the third coating layer carbon can be determined by Raman spectroscopy by the following test method: Id/Ig (where Id is the peak intensity of the SP3 form carbon and Ig is the peak intensity of the SP2 form carbon) is obtained by splitting the energy spectrum of the Raman test, thus confirming the molar ratio of the two.

In some embodiments, the first coating layer has a coating amount greater than 0 and less than or equal to 6 wt %, optionally greater than 0 and less than or equal to 5.5 wt %, more optionally greater than 0 and less than or equal to 2 wt %, with respect to the weight of the core; and/or the second coating layer has a coating amount greater than 0 and less than or equal to 6 wt %, optionally greater than 0 and less than or equal to 5.5 wt %, more optionally 2-4 wt %, with respect to the weight of the core; and/or the third coating layer has a coating amount greater than 0 and less than or equal to 6 wt %, optionally greater than 0 and less than or equal to 5.5 wt %, more optionally greater than 0 and less than or equal to 2 wt %, with respect to the weight of the core.

In the present application, the coating amount for each layer is not zero.

In the cathode active material with a core-shell structure in the present application, the amount of the three coating layers is preferably within the above-mentioned range, thereby enabling sufficient coating of the core and further improving the kinetic performance and safety performance of the secondary battery without sacrificing the gram capacity of the cathode active material at the same time.

For the first coating layer, by keeping the coating amount within the above-mentioned range, the following situations can be avoided: too little coating amount means a thin coating layer, which may not effectively hinder the migration of transition metals; too much coating amount means a thick coating layer, which may affect the migration of $Li^+$ and thus the rate performance of the material.

For the second coating layer, by keeping the coating amount within the above range, the following situations can be avoided: too much coating may affect the overall voltage plateau of the material; too little coating may not achieve a sufficient coating effect.

For the third coating layer, the carbon coating mainly serves to enhance the electron transfer between the particles, however, because the structure also contains a large amount of amorphous carbon, the density of carbon is low, therefore, if the coating amount is too large, it will affect the compaction density of the electrode plate.

In some embodiments, the first coating layer has a thickness of 1-10 nm; and/or the second coating layer has a thickness of 2-15 nm; and/or the third coating layer has a thickness of 2-25 nm.

In some embodiments, the thickness of the first coating layer may be about 2 nm, about 3 nm, about 4 nm, about 5 nm, about 6 nm, about 7 nm, about 8 nm, about 9 nm, or about 10 nm, or in any range between any of the above values.

In some embodiments, the thickness of the second coating layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or in any range between any of the above values.

In some embodiments, the thickness of the third coating layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, or about 25 nm, or within any range between any the above values.

When the thickness of the first coating layer is in the range of 1-10 nm, it is possible to avoid possible adverse effects on the kinetic properties of the material when the first coating layer is too thick, and to avoid the problem that the migration of transition metal ions may not be effectively hindered when the first coating layer is too thin.

When the thickness of the second coating layer is in the range of 2-15 nm, the surface structure of the second coating layer is stable, and the side reactions with electrolyte is little, so it can effectively mitigate the interfacial side reaction and thus improve the high-temperature performance of the secondary battery.

When the thickness of the third coating layer is in the range of 2-25 nm, the conductivity of the material can be enhanced, and the compaction density of the battery prepared with the cathode active material can be improved.

The thicknesses of the coating layers are mainly tested by FIB, and a specific method may include the following steps: a single particle is randomly selected from the cathode active material powder to be tested, a thin slice with a thickness of about 100 nm is cut from the middle position of the selected particle or near the middle position, and then a TEM test is performed on the thin slice to measure the thickness of the respective coating layer, and 3-5 positions are measured and the average value is taken.

In some embodiments, with respect to the weight of the cathode active material having a core-shell structure, the content of manganese element is in the range of 10 wt %-35 wt %, optionally in the range of 15 wt %-30 wt %, further optionally in the range of 17 wt %-20 wt %, and the content of phosphorus element is in the range of 12 wt %-25 wt %, optionally in the range of 15 wt %-20 wt %. The weight ratio of manganese element to phosphorus element in in the range of 0.90-1.25, optionally 0.95-1.20.

In the cathode active material with the core-shell structure in the present application, when the content of manganese element is within the above-mentioned range, it can effectively avoid the problems such as deterioration of material structure stability and density decrease that may be caused if the content of manganese element is too high, so as to improve the performance of secondary battery such as cycling, storage and compaction density; and can avoid the problems such as low voltage plateau that may be caused if the content of manganese element is too low, so as to improve the energy density of the secondary battery.

In the cathode active material with the core-shell structure in the present application, when the content of phosphorus element is within the above-mentioned range, it can effectively avoid the following situations: if the content of phosphorus element is too large, it may lead to the covalency of P—O that is too strong and affect the conductivity of small polarizons, thus affecting the conductivity of the material; if the content of phosphorus element is too small, it may lower the stability of the core, the pyrophosphate in the first coating layer and/or the phosphate lattice structure in the second coating layer, thus affecting the overall stability of the material.

The weight ratio of manganese to phosphorus contents has the following effects on the performance of the secondary battery: a weight ratio being too large means too much manganese, which will increase the manganese exsolution and affect the stability and gram capacity of the cathode active material, and then affect the cycle performance and storage performance of the secondary battery; a weight ratio being too small means too much phosphorus, which will easily form a heterogeneous phase, which will cause the discharge voltage plateau of the material to drop, thus the energy density of the secondary battery is reduced.

The measurement of manganese element and phosphorus element can be carried out by conventional techniques in the art. In particular, the following method is used to determine the content of manganese and phosphorus elements: the material is dissolved in dilute hydrochloric acid (a concentration of 10-30%), the content of each element of the solution is tested using ICP, and then the content of manganese element is measured and converted to obtain its weight percentage.

In some embodiments, the cathode active material having the core-shell structure has a lattice change rate of less than 4%, optionally less than 3.8%, and further optionally 2.0-3.8% before and after complete lithium intercalation and deintercalation.

The process of intercalation and deintercalation of lithium in lithium manganese phosphate ($LiMnPO_4$) is a two-phase reaction. The interfacial stress of the two phases is determined by the magnitude of the lattice rate of change, and the smaller the lattice rate of change, the lower the interfacial stress and the easier the $Li^+$ transport. Therefore, reducing the lattice rate of change of the core will be beneficial to enhance the transport capacity of $Li^+$ and thus improve the rate performance of the secondary battery. The cathode active material with the core-shell structure in the present application is capable of achieving a lattice change rate of less than 4% before and after lithium intercalation and deintercalation, and thus the use of the cathode active material can improve the rate performance of the secondary battery. The lattice change rate can be measured by methods known in the art, such as X-ray diffraction (XRD).

The cathode active material with the core-shell structure in the present application is capable of achieving a lattice change rate of less than 4% before and after lithium intercalation and deintercalation. Therefore, the use of the cathode active material can improve the gram capacity and rate performance of the secondary battery.

In some embodiments, the cathode active material with the core-shell structure has a Li/Mn-antisite defect concentration of 4% or less, optionally 2.2% or less, and further optionally 1.5-2.2%.

Herein, the Li/Mn-antisite defect refers to the interchange of the sites of $Li^+$ and $Mn^{2+}$ in the $LiMnPO_4$ lattice. Accordingly, the Li/Mn anti-antisite defect concentration refers to the percentage of $Li^+$ interchanged with $Mn^{2+}$ with respect to the total amount of $Li^+$. In the present application, the Li/Mn-antisite-defect concentration can be determined, for example, according to JIS K 0131-1996.

The cathode active material with a core-shell structure described in the present application is capable of achieving the lower Li/Mn anti-site defect concentration described above. Although the mechanism is not well understood, the inventors of the present application speculate that since the sites of $Li^+$ and $Mn^{2+}$ in the $LiMnPO_4$ lattice are interchangeable, and the $Li^+$ transmission channel is a one-dimensional channel, thus $Mn^{2+}$ is difficult to migrate in the $Li^+$ transmission channel, thereby hindering the $Li^+$ transport. Accordingly, the cathode active material with the core-shell structure described in the present application is within the above-mentioned range due to the low concentration of Li/Mn anti-site defects, and thus, it can avoid $Mn^{2+}$ from hindering the transmission of $Li^+$, while improving the gram capacity and multiplicative performance of the cathode active material.

In some embodiments, optionally, the cathode active material has a compaction density at 3 tons (T) of $2.2 \text{ g/cm}^3$ or higher, optionally $2.2$-$2.8 \text{ g/cm}^3$. The higher the compaction density of the cathode active material, the higher the weight per unit volume of the active material, so increasing the compaction density is conducive to increasing the volumetric energy density of the battery. The compaction density can be measured according to GB/T 24533-2009.

In some embodiments, optionally, the cathode active material has a surface oxygen valency of $-1.90$ or less, optionally $-1.90$ to $-1.98$. The stable valence state of oxygen is originally $-2$. The closer the valence state is to $-2$, the stronger its electron gaining ability, i.e., the stronger the oxidation, and typically, the surface valence is below $-1.7$. By limiting the surface oxygen valence state of the cathode active material to the above range in the present application, it is able to reduce the interfacial side reactions between the cathode material and the electrolyte, thus improving the performance of the battery in terms of cycling, gas production under high-temperature storage, and the like.

The surface oxygen valence state can be measured by methods known in the art, for example by electron energy loss spectroscopy (EELS).

In some embodiments, the cathode active material may be prepared by a method including the steps of:

providing a core material: the core has a chemical formula of $Li_{1+x}Mn_{1-y}A_yP_{1-z}R_zO_4$, where x is any value in a range of $-0.100$ to $0.100$, y is any value in a range of $0.001$-$0.500$, and z is any value in a range of $0.001$-$0.100$; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally one element selected from B, Si, N, and S; and a coating step: $Li_aMP_2O_7$ and/or $M_b(P_2O_7)_c$ and a $XPO_4$ suspension are provided, the core material is added to the above suspension and mixed, and sintered to obtain a cathode active material, where $0 \leq a \leq 2$, $1 \leq b \leq 4$, $1 \leq c \leq 6$, and values of a, b, and c satisfy a condition that the crystalline pyrophosphate $MP_2O_7$ or $M_b(P_2O_7)_c$ is kept electrically neutral; the M is respectively independently one or more elements selected from Fe, Ni, Mg Co, Cu, Zn, Ti, Ag, Zr, Nb, or Al; and the X is one or more elements selected from Li, Fe, Ni, Mg, Co, Cu, Zn, Ti, Ag, Zr, Nb, or Al; and where the cathode active material has a core-shell structure including the core and a shell coating the core, the shell includes a first coating layer coating the core, a second coating layer coating the first coating layer, and a third coating layer coating the second coating layer, the first coating layer includes a crystalline pyrophosphate $Li_aMP_2O_7$ and/or $M_b(P_2O_7)_c$, the second coating layer includes a crystalline phosphate $XPO_4$, and the third coating layer is carbon.

In any embodiments, the step of providing the core material includes the steps of:

Step (1): mixing a manganese source, a dopant of element A, and an acid in a container and stirring to obtain manganese salt particles doped with element A;

Step (2): mixing the manganese salt particles doped with element with a lithium source, a phosphorus source, and a source of element R in a solvent to obtain a slurry, and sintering under inert gas atmosphere protection to obtain a core doped with element A and element R, where the core doped with element A and element R is $Li_{1+x}Mn_{1-y}A_yP_{1-z}R_zO_4$, where x is any value in a range of $-0.100$ to $0.100$, y is any value in a range of $0.001$-$0.500$, and z is any value in a range of $0.001$-$0.100$; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally the R is one element selected from B, Si, N, and S.

The preparation method of the present application is not particularly limited to the source of the material, the source of an element may include one or more of the element's monomers, sulfates, halides, nitrates, organic acid salts, oxides, or hydroxides, with a premise that the source may achieve the purpose of the preparation method of the present application.

In some embodiments, the dopant of element A is one or more selected from a respective monomer, carbonate, sulfate, chloride, nitrate, organic acid salt, oxide, and hydroxide of one or more elements of Zn, Al, Na, K, Mg, Mo, W, Ti, V, Zr, Fe, Ni, Co, Ga, Sn, Sb, Nb, and Ge.

In some embodiments, the dopant of element R is one or more selected from a respective inorganic acid, subacid, organic acid, sulfate, chloride salt, nitrate, organic acid salt, oxide, and hydroxide of one or more element of B, Si, N, and S.

In the present application, the manganese source may be a manganese-containing substance known in the art that can be used to prepare lithium manganese phosphate. As an example, the manganese source may be one or more selected from monolithic manganese, manganese dioxide, manganese phosphate, manganese oxalate, and manganese carbonate.

In the present application, the acid may be one or more selected from inorganic acids such as hydrochloric acid, sulfuric acid, nitric acid, phosphoric acid, silicic acid, silicone acid, and organic acids such as oxalic acid. In some embodiments, the acid is a dilute organic acid with a concentration of 60 wt % or less.

In the present application, the lithium source may be a lithium-containing substance known in the art that can be used to prepare lithium manganese phosphate. As an example, the lithium source is one or more selected from lithium carbonate, lithium hydroxide, lithium phosphate, and lithium dihydrogen phosphate.

In the present application, the phosphorus source may be a phosphorus-containing substance known in the art that can be used to prepare lithium manganese phosphate. As an example, the phosphorus source is one or more selected from diammonium hydrogen phosphate, ammonium dihydrogen phosphate, ammonium phosphate, and phosphoric acid.

In some optional embodiments, after the reaction of the manganese source, the dopant of element A, and the acid in a solvent to obtain a suspension of manganese salt doped with element A, the suspension is filtered, dried and sanded to obtain manganese salt particles doped with element A with a particle size of 50-200 nm.

In some optional embodiments, the slurry from step (2) is dried to obtain a powder, and then the powder is sintered to obtain a core doped with element A and element R.

In some embodiments, step (1) is mixed at a temperature of 20-120° C., optionally 40-120° C.; and/or The stirring in step (1) was carried out at 400-700 rpm for 1-9 hrs, optionally for 3-7 hrs.

Optionally, the reaction temperature in step (1) may be carried out at about 30° C., about 50° C., about 60° C., about 70° C., about 80° C., about 90° C., about 100° C., about 110° C., or about 120° C.; the stirring in step (1) is carried out for about 2 hrs, about 3 hrs, about 4 hrs, about 5 hrs, about 6 hrs, about 7 hrs, about 8 hrs, or about 9 hrs; optionally, the reaction temperature and stirring time in step (1) may be within any range of any of the above values.

In some embodiments, step (2) is mixed at a temperature of 20-120° C., optionally 40-120° C. for 1-12 hrs. Optionally, the reaction temperature in step (2) may be carried out at about 30° C., about 50° C., about 60° C., about 70° C., about 80° C., about 90° C., about 100° C., about 110° C., or about 120° C.; the mixing in step (2) is carried out for about 2 hrs, about 3 hrs, about 4 hrs, about 5 hrs, about 6 hrs, about 7 hrs, about 8 hrs, about 9 hrs, about 10 hrs, about 11 hrs, or about 12 hrs; optionally, the reaction temperature, mixing time in step (2) may be within any range of any of the above values.

When the heating temperature and stirring time during the preparation of the core particles are within the above-mentioned ranges, the cores prepared and the cathode active material made therefrom have fewer lattice defects, which is conducive to suppressing the manganese exsolution and reducing the interfacial side reactions between the cathode active material and the electrolyte, thus improving the cycling performance and safety performance of the secondary battery.

In some embodiments, optionally, the solution pH is controlled to be 3.5-6, optionally, the solution pH is controlled to be 4-6, and more optionally, the solution pH is controlled to be 4-5 during the preparation of the dilute manganese acid particles doped with element A and element R. It is noted that the pH of the resulting mixture may be adjusted in the present application by methods commonly used in the art, for example, by the addition of an acid or a base.

In some embodiments, optionally, in step (2), the molar ratio of manganese salt particles to lithium source and phosphorus source is 1:0.5-2.1:0.5-2.1, and further optionally, the molar ratio of manganese salt particles doped with element A to lithium source and phosphorus source is about 1:1:1.

In some embodiments, optionally, the sintering conditions in the process of preparing lithium manganese phosphate doped with element A and element R are: sintering at 600-950° C. for 4-10 hrs under an inert gas or a mixture of inert gas and hydrogen atmosphere; optionally, the sintering may be at about 650° C., about 700° C., about 750° C., about 800° C., about 850° C., or about 900° C. for about 2 hrs, about 3 hrs, about 4 hrs, about 5 hrs, about 6 hrs, about 7 hrs, about 8 hrs, about 9 hrs, or about 10 hrs; optionally, the sintering and sintering time may be of any values within any of the above ranges. In the process of preparing lithium manganese phosphate doped with element A and element R, if the sintering temperature is too low at the same time the sintering time is too short, a low crystallinity of the material core will occur, which will affect the overall performance, while if the sintering temperature is too high, the heterogeneous phase is easy to appear in the material core, which will affect the overall performance; when the sintering time is too long, the material core particles are relatively large, which will affect performances such as the gram capacity, compaction density, and rate performance.

In some optional embodiments, optionally, the protective atmosphere is a mixture of 70-90 vol % nitrogen and 10-30 vol % hydrogen.

In any embodiment, the coating step includes:
a first coating step: a source of element M, a phosphorus source and an acid, and optionally a lithium source are mixed, to obtain a first coating layer suspension; the core obtained in the core step is mixed thoroughly with the first coating layer suspension obtained in the first coating step, dried, and then sintered to obtain a material coated with a first coating layer;
a second coating step: the source of element X, the phosphorus source and the acid are dissolved in a solvent to obtain a second coating layer suspension; the material coated with the first coating layer obtained in the first coating step is thoroughly mixed with the second coating layer suspension obtained in the second coating step, dried, and then sintered to obtain a material coated with two coating layers; and
a third coating step: the carbon source is fully dissolved in a solvent to obtain a third coating layer solution; then the material coated by the two coating layers obtained in the second coating step is added to the third coating layer solution, mixed well, dried, and then sintered to obtain a material coated by the three coating layers, i.e., the cathode active material.

In some embodiments, the source of element M is one or more selected from a respective monomer, carbonate, sulfate, chloride, nitrate, organic acid salt, oxide, and hydroxide of one or more elements of Fe, Ni, Mg, Co, Cu, Zn, Ti, Ag, Zr, Nb, or Al.

In some embodiments, the source of element X is one or more selected from a respective monomer, carbonate, sulfate, chloride, nitrate, organic acid salt, oxide, and hydroxide of one or more elements of Li, Fe, Ni, Mg, Co, Cu, Zn, Ti, Ag, Zr, Nb, or Al.

In the present application, the addition of the respective sources of elements A, R, M, and X depends on the target doping amount, and the ratio between the amounts of lithium, manganese, and phosphorus sources conforms to the stoichiometric ratio.

As an example, the carbon source is one or more selected from starch, sucrose, glucose, polyvinyl alcohol, polyethylene glycol, and citric acid.

In any embodiment, in the first coating step, the pH of the solution dissolved with the source of element M, phosphorus source, and acid and optionally lithium source is controlled to be 3.5-6.5, then stirred and reacted for 1-5 hrs, then the solution is heated to 50-120° C. and held at this temperature for 2-10 hrs, and/or, sintering is performed at 650-800° C. for 2-6 hrs.

Optionally, in the first coating step, the reaction is fully performed. Optionally, in the first coating step, the reaction is carried out for about 1.5 hrs, about 2 hrs, about 3 hrs, about 4 hrs, about 4.5 hrs, or about 5 hrs. Optionally, the reaction time of the reaction in the first coating step may be within any range of any of the above values.

Optionally, in the first coating step, the pH of the solution is controlled to be 4-6. optionally, in the first coating step, the solution is heated to about 55° C., about 60° C., about 70° C., about 80° C., about 90° C., about 100° C., about 110° C., or about 120° C. and held at that temperature for about 2 hrs, about 3 hrs, about 4 hrs, about 5 hrs, about 6 hrs, about 7 hrs, about 8 hrs, about 9 hrs, or about 10 hrs; optionally, the temperature of warming and holding time in the first coating step may be within any range of any of the above values.

Optionally, in the first coating step, the sintering may be at about 650° C., about 700° C., about 750° C., or about 800° C. for about 2 hrs, about 3 hrs, about 4 hrs, about 5 hrs, or about 6 hrs; optionally, the sintering temperature, sintering time may be within any range between any of the above values.

In the first coating step, by controlling the sintering temperature and time within the above ranges, the following situations can be avoided: when the sintering temperature in the first coating step is too low and the sintering time is too short, it will lead to low crystallinity and more amorphous substances in the first coating layer, which will lead to a decrease in the effect of inhibiting metal exsolution, thus affecting the cycling performance and high temperature storage performance of the secondary battery; and when the sintering temperature is too high, it will lead to t heterogeneous phases in the first coating layer, which will also affect the effect of inhibiting metal exsolution, thus affecting the cycling and high-temperature storage performance of the secondary battery; when the sintering time is too long, it will increase the thickness of the first coating layer and affect the migration of Li$^+$, thus affecting the gram capacity performance and rate performance, etc. of the material.

In some embodiments, in the second coating step, after dissolving the source of element X, the phosphorus source and the acid in a solvent, stirring and reacting for 1-10 hrs, then heating the solution to 60-150° C. and holding at that temperature for 2-10 hrs, and/or, sintering at 500-700° C. for 6-10 hrs.

Optionally, in the second coating step, the reaction is fully carried out. Optionally, in the second coating step, the reaction is carried out for about 1.5 hrs, about 2 hrs, about 3 hrs, about 4 hrs, about 4.5 hrs, about 5 hrs, about 6 hrs, about 7 hrs, about 8 hrs, about 9 hrs, or about 10 hrs. Optionally, the reaction time of the reaction in the second coating step may be within any range between any of the above values.

Optionally, in the second coating step, the solution is heated to about 65° C., about 70° C., about 80° C., about 90° C., about 100° C., about 110° C., about 120° C., about 130° C., about 140° C., or about 150° C., and held at that temperature for about 2 hrs, about 3 hrs, about 4 hrs, about 5 hrs, about 6 hrs, about 7 hrs, about 8 hrs, about 9 hrs, or about 10 hrs; optionally, the temperature of heating and holding time in the second coating step may be within any range between any of the above values.

In the step of providing the core material and the first coating step and the second coating step, before sintering, that is, during the preparation of the core material undergoing a chemical reaction (steps (1)-(2)) and during the preparation of the first coating layer suspension and the second coating layer suspension, by selecting an appropriate reaction temperature and reaction time as described above, the following situations can be avoided: when the reaction temperature is too low, the reaction cannot occur or the reaction rate is slow; when the temperature is too high, the product decomposes or forms a heterogeneous phase; when the reaction time is too long, the product particle size is large, which may increase the time and difficulty of the subsequent process; when the reaction time is too short, the reaction is incomplete and less product is obtained.

Optionally, in the second coating step, the sintering may be carried out at about 550° C., about 600° C., or about 700° C. for about 6 hrs, about 7 hrs, about 8 hrs, about 9 hrs, or about 10 hrs; optionally, the sintering temperature, sintering time may be within any ranges between any of the above values.

In the second coating step, by controlling the sintering temperature and time within the above ranges, the following can be avoided: when the sintering temperature in the second coating step is too low and the sintering time is too short, it will lead to low crystallinity and more amorphous state in the second coating layer, which will reduce the ability of reducing the surface reactivity of the material, thus affecting the cycling and high temperature storage performance of the secondary battery; and when the sintering temperature is too high, it will lead to heterogeneous phases in the second coating layer, which will also affect the effect of reducing the surface reactivity of the material, thus affecting the cycling and high-temperature storage performance of the secondary battery; when the sintering time is too long, it will increase the thickness of the second coating layer and affect the voltage plateau of the material, thus decreasing the energy density and the like of the material.

In some embodiments, the sintering in the third coating step is performed at 700-800° C. for 6-10 hrs. Optionally, the sintering in the third coating step may be carried out at about 700° C., about 750° C., or about 800° C. for about 6 hrs, about 7 hrs, about 8 hrs, about 9 hrs, or about 10 hrs; optionally, the sintering temperature, sintering time may be within any ranges between any of the above values.

In the third coating step, by controlling the sintering temperature and time within the above ranges, the following can be avoided: when the sintering temperature in the third coating step is too low, it will lead to a decrease in the graphitization of the third coating layer, affecting its conductivity and thus the gram capacity of the material; when the sintering temperature is too high, it will lead to too much graphitization of the third coating layer, affecting the transmission of Li$^+$ and thus the gram capacity of the material; when the sintering time is too short, the coating layer will be too thin, which affects its conductivity and thus the gram capacity of the material; when the sintering time is too long, the coating layer will be too thick, which affects the compaction density of the material.

In the first coating step, the second coating step, and the third coating step described above, the drying is carried out at a drying temperature from 100° C. to 200° C., optionally from 110° C. to 190° C., more optionally from 120° C. to 180° C., even more optionally from 120° C. to 170° C., most optionally from 120° C. to 160° C., with a drying time of 3-9 hrs, optionally 4-8 hrs, more optionally 5-7 hrs, most optionally about 6 hrs.

With the cathode active material prepared by the preparation method of cathode active material in the present application, the secondary battery prepared therefrom has reduced exsolution of Mn and Mn-site doping elements after cycling, and the high-temperature stability, high-temperature cycling performance and rate performance are improved. In addition, the raw materials are widely available, with a low cost and simple process, which are conducive to industrialization.

[Cathode Slurry]

A second aspect of the present application provides a cathode slurry including the cathode active material composition of the first aspect of the present application; optionally also including one or more of a solvent, a cathode conductive agent, and a cathode binder.

In some embodiments, the cathode slurry includes a solvent, optionally, the solvent includes N-methylpyrrolidone (NMP).

In some embodiments, the cathode slurry includes a cathode binder. Optionally, the cathode binder includes one or more selected from polyvinylidene fluoride (PVDF), polytetrafluoroethylene (PTFE), vinylidene fluoride-tetrafluoroethylene-propylene terpolymers, vinylidene fluoride-hexafluoropropylene-tetrafluoroethylene terpolymers, vinylidene fluoride-hexafluoropropylene copolymers, and fluorinated acrylate resin.

In some embodiments, the cathode slurry includes a cathode conductive agent. Optionally, the cathode conductive agent includes one or more selected from superconducting carbon, acetylene black, carbon black, Ketjen black, carbon dots, carbon nanotubes, graphene, and carbon nanofibers.

In the present application, the solid content of the cathode slurry can be enhanced, and/or the viscosity of the cathode slurry can be reduced, by selecting a suitable dispersant and/or infiltrant.

In some embodiments, the cathode slurry has a solid content of 40%-70% (e.g., 40%, 45%, 50%, 55%, 58%, 60%, 64%, 65%, 68%, or 70%), optionally 55%-65%.

In some embodiments, the cathode slurry has a viscosity of 3000 mpa·s-50,000 mpa·s at 20° C. (e.g. 3000 mpa·s, 4000 mpa·s, 5000 mpa·s, 6000 mpa·s, 7000 mpa·s, 8000 mpa·s, 9000 mpa·s, 10,000 mpa·s, 11000 mpa·s, 12000 mpa·s, 13000 mpa·s, 14000 mpa·s, 15000 mpa·s, 16000 mpa·s, 17000 mpa·s, 18000 mpa·s, 19000 mpa·s, 20000 mpa·s, 30000 mpa·s, 40000 mpa·s, or 50,000 mpa·s), and optionally 10,000 mpa·s-20,000 mpa·s.

[Cathode Plate]

A third aspect of the present application provides a cathode plate including a cathode current collector and a cathode film layer provided on at least one surface of the cathode current collector, the cathode film layer includes the cathode active material composition of the first aspect of the present application or is prepared by coating the cathode slurry of the second aspect of the present application. The cathode film layer may be disposed on one surface of the cathode current collector, or may be provided on both surfaces of the cathode current collector.

In some embodiments, with respect to a total mass of the cathode film layer, the mass percentage content of the cathode active material is W1, with W1 being 90%-99.5% (e.g., 90%, 91%, 92%, 93%, 94%, 95%, 96%, 97%, 98%, 99%, or 99.5%), optionally 95%-99%; and/or in some embodiments, the dispersant has a mass percentage content of W2, with W2 being 1% or less (e.g., 0.001%, 0.005%, 0.01%, 0.05%, 0.1%, 0.2%, 0.3%, 0.4%, 0.5%, or 1%), optionally 0.1%-0.5%; and/or in some embodiments, the infiltrant has a mass percentage content of W3, with W3 being 2% or less (e.g., 0.001%, 0.005%, 0.01%, 0.05%, 0.1%, 0.2%, 0.3%, 0.4%, 0.5%, 1%, or 2%), optionally 0.1%-0.5%; and/or in some embodiments, the cathode binder has a mass percentage content of W4, with W4 being 5.5% or less (e.g., 0.001%, 0.005%, 0.01%, 0.05%, 0.1%, 0.5%, 1%, 1.2%, 1.5%, 2%, 2.3%, 2.5%, 2.7%, 3%, 4%, 5%, or 5.5%), optionally 1% to 3%; and/or.

In some embodiments, the cathode conductive agent has a mass percentage content of W5, with W5 being 2.5% or less (e.g., 0.001%, 0.005%, 0.01%, 0.05%, 0.1%, 0.2%, 0.3%, 0.4%, 0.5%, 0.6%, 0.7%, 0.8%, 0.9%, 1%, 2%, or 2.5%), optionally 0.1%-1%.

In some embodiments, the cathode current collector may be a metal foil or a composite current collector. For example, as a metal foil, an aluminum foil may be used. The composite current collector may include a base layer of high polymer material and a metal layer formed on at least one surface of the base layer of high polymer material. The composite current collector may be formed by forming a metal material (aluminum, an aluminum alloy, nickel, a nickel alloy, titanium, a titanium alloy, silver and a silver alloy, etc.) on a high polymer base material (such as a base material of polypropylene (PP), polyethylene terephthalate (PET), polybutylene terephthalate (PBT), polystyrene (PS), polyethylene (PE), etc.).

In some embodiments, one or more under-coating layers are also provided between the cathode current collector and the cathode film layer to increase the bond between the cathode current collector and the cathode film layer. In some embodiments, the under-coating layer includes a polyacrylic acid-acrylate copolymer (e.g., polyacrylic acid-acrylate copolymer having a weight average molar mass of 300,000-350,000) and a conductive agent (e.g., conductive carbon black (Super P)), the weight ratio between the two may be 60:40-40:60. An exemplary methods of preparation includes: dissolving/dispersing the polyacrylic acid-acrylate copolymer and the conductive agent in deionized water to form a under-coating slurry; applying the under-coating slurry to one or both sides of the cathode current collector (e.g., aluminum foil) and drying to obtain a cathode current collector with a conductive under-coating layer. In some embodiments, the thickness of the under-coating layer is 1-5 μm.

In some embodiments, the cathode material layer further optionally includes a binder. The type and content of the conductive agent as well as the binder are not specifically limited and can be selected according to actual needs. As an example, the binder may include at least one of polyvinylidene fluoride (PVDF), polytetrafluoroethylene (PTFE), vinylidene fluoride-tetrafluoroethylene-propylene terpolymers, vinylidene fluoride-hexafluoropropylene-tetrafluoroethylene terpolymers, vinylidene fluoride-hexafluoropropylene copolymers, and fluorinated acrylate resin.

In some embodiments, the cathode material layer may further optionally include a conductive agent. As an example, the conductive agent may include at least one of superconducting carbon, acetylene black, carbon black, Ketjen black, carbon dots, carbon nanotubes, graphene, and carbon nanofibers.

In some embodiments, the cathode plate can be prepared by the following method: dispersing the cathode active material, the conductive agent, the binder and any other components in a solvent (e.g., N-methylpyrrolidone) to form a cathode slurry; coating the cathode slurry on the cathode current collector, and after drying and cold pressing, the cathode plate can be obtained. Optionally, the coating method is selected from lifting method, film-pulling method, electrostatic spraying method and spin coating method.

A fourth aspect of the present application provides a secondary battery including the cathode plate of the third aspect of the present application.

[Anode Plate]

In the secondary battery of the present application, the anode plate may include an anode current collector and an anode material layer provided on the anode current collector and including an anode active material, the anode material layer may be provided on one surface of the anode current collector or on both surfaces of the anode current collector.

In some embodiments, the anode current collector may be a metal foil or a composite current collector. For example, as a metal foil, a copper foil may be used. The composite current collector may include a high-polymer-material base layer and a metal layer formed on at least one surface of the high-polymer-material base layer. The composite current collector can be formed by forming a metal material (copper, a copper alloy, nickel, a nickel alloy, titanium, a titanium alloy, silver and a silver alloy, etc.) on a high-polymer base material (such as a base material of polypropylene (PP), polyethylene terephthalate (PET), polybutylene terephthalate (PBT), polystyrene (PS), polyethylene (PE), etc.).

In some embodiments, the anode active material may be an anode active material for batteries that is well known in the art. As examples, the anode active material may include at least one of the following materials: graphite (e.g., artificial graphite, natural graphite), soft carbon, hard carbon, intermediate phase carbon microspheres, carbon fibers, carbon nanotubes, silicon-based materials, tin-based materials, and lithium titanate. The silicon-based materials may be at least one selected from elemental silicon, silicon oxide, silicon carbon complexes, silicon nitrogen complexes, and silicon alloys. The tin-based materials can be at least one selected from elemental tin, tin-oxygen compounds and tin alloys. However, the present application is not limited to these materials, and other conventional materials that can be used as battery anode active materials may also be used. These anode active materials can be used alone or in combination of two or more.

In some embodiments, the anode film layer further optionally includes a binder. The binder may be at least one selected from styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the anode film layer may further optionally include a conductive agent. The conductive agent may be at least one selected from superconducting carbon, acetylene black, carbon black, Ketjen black, carbon dots, carbon nanotubes, graphene, and carbon nanofibers.

In some embodiments, the anode material layer includes the anode active material of artificial graphite, the conductive agent of acetylene black, and the binder of styrene-butadiene rubber (SBR).

In some embodiments, the anode material layer optionally also includes other additives, such as thickeners (e.g., sodium carboxymethyl cellulose (CMC-Na)), etc.

In some embodiments, the anode plate may be prepared by: dispersing the above components for preparing an anode plate, such as the anode active material, the conductive agent, the binder and any other components in a solvent (e.g., deionized water) to form an anode slurry; coating the anode slurry on the anode current collector, and after drying and cold pressing, the anode plate can be obtained.

[Separator]

In the secondary battery of the present application, the separator is disposed between the cathode and anode plates for separation. In this regard, the type of the separator is not specifically limited, and any well-known porous structure separator with good chemical stability and mechanical stability can be used. In some embodiments, the material of the separator may be at least one selected from glass fiber, nonwoven, polyethylene, polypropylene and polyvinylidene fluoride. The separator may be a single-layer membrane or a multi-layer composite membrane, without any particular limitation. Where the separator is a multi-layer composite membrane, the materials of the layers may be the same or different, with no particular limitations.

The secondary battery of the present application may be a lithium-ion battery.

The secondary battery of the present application may be prepared using conventional methods. In some embodiments, the cathode plate, the anode plate, and the separator may be made into an electrode assembly by a winding process or a laminating process. An exemplary preparation method includes:

Step 1: stacking a cathode plate, a separator, and an anode plate sequentially so that the separator is between the cathode and the anode plates, and then winding to obtain an electrode assembly; and Step 2: placing the electrode assembly in a secondary battery casing, drying, and injecting with electrolyte, and then the secondary battery is made after a chemical formation and resting process.

In some implementations, the secondary battery of the present application may include an outer packaging. The outer packaging may be used to encapsulate the above-mentioned electrode assembly and electrolyte.

In some implementations, the outer packaging of the secondary battery may be a hard casing, such as a hard plastic casing, aluminum casing, steel casing, etc. The outer packaging of the secondary battery may also be a soft pack, such as a pouch-type soft pack. The material of the soft pack may be plastic, exemplarily polypropylene, polybutylene terephthalate, and polybutylene succinate.

Figure 6:
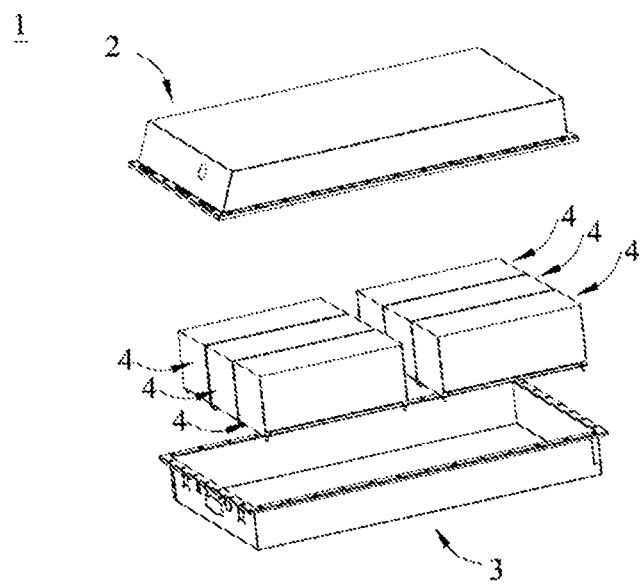
FIG. 6 is an exploded view of the battery pack of the embodiment of the present application shown in FIG. 5.

The shape of the secondary battery of the present application is not particularly limited, which may be cylindrical, square, or any other shape. For example, FIG. 6 shows as an example a secondary battery 5 with a square structure.

Figure 7:
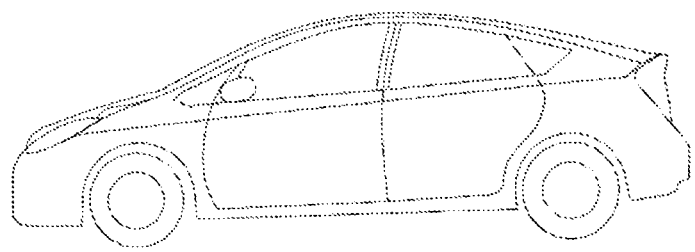
FIG. 7 is a schematic diagram of an electric device utilizing a secondary battery as a power source of an embodiment of the present application.

In some implementations, referring to FIG. 7, the outer packaging may include a casing 51 and a cover 53. The casing 51 may include a bottom plate and side plates connected to the bottom plate, the bottom plate and the side plates enclosing a receiving cavity. The casing 51 has an opening connected to the receiving cavity, and the cover 53 can be provided over the opening to close the receiving cavity. The cathode plate, the anode plate, and the separator may be wound or laminated to form an electrode assembly 52, which is encapsulated in the receiving cavity. An electrolyte is infiltrated into the electrode assembly 52. The number of electrode assemblies 52 contained in the secondary battery 5 may be one or more, which may be selected by a person skilled in the art according to specific practical needs.

In some implementations, the secondary battery can be assembled into a battery module, and the number of secondary batteries contained in the battery module can be one or more, with the specific number being selected by those skilled in the art based on the application and capacity of the battery module.

Figure 4:
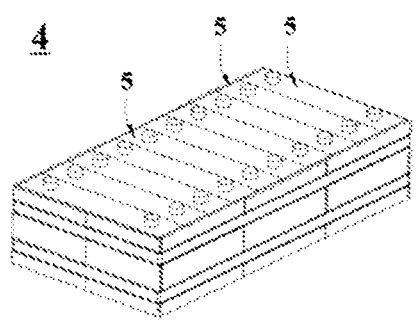
FIG. 4 is a schematic diagram of a battery module of an embodiment of the present application.

FIG. 4 shows, as an example, a battery module 4. Referring to FIG. 4, in the battery module 4, a plurality of secondary batteries 5 may be arranged sequentially along a length of the battery module 4. Of course, they can also be arranged in any other way. Further, the plurality of secondary batteries 5 may be secured by fasteners.

Optionally, the battery module 4 may also include a housing having an accommodating space in which a plurality of secondary batteries 5 are accommodated.

In some implementations, the above battery modules may also be assembled into a battery pack, and the number of battery modules contained in the battery pack can be one or more, the specific number of which can be selected by a person skilled in the art according to the application and capacity of the battery pack.

Figure 5:
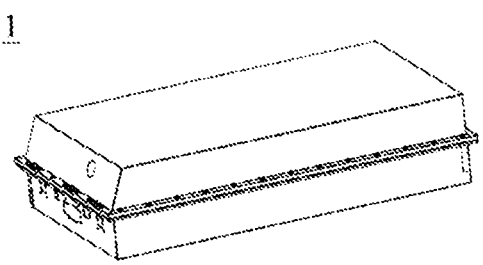
FIG. 5 is a schematic diagram of a battery pack of an embodiment of the present application.

FIGS. 5 and 6 show, as an example, a battery pack 1. Referring to FIGS. 5 and 6, the battery pack 1 may include a battery container and a plurality of battery modules 4 disposed in the battery container. The battery container includes an upper container body 2 and a lower container body 3, and the upper container body 2 is able to be covered on the lower container body 3 and form an enclosed space for accommodating the battery modules 4. A plurality of battery modules 4 can be arranged in the battery container in any manner.

Further, the present application provides an electric device, and the electric device includes the secondary battery, the battery module, or the battery pack provided in the present application. The secondary battery, the battery module, or the battery pack may be used as a power source for the electric device or may be used as an energy storage unit for the electric device. The electric device may be selected from, but not limited to, mobile devices (e.g., cell phones, laptops, etc.), electric vehicles (e.g., pure electric vehicles, hybrid electric vehicles, plug-in hybrid electric vehicles, electric bicycles, electric scooters, electric golf carts, electric trucks, etc.), electric trains, ships and satellites, energy storage systems, etc. As an electric device, the secondary battery, the battery module or the battery pack may be selected according to application needs.

FIG. 7 shows as an exemplary electric device. The electric device is a pure electric vehicle, a hybrid electric vehicle, or a plug-in hybrid electric vehicle, etc. To meet the high power and high energy density requirements of the secondary battery for this electric device, a battery pack or battery module may be used.

As another example the device may be a cell phone, tablet, laptop, etc. The device usually requires thinness and lightness and may employ a secondary battery as a power source.

EXAMPLES

Hereinafter, examples of the present application are described. The examples described below are exemplary and are intended to explain the present application only and are not to be construed as limiting the present application. Where specific techniques or conditions are not indicated in the examples, the techniques or conditions described in the literature in the art or in accordance with the product specification are followed. Where the reagents or instruments used are not specified as manufacturers, they are conventional products that can be obtained.

The sources of raw materials used in examples of the present application are as follows:

| Name | Chemical formula | Manufacturer | Specification |
|---|---|---|---|
| Manganese carbonate | $MnCO_3$ | Shandong West Asia Chemical Industry Co. | 1 Kg |
| Lithium carbonate | $Li_2CO_3$ | Shandong West Asia Chemical Industry Co. | 1 Kg |
| Magnesium carbonate | $MgCO_3$ | Shandong West Asia Chemical Industry Co. | 1 Kg |
| Zinc carbonate | $ZnCO_3$ | Wuhan Xinru Chemical Co. | 25 Kg |
| Ferrous carbonate | $FeCO_3$ | Xi'an Lanzhiguang Fine Material Co. | 1 Kg |
| Nickel Sulfate | $NiCO_3$ | Shandong West Asia Chemical Industry Co. | 1 Kg |
| Titanium sulfate | $Ti(SO_4)_2$ | Shandong West Asia Chemical Industry Co. | 1 Kg |
| Cobalt Sulfate | $CoSO_4$ | Xiamen Zhixin Chemical Co. | 500 g |
| Vanadium dichloride | $VCl_2$ | Shanghai Jinjinle Industrial Co. | 1 Kg |
| Oxalic acid dihydrate | $C_2H_2O_4 \cdot 2H_2O$ | Shanghai Jinjinle Industrial Co. | 1 Kg |
| Ammonium dihydrogen phosphate | $NH_4H_2PO_4$ | Shanghai Cheng Shao Biotechnology Co. | 500 g |
| Sucrose | $C_{12}H_{22}O_{11}$ | Shanghai Yuanye Biotechnology Co. | 100 g |
| Dilute sulfuric acid | $H_2SO_4$ | Shenzhen Haishian Biotechnology Co. | Mass fraction 60% |
| Dilute nitric acid | $HNO_3$ | Anhui Lingtian Fine Chemical Co. | Mass fraction 60% |
| Silicic acid | $H_2SiO_3$ | Shanghai Yuanye Biotechnology Co. | 100 g, mass fraction 99.8% |

I. Preparation of Battery

Example 1

Step 1: Preparation of Cathode Active Material
Step S1: Preparation of Fe, Co, and V Co-Doped Manganese Oxalate 689.6 g of manganese carbonate, 455.27 g of ferrous carbonate, 4.65 g of cobalt sulfate and 4.87 g of vanadium dichloride were thoroughly mixed in a mixer for 6 hrs. The mixture was transferred to a reactor and 5 L of deionized water and 1260.6 g of oxalic acid dihydrate were added. The reactor was heated to 80° C. and thoroughly stirred at 500 rpm for 6 hrs until the reaction was terminated and no bubbles were generated to obtain a suspension of Fe, Co, and V co-doped manganese oxalate. Then the suspension was filtered and dried at 120° C., after which it was ground to obtain manganese oxalate dihydrate particles with a particle size of 100 nm.

Step S2: Preparation of $Li_{0.997}Mn_{0.60}Fe_{0.393}V_{0.004}Co_{0.003}P_{0.997}S_{0.003}O_4$ Cores 1793.1 g of manganese oxalate prepared in (1), 368.3 g of lithium carbonate, 1146.6 g of ammonium dihydrogen phosphate, and 4.9 g of dilute sulfuric acid were added to 20 L of deionized water, stirred thoroughly, and mixed well and allowed to react at 80° C. for 10 hrs to obtain a slurry. The slurry was transferred to a spray drying equipment for spray drying and granulation at 250° C. to obtain powder. The powder was sintered in a roller kiln at 700° C. for 4 hrs in a protective atmosphere (90% nitrogen and 10% hydrogen) to obtain the above-mentioned core material.

Step S3: Preparation of the First Coating Layer Suspension

To prepare a $Li_2FeP_2O_7$ solution, 7.4 g of lithium carbonate, 11.6 g of ferrous carbonate, 23.0 g of ammonium dihydrogen phosphate, and 12.6 g of oxalic acid dihydrate were dissolved in 500 mL of deionized water at a controlled pH of 5, and then stirred and reacted at room temperature for 2 hrs to obtain the solution, after which the solution was heated up to 80° C. and held at this temperature for 4 hrs to obtain the first coating layer suspension.

Step S4: Coating of the First Coating Layer 1571.9 g of the doped lithium manganese phosphate core material obtained in step S2 was added to the first coating layer suspension (with a coating substance content of 15.7 g) obtained in step S3, mixed with sufficient stirring for 6 hrs, and after mixing well, transferred to an oven at 120° C. for drying for 6 hrs, and then sintered at 650° C. for 6 hrs to obtain the pyrophosphate coated material.

Step S5: Preparation of the Second Coating Layer Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, then stirred and reacted for 6 hrs to obtain a solution, after which the solution was heated up to 120° C. and held at this temperature for 6 hrs to obtain a second coating layer suspension.

Step S6: Coating of the Second Coating Layer 1586.8 g of the pyrophosphate coated material obtained in step S4 was added to the second coating layer suspension (with a coating substance content of 47.1 g) obtained in step S5, mixed with sufficient stirring for 6 hrs, and after mixing well, transferred to an oven at 120° C. for drying for 6 hrs, and then sintered at 700° C. for 8 hrs to obtain a two-layer-coated material.

Step S7: Preparation of the Aqueous Solution of the Third Coating Layer 37.3 g of sucrose was dissolved in 500 g of deionized water, then stirred to dissolve thoroughly to obtain an aqueous sucrose solution.

Step S8: Coating of the Third Coating Layer 1633.9 g of the two-layer-coated material obtained in step S6 was added to the sucrose solution obtained in step S7, stirred and mixed together for 6 hrs, and after mixing well, transferred to an oven at 150° C. for drying for 6 hrs, and then sinter at 700° C. for 10 hrs to obtain a three-layer-coated material.

Step 2: Preparation of Cathode Plate

The above-prepared three-layer coated cathode active material, a conductive agent of acetylene black, and a binder of polyvinylidene fluoride (PVDF) were added to N-methylpyrrolidone (NMP) in the ratio of 97.0:1.2:1.8 by weight, stirred and mixed well to obtain a cathode slurry. Then the cathode slurry was uniformly coated on an aluminum foil according to 0.280 g/1540.25 mm$^2$, dried, cold pressed, and slit to obtain a cathode plate.

Step 3: Preparation of Anode Plate

An anode active substance of artificial graphite, hard carbon, a conductive agent of acetylene black, a binder of styrene butadiene rubber (SBR), and a thickener of sodium carboxymethyl cellulose (CMC) were dissolved in a solvent of deionized water according to the weight ratio of 90:5:2:2:1, mixed well and prepared into an anode slurry. The anode slurry was uniformly coated on an anode current collector of copper foil according to 0.117 g/1540.25 mm$^2$, and an anode plate was obtained after drying, cold pressing and slitting.

Step 4: Preparation of Electrolyte

In an argon atmosphere glove box (H$_2$O<0.1 ppm, θ2<0.1 ppm), as an organic solvent, ethylene carbonate (EC)/methylene carbonate (EMC) was mixed well in a volume ratio of 3/7, and 12.5 wt % (with respect to a weight of the ethylene carbonate/methylene carbonate solvent) LiPF$_6$ was added to dissolve in the above organic solvent and stirred well to obtain an electrolyte.

Step 5: Preparation of Separator

Commercially available PP-PE copolymer microporous films with a thickness of 20 μm and an average pore size of 80 nm (from Tricor Electronics Technology, model 20) were used.

Step 6: Preparation of Full Battery

The cathode plate, the separator and the anode plate obtained above were stacked in order, so that separator was disposed between the cathode and anode plates for isolation, and the bare battery was obtained by winding. The bare battery was placed in an outer packaging, filled with the above electrolyte, and encapsulated to obtain a full battery (also referred to as "full cell" hereinafter).

[Preparation of Button Battery]

The above-prepared cathode active material, polyvinylidene fluoride (PVDF), and acetylene black were added to N-methylpyrrolidone (NMP) in a weight ratio of 90:5:5 and stirred in a drying room to make a slurry. The above slurry was coated on an aluminum foil, dried and cold pressed to form a cathode plate. The coating amount was 0.02 g/cm$^2$, and the compaction density was 2.0 g/cm$^3$.

A lithium plate was used as the anode, and a solution of 1 mol/L LiPF$_6$ in ethylene carbonate (EC), diethyl carbonate (DEC), and dimethyl carbonate (DMC) at a volumetric ratio of 1:1:1 was used as the electrolyte, which was assembled with the above prepared cathode plate in a button cell container to form a button battery (also referred to as "button cell" hereinafter).

Examples 2 to 27 and Comparative Examples 1 to 19

The cathode active materials and batteries in Examples 2 to 27 and Comparative Examples 1 to 19 were prepared in a similar manner to Example 1, with the differences in the preparation of the cathode active materials referred to in Tables 1 to 6, where in Comparative Examples 1-2, 4-10, and 12, the first layer was not coated and therefore steps S3 and S4 were not included; and in Comparative Examples 1-11, the second layer was not coated and therefore steps S5-S6 were not included.

Note: In all Examples and Comparative Examples of the present application, where not indicated, the first coating substance and/or second coating substance used is by default in the crystalline state.

TABLE 1

Raw materials for the preparation of cores.

| Number | Core | Raw materials used in step S1 | Raw materials used in step S2 |
|---|---|---|---|
| Comparative Example 1 and Comparative Example 13 | LiMnPO$_4$ | Manganese carbonate, 1149.3 g; water, 5 L; oxalic acid dihydrate, 1260.6 g; | Manganese oxalate dihydrate (as C$_2$O$_4$Mn•2H$_2$O) obtained in step S1, 1789.6 g; lithium carbonate, 369.4 g; ammonium dihydrogen phosphate, 1150.1 g; water, 20 L |

TABLE 1-continued

Raw materials for the preparation of cores.

| Number | Core | Raw materials used in step S1 | Raw materials used in step S2 |
|---|---|---|---|
| Comparative Example 2 | $LiMn_{0.60}Fe_{0.40}PO_4$ | Manganese carbonate, 689.6 g; ferrous carbonate, 463.4 g; water, 5 L; oxalic acid dihydrate, 1260.6 g; | Ferromanganese oxalate dihydrate (as $C_2O_4Mn_{0.60}Fe_{0.40} \cdot 2H_2O$) obtained in step S1, 1793.2 g; lithium carbonate, 369.4 g; ammonium dihydrogen phosphate, 1150.1 g; water, 20 L |
| Comparative Example 3 | $LiMn_{0.80}Fe_{0.20}PO_4$ | Manganese carbonate, 919.4 g; ferrous carbonate, 231.7 g; water, 5 L; oxalic acid dihydrate, 1260.6 g; | Ferromanganese oxalate dihydrate (as $C_2O_4Mn_{0.80}Fe_{0.20} \cdot 2H_2O$) obtained in step S1, 1791.4 g; lithium carbonate, 369.4 g; ammonium dihydrogen phosphate, 1150.1 g; water, 20 L |
| Comparative Example 4 | $LiMn_{0.70}Fe_{0.295}V_{0.005}PO_4$ | Manganese carbonate, 804.5 g; ferrous carbonate, 341.8 g; vanadium dichloride, 6.1 g; water, 5 L; oxalic acid dihydrate, 1260.6 g; | Ferrovanadium manganese oxalate dihydrate (as $C_2O_4Mn_{0.70}Fe_{0.295}V_{0.005} \cdot 2H_2O$) obtained in step S1, 1792.0 g; lithium carbonate, 369.4 g; ammonium dihydrogen phosphate, 1150.1 g; water, 20 L |
| Comparative Example 5 and Comparative Example 15 | $LiMn_{0.60}Fe_{0.395}Mg_{0.005}PO_4$ | Manganese carbonate, 689.6 g; ferrous carbonate, 457.6 g; magnesium carbonate, 4.2 g; water, 5 L; oxalic acid dihydrate, 1260.6 g; | Manganese ferromanganese oxalate dihydrate (as $C_2O_4Mn_{0.60}Fe_{0.395}Mg_{0.005} \cdot 2H_2O$) obtained in step S1, 1791.6 g; lithium carbonate, 369.4 g; ammonium dihydrogen phosphate, 1150.1 g; water, 20 L |
| Comparative Example 6 | $LiMn_{0.60}Fe_{0.35}Ni_{0.05}PO_4$ | Manganese carbonate, 689.6 g; ferrous carbonate, 405.4 g; nickel carbonate, 59.3 g; water, 5 L; oxalic acid dihydrate, 1260.6 g; | Ferronickel manganese oxalate dihydrate (as $C_2O_4Mn_{0.60}Fe_{0.35}Ni_{0.05} \cdot 2H_2O$) obtained in step S1, 1794.6 g; lithium carbonate, 369.4 g; ammonium dihydrogen phosphate, 1150.1 g; water, 20 L |
| Comparative Example 7 and Comparative Example 9 | $LiMn_{0.60}Fe_{0.395}V_{0.002}Ni_{0.003}PO_4$ | Manganese carbonate, 689.6 g; ferrous carbonate, 457.6 g; vanadium dichloride, 2.4 g; nickel carbonate, 3.6 g; water, 5 L; oxalic acid dihydrate, 1260.6 g; | Manganese iron vanadium nickel dihydrate oxalate (as $C_2O_4Mn_{0.60}Fe_{0.395}V_{0.002}Ni_{0.003} \cdot 2H_2O$) obtained in step S1, 1793.2 g; lithium carbonate, 369.4 g; ammonium dihydrogen phosphate, 1150.1 g; water, 20 L |
| Comparative Example 8 | $LiMn_{0.60}Fe_{0.395}V_{0.002}Mg_{0.003}PO_4$ | Manganese carbonate, 689.6 g; ferrous carbonate, 457.6 g; vanadium dichloride, 2.4 g; magnesium carbonate, 2.53 g; water, 5 L; oxalic acid dihydrate, 1260.6 g; | Magnesium manganese iron vanadium oxalate dihydrate (as $C_2O_4Mn_{0.60}Fe_{0.395}V_{0.002}Mg_{0.003} \cdot 2H_2O$) obtained in step S1, 1792.1 g; lithium carbonate, 369.4 g; ammonium dihydrogen phosphate, 1150.1 g; water, 20 L |
| Comparative Examples 10-12, Comparative Examples 16-17 and Examples 1-10 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt dihydrate oxalate (as $C_2O_4Mn_{0.60}Fe_{0.393}V_{0.004}Co_{0.003} \cdot 2H_2O$) obtained in step S1, 1793.1 g; lithium carbonate, 368.3 g; ammonium dihydrogen phosphate, 1146.6 g; dilute sulfuric acid, 4.9 g; water, 20 L |
| Comparative Example 14 | $Li_{1.2}MnP_{0.8}Si_{0.2}O_4$ | Manganese carbonate, 1149.3 g; water, 5 L; oxalic acid dihydrate, 1260.6 g; | Manganese oxalate dihydrate (as $C_2O_4Mn \cdot 2H_2O$) obtained in step S1, 1789.6 g; lithium carbonate, 443.3 g; ammonium dihydrogen phosphate, 920.1 g; silicate, 156.2 g; water, 20 L |
| Example 11 | $Li_{1.001}Mn_{0.60}Fe_{0.393}V_{0.004}Co_{0.003}P_{0.999}Si_{0.001}O_4$ | Manganese carbonate, 689.6 g; ferrous carbonate, 455.3 g; cobalt sulfate, 4.7 g; | Manganese iron vanadium cobalt dihydrate oxalate (as $C_2O_4Mn_{0.60}Fe_{0.393}V_{0.004}Co_{0.003} \cdot 2H_2O$) obtained in step S1, 1793.1 g; lithium carbonate, 369.8 g; ammonium |

TABLE 1-continued

Raw materials for the preparation of cores.

| Number | Core | Raw materials used in step S1 | Raw materials used in step S2 |
|---|---|---|---|
| | | vanadium dichloride, 4.9 g; water, 5 L; oxalic acid dihydrate, 1260.6 g; | dihydrogen phosphate, 1148.9 g; silicate, 0.8 g; water, 20 L |
| Example 12 | $LiMn_{0.60}Fe_{0.393}V_{0.004}Co_{0.003}P_{0.998}N_{0.002}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt dihydrate oxalate (as $C_2O_4Mn_{0.60}Fe_{0.393}V_{0.004}Co_{0.003} \cdot 2H_2O$) obtained in step S1, 1793.1 g; lithium carbonate, 369.4 g; ammonium dihydrogen phosphate, 1147.8 g; dilute nitric acid, 2.7 g; water, 20 L |
| Example 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g; | Manganese iron vanadium cobalt dihydrate oxalate (as $C_2O_4Mn_{0.65}Fe_{0.341}V_{0.004}Co_{0.005} \cdot 2H_2O$) obtained in step S1, 1792.7 g; lithium carbonate, 367.6 g; ammonium dihydrogen phosphate, 1144.3 g; dilute sulfuric acid, 8.2 g; water, 20 L |
| Example 14 | $Li_{1.002}Mn_{0.70}Fe_{0.293}V_{0.004}Co_{0.003}P_{0.998}Si_{0.002}O_4$ | Manganese carbonate, 804.6 g; ferrous carbonate, 339.5 g; cobalt sulfate, 4.7 g; vanadium dichloride, 4.9 g; water, 5 L; oxalic acid dihydrate, 1260.6 g; | Manganese iron vanadium cobalt dihydrate oxalate (as $C_2O_4Mn_{0.70}Fe_{0.293}V_{0.004}Co_{0.003} \cdot 2H_2O$) obtained in step S1, 1792.2 g; lithium carbonate, 370.2 g; 1147.8; silicate, 1.6 g; water, 20 L |
| Examples 15, 17 | $LiMn_{0.60}Fe_{0.393}V_{0.004}Co_{0.003}P_{0.999}N_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Manganese iron vanadium cobalt dihydrate oxalate (as $C_2O_4Mn_{0.60}Fe_{0.393}V_{0.004}Co_{0.003} \cdot 2H_2O$) obtained in step S1, 1793.1 g; lithium carbonate, 369.4 g; ammonium dihydrogen phosphate, 1148.9 g; dilute nitric acid, 1.4 g; water, 20 L |
| Example 16 | $Li_{0.997}Mn_{0.60}Fe_{0.393}V_{0.004}Co_{0.003}P_{0.997}S_{0.003}O_4$ | Manganesecarbonate, 689.6 g; ferrouscarbonate, 455.3 g; cobaltsulfate, 4.7 g; vanadiumdichloride, 4.9 g; water, 5 L; oxalicaciddihydrate, 1260.6 g; | Manganese iron vanadium cobalt dihydrate oxalate (as $C_2O_4Mn_{0.60}Fe_{0.393}V_{0.004}Co_{0.003} \cdot 2H_2O$) obtained in step S1, 1793.1 g; lithium carbonate, 368.7 g; ammonium dihydrogen phosphate, 1146.6 g; dilute sulfuric acid, 4.9 g; water, 20 L |
| Example 18 | $LiMn_{0.60}Fe_{0.393}V_{0.004}Mg_{0.003}P_{0.995}N_{0.005}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium manganese iron vanadium oxalate dihydrate (as $C_2O_4Mn_{0.60}Fe_{0.393}V_{0.004}Mg_{0.003} \cdot 2H_2O$) obtained in step S1, 1791.1 g; lithium carbonate, 369.4 g; ammonium dihydrogen phosphate, 1144.3 g; dilute nitric acid, 7.0 g; water, 20 L |
| Example 19 | $Li_{0.999}Mn_{0.60}Fe_{0.393}V_{0.004}Mg_{0.003}P_{0.999}S_{0.001}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium manganese iron vanadium oxalate dihydrate (as $C_2O_4Mn_{0.60}Fe_{0.393}V_{0.004}Mg_{0.003} \cdot 2H_2O$) obtained in step S1, 1791.1 g; lithium carbonate, 369.0 g; ammonium dihydrogen phosphate, 1148.9 g; dilute sulfuric acid, 1.6 g; water, 20 L |

TABLE 1-continued

Raw materials for the preparation of cores.

| Number | Core | Raw materials used in step S1 | Raw materials used in step S2 |
|---|---|---|---|
| Example 20 | $Li_{0.998}Mn_{0.60}Fe_{0.393}V_{0.004}Ni_{0.003}P_{0.998}S_{0.002}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Manganese iron vanadium nickel dihydrate oxalate (as $C_2O_4Mn_{0.60}Fe_{0.393}V_{0.004}Ni_{0.003} \cdot 2H_2O$) obtained in step S1, 1792.2 g; lithium carbonate, 368.7 g; ammonium dihydrogen phosphate, 1147.8 g; dilute sulfuric acid, 3.2 g; water, 20 L |
| Examples 21-24 | $Li_{1.001}Mn_{0.60}Fe_{0.393}V_{0.004}Ni_{0.003}P_{0.999}Si_{0.001}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Manganese iron vanadium nickel dihydrate oxalate (as $C_2O_4Mn_{0.60}Fe_{0.393}V_{0.004}Ni_{0.003} \cdot 2H_2O$) obtained in step S1, 1793.1 g; lithium carbonate, 369.8 g; ammonium dihydrogen phosphate, 1148.9 g; silicate, 0.8 g; water, 20 L |
| Example 25 | $Li_{1.001}Mn_{0.50}Fe_{0.493}V_{0.004}Ni_{0.003}P_{0.999}Si_{0.001}O_4$ | Manganese carbonate, 574.7 g; ferrous carbonate, 571.2 g; nickel carbonate, 3.6 g; vanadium dichloride, 4.9 g; water, 5 L; oxalic acid dihydrate, 1260.6 g; | Manganese iron vanadium nickel dihydrate oxalate (as $C_2O_4Mn_{0.50}Fe_{0.493}V_{0.004}Ni_{0.003} \cdot 2H_2O$) obtained in step S1, 1794.0 g; lithium carbonate, 369.8 g; ammonium dihydrogen phosphate, 1148.9 g; silicate, 0.8 g; water, 20 L |
| Example 26 | $Li_{1.001}Mn_{0.999}Fe_{0.001}P_{0.999}Si_{0.001}O_4$ | Manganese carbonate, 1148.2 g; ferrous carbonate, 1.2 g; water, 5 L; oxalic acid dihydrate, 1260.6 g; | Ferromanganese oxalate dihydrate (as $C_2O_4Mn_{0.999}Fe_{0.001} \cdot 2H_2O$) obtained in step S1, 1789.6 g; lithium carbonate, 369.8 g; ammonium dihydrogen phosphate, 1148.9 g; silicate, 0.8 g; water, 20 L |
| Example 27 | $LiMn_{0.60}Fe_{0.393}V_{0.004}Ni_{0.003}P_{0.9}N_{0.100}O_4$ | Manganese carbonate 689.6 g; ferrous carbonate, 455,3 g; nickel carbonate, 3.6 g; vanadium dichloride, 4.9 g; water, 5 L; oxalic acid dihydrate, 1260.6 g; | Manganese iron vanadium nickel dihydrate oxalate (as $C_2O_4Mn_{0.60}Fe_{0.393}V_{0.004}Ni_{0.003} \cdot 2H_2O$) obtained in step S1, 1793.1 g; lithium carbonate, 369.4 g; ammonium dihydrogen phosphate, 1035.1 g; dilute nitric acid, 140.0 g; water, 20 L |
| Example 28 | $Li_{1.001}Mn_{0.40}Fe_{0.593}V_{0.004}Ni_{0.003}P_{0.999}Si_{0.001}O_4$ | Manganese carbonate, 459.7 g; ferrous carbonate, 686.9 g; vanadium dichloride, 4.8 g; nickel carbonate, 3.6 g; water, 5 L; oxalic acid dihydrate, 1260.6 g; | Manganese iron vanadium nickel dihydrate oxalate (as $C_2O_4Mn_{0.40}Fe_{0.593}V_{0.004}Ni_{0.003} \cdot 2H_2O$) obtained in step S1, 1794.9 g; lithium carbonate, 369.8 g; ammonium dihydrogen phosphate, 1148.9 g; silicate, 0.8 g; water, 20 L |
| Example 29 | $Li_{1.001}Mn_{0.40}Fe_{0.393}V_{0.204}Ni_{0.003}P_{0.999}Si_{0.001}O_4$ | Manganese carbonate, 459.7 g; ferrous carbonate, 455.2 g; vanadium dichloride, 248.6 g; nickel carbonate, 3.6 g; water, 5 L; oxalic acid dihydrate, 1260.6 g; | Manganese iron vanadium nickel dihydrate oxalate (as $C_2O_4Mn_{0.40}Fe_{0.393}V_{0.204}Ni_{0.003} \cdot 2H_2O$) obtained in step S1, 1785.1 g; lithium carbonate, 369.8 g; ammonium dihydrogen phosphate, 1148.9 g; silicate, 0.8 g; water, 20 L |

TABLE 2

Preparation of the first coating layer suspension (step S3).

| Example No. | Substance of first coating layer | Preparation of the first coating layer suspension |
|---|---|---|
| Comparative Examples 3, 16 | Amorphous $Li_2FeP_2O_7$ | 7.4 g of lithium carbonate; 11.6 g of ferrous carbonate; 23.0 g of ammonium dihydrogen phosphate; 12.6 g of oxalic acid dihydrate; controlled pH 5 |
| Comparative Examples 11, 13-15, 17 and Examples 1-14, 19, 21-29 | Crystalline $Li_2FeP_2O_7$ | 7.4 g lithium carbonate; 11.6 g ferrous carbonate; 23.0 g ammonium dihydrogen phosphate; 12.6 g oxalic acid dihydrate; controlled pH 5 |
| Examples 15-16 | Crystalline $Al_4(P_2O_7)_3$ | 53.3 g aluminum chloride; 34.5 g ammonium dihydrogen phosphate; 18.9 g oxalic acid dihydrate; controlled pH 4 |
| Examples 17-18, 20 | Crystalline $Li_2NiP_2O_7$ | 7.4 g lithium carbonate; 11.9 g nickel carbonate; 23.0 g ammonium dihydrogen phosphate; 12.6 g oxalic acid dihydrate; controlled pH 5 |

TABLE 3

Coating of the first coating layer (Step S4).

| Number | Substance and amount of first coating layer (w.r.t. the core wight) | Amount of core added in step S4 | Amount of the corresponding coating substance in the first cladding layer suspension | Mixing time (h) | Drying Temperature (° C.) | Sintering Temperature (° C.) | Sintering time (h) |
|---|---|---|---|---|---|---|---|
| Comparative Example 3 | 2% amorphous $Li_2FeP_2O_7$ | 1570.4 g | 31.4 g | 6 | 120 | 500 | 4 |
| Comparative Example 11 | 1% crystalline $Li_2FeP_2O_7$ | 1571.1 g | 15.7 g | 6 | 120 | 650 | 6 |
| Comparative Example 13 | 2% crystalline $Li_2FeP_2O_7$ | 1568.5 g | 31.4 g | 6 | 120 | 650 | 6 |
| Comparative Example 14 | 2% crystalline $Li_2FeP_2O_7$ | 1562.8 g | 31.2 g | 6 | 120 | 650 | 6 |
| Comparative Example 15 | 2% crystalline $Li_2FeP_2O_7$ | 1570.6 g | 31.4 g | 6 | 120 | 650 | 6 |
| Comparative Example 16 | 2% amorphous $Li_2FeP_2O_7$ | 1571.1 g | 31.4 g | 6 | 120 | 500 | 4 |
| Comparative Example 17 | 2% crystalline $Li_2FeP_2O_7$ | 1571.1 g | 31.4 g | 6 | 120 | 650 | 6 |
| Examples 1-4, 8-10 | 1% $Li_2FeP_2O_7$ | 1571.9 g | 15.7 g | 6 | 120 | 650 | 6 |
| Example 5 | 2% $Li_2FeP_2O_7$ | 1571.9 g | 31.4 g | 6 | 120 | 650 | 6 |
| Example 6 | 3% $Li_2FeP_2O_7$ | 1571.1 g | 47.1 g | 6 | 120 | 650 | 6 |
| Example 7 | 5% $Li_2FeP_2O_7$ | 1571.9 g | 78.6 g | 6 | 120 | 650 | 6 |
| Example 11 | 1% $Li_2FeP_2O_7$ | 1572.1 g | 15.7 g | 6 | 120 | 650 | 6 |
| Example 12 | 1% $Li_2FeP_2O_7$ | 1571.7 g | 15.7 g | 6 | 120 | 650 | 6 |
| Example 13 | 2% $Li_2FeP_2O_7$ | 1571.4 g | 31.4 g | 6 | 120 | 650 | 6 |
| Example 14 | 2.5% $Li_2FeP_2O_7$ | 1571.9 g | 39.3 g | 6 | 120 | 650 | 6 |
| Example 15 | 2% $Al_4(P_2O_7)_3$ | 1571.9 g | 31.4 g | 6 | 120 | 680 | 8 |
| Example 16 | 3% $Al_4(P_2O_7)_3$ | 1571.9 g | 47.2 g | 6 | 120 | 680 | 8 |
| Example 17 | 1.5% $Li_2NiP_2O_7$ | 1571.9 g | 23.6 g | 6 | 120 | 630 | 6 |
| Example 18 | 1% $Li_2NiP_2O_7$ | 1570.1 g | 15.7 g | 6 | 120 | 630 | 6 |
| Example 19 | 2% $Li_2FeP_2O_7$ | 1571.0 g | 31.4 g | 6 | 120 | 650 | 6 |
| Example 20 | 1% $Li_2NiP_2O_7$ | 1571.9 g | 15.7 g | 6 | 120 | 630 | 6 |
| Examples 21-24 | 2% $Li_2FeP_2O_7$ | 1572.1 g | 31.4 g | 6 | 120 | 650 | 6 |

TABLE 3-continued

Coating of the first coating layer (Step S4).

| | | | Step S4: Coating of the first coating layer | | | | |
|---|---|---|---|---|---|---|---|
| Number | Substance and amount of first coating layer (w.r.t. the core wight) | Amount of core added in step S4 | Amount of the corresponding coating substance in the first cladding layer suspension | Mixing time (h) | Drying Temperature (° C.) | Sintering Temperature (° C.) | Sintering time (h) |
| Example 22 | 5.50% $Li_2FeP_2O_7$ | 1572.1 g | 86.5 g | 6 | 120 | 650 | 6 |
| Example 25 | 1% $Li_2FeP_2O_7$ | 1573.0 g | 15.7 g | 6 | 120 | 650 | 6 |
| Example 26 | 1% $Li_2FeP_2O_7$ | 1568.6 g | 15.7 g | 6 | 120 | 650 | 6 |
| Example 27 | 1% $Li_2FeP_2O_7$ | 1569.2 g | 15.7 g | 6 | 120 | 650 | 6 |
| Example 28 | 2% crystalline $Li_2FeP_2O_7$ | 1573.9 g | 31.4 g | 6 | 120 | 650 | 6 |
| Example 29 | 2% crystalline $Li_2FeP_2O_7$ | 1564.1 g | 31.2 g | 6 | 120 | 650 | 6 |

TABLE 4

Preparation of the second coating layer suspension (step S5).

| Number | Substance of second coating layer | Step S5: Preparation of the second coating layer suspension |
|---|---|---|
| Comparative Example 12, Examples 1-14, 18-19, 25-27 | Crystalline $LiFePO_4$ | 3.7 g lithium carbonate; 11.6 g ferrous carbonate; 11.5 g ammonium dihydrogen phosphate; 12.6 g oxalic acid dihydrate |
| Comparative Examples 13-16; Examples 15, 17, 20, 21-24, 28-29 | Crystalline $LiCoPO_4$ | 3.7 g lithium carbonate; 15.5 g cobalt sulfate; 11.5 g ammonium dihydrogen phosphate; 12.6 g oxalic acid dihydrate |
| Comparative Example 17 | Amorphous $LiCoPO_4$ | 3.7 g lithium carbonate; 15.5 g cobalt sulfate; 11.5 g ammonium dihydrogen phosphate; 12.6 g oxalic acid dihydrate |
| Example 16 | Crystalline $LiNiPO_4$ | 3.7 g lithium carbonate; 11.9 g nickel carbonate; 11.5 g ammonium dihydrogen phosphate; 12.6 g oxalic acid dihydrate |

TABLE 5

Coating of the second coating layer (step S6).

| | | Amount of | Step S6: Coating of the second coating layer | | | | |
|---|---|---|---|---|---|---|---|
| Number | Substance and amount of second coating layer (w.r.t. the core wight) | pyrophosphatecoated material added in step S6 (the amount of core added in Comparative Example 12) (g) | Amount of corresponding coating substance in the second coating layer suspension (g) | Mixing time (h) | Drying temperature (° C.) | Sintering temperature (° C.) | Sintering time |
| Comparative Example 12 | 3% $LiFePO_4$ | 1571.1 | 47.1 | 6 | 120 | 700 | 8 |
| Comparative Example 13 | 4% $LiCoPO_4$ | 1599.9 | 62.7 | 6 | 120 | 750 | 8 |
| Comparative Example 14 | 4% $LiCoPO_4$ | 1594.0 | 62.5 | 6 | 120 | 750 | 8 |
| Comparative Example 15 | 4% $LiCoPO_4$ | 1602.0 | 62.8 | 6 | 120 | 750 | 8 |
| Comparative Example 16 | 4% $LiCoPO_4$ | 1602.5 | 62.8 | 6 | 120 | 750 | 8 |
| Comparative Example 17 | 4% amorphous $LiCoPO_4$ | 1602.5 | 62.8 | 6 | 120 | 650 | 8 |

TABLE 5-continued

Coating of the second coating layer (step S6).

| Number | Substance and amount of second coating layer (w.r.t. the core wight) | Amount of pyrophosphatecoated material added in step S6 (the amount of core added in Comparative Example 12) (g) | Step S6: Coating of the second coating layer | | | | |
|---|---|---|---|---|---|---|---|
| | | | Amount of corresponding coating substance in the second coating layer suspension (g) | Mixing time (h) | Drying temperature (° C.) | Sintering temperature (° C.) | Sintering time |
| Examples 1-4 | 3% LiFePO$_4$ | 1586.8 | 47.1 | 6 | 120 | 700 | 8 |
| Example 5 | 3% LiFePO$_4$ | 1602.5 | 47.1 | 6 | 120 | 700 | 8 |
| Example 6 | 3% LiFePO$_4$ | 1618.2 | 47.1 | 6 | 120 | 700 | 8 |
| Example 7 | 3% LiFePO$_4$ | 1649.6 | 47.1 | 6 | 120 | 700 | 8 |
| Example 8 | 1% LiFePO$_4$ | 1586.8 | 15.7 | 6 | 120 | 700 | 8 |
| Example 9 | 4% LiFePO$_4$ | 1586.8 | 62.8 | 6 | 120 | 700 | 8 |
| Example 10 | 5% LiFePO$_4$ | 1586.8 | 78.6 | 6 | 120 | 700 | 8 |
| Example 11 | 2.50% LiFePO$_4$ | 1587.8 | 39.3 | 6 | 120 | 700 | 8 |
| Example 12 | 3% LiFePO$_4$ | 1587.4 | 47.2 | 6 | 120 | 700 | 8 |
| Example 13 | 2% LiFePO$_4$ | 1602.8 | 31.4 | 6 | 120 | 700 | 8 |
| Example 14 | 3.50% LiFePO$_4$ | 1610.5 | 55.0 | 6 | 120 | 700 | 8 |
| Example 15 | 2.5% LiCoPO$_4$ | 1603.3 | 39.3 | 6 | 120 | 750 | 8 |
| Example 16 | 3% LiNiPO$_4$ | 1619.0 | 47.2 | 6 | 120 | 680 | 8 |
| Example 17 | 2.5% LiCoPO$_4$ | 1595.5 | 39.3 | 6 | 120 | 750 | 8 |
| Example 18 | 3% LiFePO$_4$ | 1585.9 | 47.1 | 6 | 120 | 700 | 8 |
| Example 19 | 4% LiFePO$_4$ | 1602.4 | 62.8 | 6 | 120 | 700 | 8 |
| Example 20 | 3% LiCoPO$_4$ | 1587.7 | 47.2 | 6 | 120 | 750 | 8 |
| Example 21 | 4% LiCoPO$_4$ | 1603.5 | 62.9 | 6 | 120 | 750 | 8 |
| Example 22 | 4% LiCoPO$_4$ | 1658.6 | 62.9 | 6 | 120 | 750 | 8 |
| Example 23 | 5.50% LiCoPO$_4$ | 1603.5 | 86.5 | 6 | 120 | 750 | 8 |
| Example 24 | 4% LiCoPO$_4$ | 1603.5 | 62.9 | 6 | 120 | 750 | 8 |
| Example 25 | 3% LiFePO$_4$ | 1588.7 | 47.2 | 6 | 120 | 700 | 8 |
| Example 26 | 3% LiFePO$_4$ | 1584.3 | 47.1 | 6 | 120 | 700 | 8 |
| Example 27 | 3% LiFePO$_4$ | 1584.9 | 47.1 | 6 | 120 | 700 | 8 |
| Example 28 | 4% LiCoPO$_4$ | 1605.4 | 63.0 | 6 | 120 | 750 | 8 |
| Example 29 | 4% LiCoPO$_4$ | 1605.4 | 63.0 | 6 | 120 | 750 | 8 |

TABLE 6

Coating of the third coating layer (step S8).

| | Third coating layer | SP2 to SP3 molar ratio | Amount of two-layer-coated material added in step S8 (amount of core added in Comparative Examples 1-2 and 4-10, and amount of first-layer-coated material added in Comparative Example 11) (g) | Step S8: Coating of the third coating layer | | | | |
|---|---|---|---|---|---|---|---|---|
| | | | | Amount of sucrose (g) | Mixing time (h) | Drying temperature (° C.) | Sintering temperature (° C.) | Sintering time (h) |
| Comparative Example 1 | 1% carbon | 2.5 | 1568.5 | 37.3 | 6 | 150 | 650 | 8 |
| Comparative Example 2 | 2% carbon | 2.8 | 1572.2 | 74.7 | 6 | 150 | 680 | 8 |
| Comparative Example 3 | 2% carbon | 2.7 | 1601.8 | 74.6 | 6 | 150 | 680 | 7 |
| Comparative Example 4 | 1% carbon | 2.4 | 1571.0 | 37.3 | 6 | 150 | 630 | 8 |
| Comparative Example 5 | 1.5% carbon | 2.6 | 1570.6 | 56.0 | 6 | 150 | 650 | 7 |
| Comparative Example 6 | 2.5% carbon | 2.8 | 1573.6 | 93.4 | 6 | 150 | 680 | 8 |
| Comparative Example 7 | 1% carbon | 2.7 | 1572.2 | 37.3 | 6 | 150 | 680 | 7 |
| Comparative Example 8 | 1.5% carbon | 2.9 | 1571.1 | 56.0 | 6 | 150 | 680 | 10 |

TABLE 6-continued

Coating of the third coating layer (step S8).

| | Third coating layer | SP2 to SP3 molar ratio | Amount of two-layer-coated material added in step S8 (amount of core added in Comparative Examples 1-2 and 4-10, and amount of first-layer-coated material added in Comparative Example 11) (g) | Step S8: Coating of the third coating layer | | | | |
|---|---|---|---|---|---|---|---|---|
| | | | | Amount of sucrose (g) | Mixing time (h) | Drying temperature (° C.) | Sintering temperature (° C.) | Sintering time (h) |
| Comparative Example 9 | 1% carbon | 2.2 | 1572.2 | 37.3 | 6 | 150 | 600 | 8 |
| Comparative Example 10 | 1% carbon | 2.4 | 1571.1 | 37.3 | 6 | 150 | 630 | 8 |
| Comparative Example 11 | 1% carbon | 2.3 | 1586.8 | 37.3 | 6 | 150 | 620 | 8 |
| Comparative Example 12 | 1% carbon | 2.1 | 1618.2 | 37.3 | 6 | 150 | 600 | 6 |
| Comparative Example 13 | 1% carbon | 2 | 1662.6 | 37.3 | 6 | 120 | 600 | 6 |
| Comparative Example 14 | 1% carbon | 1.8 | 1656.5 | 37.1 | 6 | 120 | 600 | 6 |
| Comparative Example 15 | 1% carbon | 1.7 | 1664.8 | 37.3 | 6 | 100 | 600 | 6 |
| Comparative Example 16 | 1% carbon | 3.1 | 1665.4 | 37.3 | 6 | 150 | 700 | 10 |
| Comparative Example 17 | 1% carbon | 3.5 | 1665.4 | 37.3 | 6 | 150 | 750 | 10 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% carbon | 2.4 | 1634.6 | 74.7 | 6 | 150 | 630 | 8 |
| Example 13 | 2% carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

Examples 28-40: Examination of Other Coating Layer Substances

Examples 28 to 40 were carried out in a similar manner to that in Example 1, with the differences described in Tables 7 and 8.

TABLE 7

Examination of the first coating layer substance.

| No. | Substance of first coating layer | Preparation of first coating layer suspension |
|---|---|---|
| Example 28 | $Li_2MgP_2O_7$ | 7.4 g lithium carbonate; 8.4 g magnesium carbonate; 23.0 g ammonium dihydrogen phosphate; 12.6 g oxalic acid dihydrate |
| Example 29 | $Li_2CoP_2O_7$ | 7.4 g lithium carbonate, 15.5 g cobalt sulfate; 23.0 g ammonium dihydrogen phosphate; 12.6 g oxalic acid dihydrate |
| Example 30 | $Li_2CuP_2O_7$ | 7.4 g lithium carbonate, 16.0 g copper sulfate; 23.0 g ammonium dihydrogen phosphate; 12.6 g oxalic acid dihydrate |
| Example 31 | $Li_2ZnP_2O_7$ | 7.4 g lithium carbonate, 12.5 g zinc carbonate; 23.0 g ammonium dihydrogen phosphate; 12.6 g oxalic acid dihydrate |
| Example 32 | $TiP_2O_7$ | 24.0 g of titanium sulfate, 23.0 g of ammonium dihydrogen phosphate; 12.6 g of oxalic acid dihydrate |
| Example 33 | $Ag_4P_2O_7$ | 67.9 g of silver nitrate, 23.0 g of ammonium dihydrogen phosphate and 25.2 g of oxalic acid dihydrate |
| Example 34 | $ZrP_2O_7$ | 56.6 g zirconium sulfate, 23.0 g ammonium dihydrogen phosphate and 25.2 g oxalic acid dihydrate |

TABLE 8

Examination of the second coating layer substance.

| No. | Substance of second coating layer | Preparation of second coating layer suspension |
|---|---|---|
| Example 35 | $Cu_3(PO_4)_2$ | 48.0 g copper sulfate; 23.0 g ammonium dihydrogen phosphate; 37.8 g oxalic acid dihydrate |
| Example 36 | $Zn_3(PO_4)_2$ | 37.6 g zinc carbonate; 23.0 g ammonium dihydrogen phosphate; 37.8 g oxalic acid dihydrate |
| Example 37 | $Ti_3(PO_4)_4$ | 72.0 g of titanium sulfate; 46.0 g of ammonium dihydrogen phosphate; 75.6 g of oxalic acid dihydrate |
| Example 38 | $Ag_3PO_4$ | 50.9 g silver nitrate; 11.5 g ammonium dihydrogen phosphate; 18.9 g oxalic acid dihydrate |
| Example 39 | $Zr_3(PO_4)_4$ | 85.0 g zirconium sulfate; 46.0 g of ammonium dihydrogen phosphate; 37.8 g oxalic acid dihydrate |
| Example 40 | $AlPO_4$ | 13.3 g aluminum chloride; 11.5 g ammonium dihydrogen phosphate; 18.9 g oxalic acid dihydrate |

II. Performance Evaluation

1. Test Method for Lattice Change Rate:

The samples of the cathode active material were placed in XRD (model type: Bruker D8 Discover) at a constant temperature of 25° C. and were tested at 1°/minute, and the test data were compiled and analyzed, and the lattice constants a0, b0, c0 and v0 were calculated at this time with reference to standard PDF cards (a0, b0 and c0 indicate the length on each aspect of the unit cell, and v0 indicates the unit cell volume, which can be directly obtained by XRD refinement results).

Using the method of preparing button battery in the above-mentioned examples, the samples of cathode active material were prepared into button batteries, and the button batteries were charged at a small rate of 0.05 C until the current was reduced to 0.01 C. Then the cathode plates in the button batteries were removed and soaked in dimethyl carbonate (DMC) for 8 hrs, and were dried and scraped to obtain powder, and particles with particle size less than 500 nm were screened out. Samples were taken and their lattice constants v1 were calculated in the same manner as the fresh samples tested above, and (v0−v1)/v0×100% as their lattice change rates before and after complete lithium deintercalation and intercalation were shown in the table.

2. Li/Mn-Antisite-Defect Concentration

The XRD results from the "Test method for lattice change rate" were compared with the PDF (Powder Diffraction File) card of the standard crystal to obtain the Li/Mn-antisite-defect concentration. Specifically, the XRD results from the "Test method for of lattice change rate" were imported into the General Structural Analysis System (GSAS) software, and the refinement results, which contain the occupancy of different atoms, were automatically obtained, and the Li/Mn-antisite-defect concentrations were obtained by reading the refinement results.

3. Compaction Density 5 g of the above-prepared cathode active material powder was placed in a special mold for compaction (CARVER mold, model type of 13 mm, USA), then the mold was placed on a compaction density apparatus. A pressure of 3 T was applied, the thickness of the powder under pressure was read on the apparatus (the thickness after unloading), and the compaction density was calculated by ρ=m/v, in which the area of the container used for testing is 1540.25 mm².

4. 3 C Charging Constant Current Ratio

At a constant temperature of 25° C., the fresh full batteries prepared by the respective Examples and Comparative Examples were left for 5 minutes, discharged to 2.5 V at ⅓C, left for 5 minutes, charged to 4.3 V at ⅓C, and then charged at a constant voltage of 4.3 V until the current was less than or equal to 0.05 mA and left for 5 minutes, the charging capacity being recorded as C0, discharged to 2.5 V at ⅓C and left for 5 minutes, and then charged to 4.3 V at 3 C and left for 5 minutes, the charging capacity being recorded as C1. The constant current ratio of 3 C charging was C1/C0×100%.

The higher the 3 C charging constant current ratio, the better the rate performance of the secondary battery.

5. Transition Metal Mn (and Mn Site-Doping Fe) Exsolution Test

The full cells prepared in the respective Examples and Comparative Examples were discharged to a cut-off voltage of 2.0 V at a rate of 0.1 C. The cells were then disassembled, the anode plates were removed, and 30 discs per unit area (1540.25 mm²) were randomly taken from the anode plate and tested by inductively coupled plasma emission spectroscopy (ICP) using an Agilent ICP-OES730. The amount of Fe (if the Mn site of the cathode active material was doped with Fe) and Mn were calculated from the ICP results, and thus the exsolution amount of Mn (and Mn site-doping Fe) after the cycles were calculated. The test standard was based on EPA-6010D-2014.

6. Surface Oxygen Valence State 5 g of an above-prepared cathode active material sample was taken and prepared into a button battery according to the preparation method for the button battery described in the above examples. The button battery was charged at a small rate of 0.05 C until the current was reduced to 0.01 C. Then the cathode plate was removed from the button battery and soaked in DMC for 8 hrs, and was dried, scraped to obtain powder, and the particles with particle size less than 500 nm were screened out. The resulting particles were measured by electron energy loss spectroscopy (EELS, the model type of instrument used was Talos F200S) to obtain the energy loss near edge structure (ELNES), which reflected the density of states and energy level distribution of the elements. Based on the density of states and energy level distribution, the number of occupied electrons was calculated by integrating the valence band density of states data to derive the valence state of the surface oxygen after charging.

7. Measurement of Manganese and Phosphorus Elements in Cathode Active Material 5 g of the above-mentioned cathode active material was dissolved in 100 ml of inverse aqua regia (concentrated hydrochloric acid: concentrated nitric acid=1:3) (concentration of concentrated hydrochloric acid ~37%, concentration of concentrated nitric acid ~65%), the content of each element of the solution was tested using ICP, then the content of manganese and phosphorus elements was measured and converted (amount of manganese element or phosphorus element/amount of cathode active material*100%) to obtain its weight percentage.

8. Measurement of Initial Gram Capacity of the Button Cells

At 2.5-4.3 V, the button cells were charged to 4.3 V at 0.1 C, then charged at constant voltage at 4.3 V until the current was less than or equal to 0.05 mA, left for 5 minutes, then discharged to 2.0 V at 0.1 C, at which time the discharged capacity was the initial gram capacity, and was recorded as D0.

9. Full Battery Expansion Test after 30 Days at 60° C.

The full batteries were stored under the 100% state of charge (SOC) at 60° C. The open circuit voltage (OCV) and AC internal impedance (IMP) of the batteries were measured before, during and after storage to monitor the SOC, and the volume of the batteries was measured. In which the full batteries were removed after every 48 hrs of storage, the open circuit voltage (OCV) and internal impedance (IMP) were tested after standing for 1 hr, and the battery volume was measured by the water displacement method after cooling to room temperature. The water displacement method that is, first the gravity $F_1$ of a battery was measured using a balance that automatically performs unit conversion on the dial data, then the battery was completely immersed in deionized water (density was known to be 1 g/cm³), the gravity F2 of the battery at this point was measured, the buoyancy $F_{buoyancy}$ of the battery was thus $F_1-F_2$, and then according to Archimedes' principle $F_{buoyancy}=\rho \times g \times V_{displaced}$, the battery volume $V=(F_1-F_2)/(\rho \times g)$.

From the OCV and IMP test results, the batteries in the examples always maintained more than 99% SOC during this experiment until the end of storage.

After 30 days of storage, the volume of the batteries was measured and the percentage increase in volume of the batteries after storage was calculated relative to the volume of the batteries before storage.

10. Full Battery Cycle Performance Test at 45° C.

The full batteries were charged to 4.3 V at a constant temperature of 45° C., at 2.5-4.3 V, and then charged at constant voltage at 4.3 V until the current ≤0.05 mA and left for 5 minutes, then discharged to 2.5 V at 1 C, the capacity being recorded as $D_n$ (n=0.0, 1, 2, . . . ). The above process was repeated until a capacity fading to 80%. The number of cycles repeated at this point was recorded (referred to as "45° C. cycle number").

11. Crystalline Surface Spacing and Angle Testing 1 g of each cathode active material powder prepared above was taken in a 50 mL test tube and 10 mL of alcohol with 75% mass fraction was injected in the test tube, then stirred and fully dispersed for 30 minutes, then an appropriate amount of the above solution was taken with a clean disposable plastic pipette and added dropwise on a 300-mesh copper net, at this time, part of the powder remained on the copper net, the copper net with the sample was transferred to the TEM (Talos F200s G2) sample chamber for testing, and the original TEM test image was obtained, and saved as the original image format (xx.dm3).

The original image from the above TEM test was opened in DigitalMicrograph software and Fourier transform was performed (done automatically by the software after clicking on the operation) to obtain the diffraction pattern, the distance from the diffraction spot to the center of the diffraction pattern was measured to obtain the crystal plane spacing, and the angle was calculated according to the Bragg equation.

The different substances of the coating layer can be identified by comparing the obtained data on the crystal plane spacing and the corresponding angle with their standard values.

12. Coating Layer Thickness Test

The thicknesses of the coating layers are mainly tested by FIB, a single particle is randomly selected from the respective cathode active materials powder prepared above, a thin slice with a thickness of about 100 nm is cut from the middle position of the selected particle, and then a TEM test is performed on the thin slice. The original TEM test image was obtained and saved as the original image format (xx.dm3).

The original image from the above TEM test was opened in DigitalMicrograph software to identify the coating layer by the lattice spacing and angle information, and the thickness of the coating layer was measured.

The thickness at three locations on the selected particle were measured and an average value was taken.

13. Determination of the Molar Ratio of SP2 Form to SP3 Form in the Carbon of the Third Coating Layer This test was performed by Raman spectroscopy. The molar ratio was confirmed by splitting the energy spectrum of the Raman test to obtain Id/Ig, where Id was the peak intensity of the SP3 form carbon and Ig was the peak intensity of the SP2 form carbon.

See the tables below for performance test results for all Examples and Comparative Examples.

TABLE 9 performance of cathode active materials powder and battery performance of the prepared cells in Examples 1-27 and Comparative Examples 1-19.

| | Performance of cathode active material powder | | | | | | Battery Performance | | |
| --- | --- | --- | --- | --- | --- | --- | --- | --- | --- |
| Example number | Lattice change rate (%) | Li/Mn-antisite defect concentration (%) | Compaction density (g/cm³) | Surface oxygen valence state | 3 C charging constant current ratio (%) | Amount of Mn and Fe exsolved after cycling (ppm) | Button cell capacity at 0.1 C (mAh/g) | Cell expansion after 30 d storage at 60° C. (%) | 45° C. cycle number |
| Comparative Example 1 | 11.4 | 5.2 | 1.5 | −1.55 | 50.1 | 2060 | 125.6 | 48.6 | 185 |
| Comparative Example 2 | 10.6 | 3.3 | 1.67 | −1.51 | 54.9 | 1810 | 126.4 | 47.3 | 243 |
| Comparative Example 3 | 10.8 | 3.4 | 1.64 | −1.64 | 52.1 | 1728 | 144.7 | 41.9 | 378 |
| Comparative Example 4 | 4.3 | 2.8 | 1.69 | −1.82 | 56.3 | 1096 | 151.2 | 8.4 | 551 |
| Comparative Example 5 | 2.8 | 2.5 | 1.65 | −1.85 | 58.2 | 31 | 148.4 | 7.5 | 668 |
| Comparative Example 6 | 3.4 | 2.4 | 1.61 | −1.86 | 58.4 | 64 | 149.6 | 8.6 | 673 |
| Comparative Example 7 | 4.5 | 2.4 | 1.73 | −1.83 | 59.2 | 85 | 148.6 | 8.3 | 669 |
| Comparative Example 8 | 2.3 | 2.4 | 1.68 | −1.89 | 59.3 | 30 | 152.3 | 7.3 | 653 |
| Comparative Example 9 | 2.3 | 2.4 | 1.75 | −1.89 | 59.8 | 30 | 152.3 | 7.3 | 672 |
| Comparative Example 10 | 2.3 | 2.2 | 1.81 | −1.9 | 64.1 | 28 | 154.2 | 7.2 | 685 |
| Comparative Example 11 | 2.3 | 2.2 | 1.92 | −1.92 | 65.4 | 12 | 154.3 | 5.4 | 985 |
| Comparative Example 12 | 2.3 | 2.1 | 1.95 | −1.95 | 65.5 | 18 | 154.6 | 4.2 | 795 |
| Comparative Example 13 | 11.4 | 5.2 | 1.63 | −1.96 | 52.4 | 56 | 130.2 | 5.4 | 562 |
| Comparative Example 14 | 8.1 | 3.8 | 1.76 | −1.96 | 58.3 | 41 | 135.1 | 5.1 | 631 |
| Comparative Example 15 | 2 | 1.8 | 2.13 | −1.96 | 61.3 | 8 | 154.3 | 3.7 | 1126 |
| Comparative Example 16 | 2 | 1.9 | 1.95 | −1.96 | 60.5 | 18 | 152.7 | 4.5 | 1019 |
| Comparative Example 17 | 2 | 1.9 | 1.9 | −1.89 | 60.4 | 24 | 152.4 | 5.1 | 897 |
| Example 1 | 2.5 | 1.8 | 2.35 | −1.93 | 70.3 | 7 | 157.2 | 4.2 | 1128 |
| Example 2 | 2.5 | 1.8 | 2.24 | −1.94 | 70.2 | 6 | 156.3 | 3.7 | 1253 |
| Example 3 | 2.5 | 1.8 | 2.22 | −1.94 | 70.1 | 5 | 155.4 | 3.4 | 1374 |
| Example 4 | 2.5 | 1.8 | 2.21 | −1.95 | 70.2 | 3 | 153.7 | 2.9 | 1406 |
| Example 5 | 2.5 | 1.8 | 2.33 | −1.93 | 70.1 | 5 | 156.7 | 3.1 | 1501 |
| Example 6 | 2.5 | 1.8 | 2.31 | −1.93 | 69.7 | 4 | 156.2 | 2.8 | 1576 |
| Example 7 | 2.5 | 1.8 | 2.28 | −1.93 | 68.4 | 3 | 155.8 | 2.5 | 1647 |
| Example 8 | 2.5 | 1.8 | 2.29 | −1.93 | 69.1 | 9 | 156.4 | 3.4 | 1058 |
| Example 9 | 2.5 | 1.8 | 2.46 | −1.98 | 73.4 | 6 | 157.6 | 2.9 | 1286 |
| Example 10 | 2.5 | 1.8 | 2.49 | −1.98 | 75.4 | 5 | 157.8 | 2.5 | 1486 |

TABLE 9-continued performance of cathode active materials powder and battery performance of the prepared cells in Examples 1-27 and Comparative Examples 1-19.

| Example number | Performance of cathode active material powder | | | | | | Battery Performance | | |
|---|---|---|---|---|---|---|---|---|---|
| | Lattice change rate (%) | Li/Mn-antisite defect concentration (%) | Compaction density (g/cm$^3$) | Surface oxygen valence state | 3 C charging constant current ratio (%) | Amount of Mn and Fe exsolved after cycling (ppm) | Button cell capacity at 0.1 C (mAh/g) | Cell expansion after 30 d storage at 60° C. (%) | 45° C. cycle number |
| Example 11 | 2.6 | 1.9 | 2.38 | −1.97 | 72.4 | 6 | 157.3 | 3.5 | 1026 |
| Example 12 | 2.4 | 1.8 | 2.41 | −1.97 | 74.5 | 4 | 156.3 | 2.5 | 1136 |
| Example 13 | 2.7 | 1.9 | 2.42 | −1.97 | 75.3 | 5 | 156.6 | 3.5 | 1207 |
| Example 14 | 2.8 | 1.9 | 2.45 | −1.97 | 76.5 | 3 | 153.8 | 3.7 | 1308 |
| Example 15 | 2.2 | 1.9 | 2.46 | −1.97 | 74.3 | 3 | 153.8 | 3.7 | 1109 |
| Example 16 | 2.1 | 1.9 | 2.47 | −1.98 | 73.1 | 5 | 154.2 | 3.8 | 1132 |
| Example 17 | 2.5 | 1.7 | 2.41 | −1.98 | 75.3 | 4 | 155.4 | 4.5 | 1258 |
| Example 18 | 2.3 | 1.6 | 2.42 | −1.97 | 76.1 | 4 | 154.3 | 4.7 | 1378 |
| Example 19 | 2.2 | 1.7 | 2.43 | −1.97 | 76.8 | 4 | 154.3 | 4.7 | 1328 |
| Example 20 | 2.6 | 1.8 | 2.42 | −1.94 | 75.4 | 4 | 153.9 | 3.3 | 1458 |
| Example 21 | 2.4 | 1.7 | 2.41 | −1.97 | 76.1 | 4 | 154.5 | 3.5 | 1327 |
| Example 22 | 2.4 | 1.8 | 2.32 | −1.95 | 72.1 | 2 | 152.1 | 2.7 | 1556 |
| Example 23 | 2.3 | 1.7 | 2.46 | −1.96 | 76.4 | 3 | 151.4 | 2.4 | 1645 |
| Example 24 | 2.2 | 1.8 | 2.47 | −1.95 | 76.3 | 3 | 152.1 | 2.5 | 1548 |
| Example 25 | 2.1 | 1.7 | 2.49 | −1.98 | 78.4 | 3 | 158.6 | 2.9 | 1538 |
| Example 26 | 3.6 | 2.5 | 2.21 | −1.97 | 56.4 | 8 | 152.3 | 4.8 | 1017 |
| Example 27 | 2.8 | 2.1 | 2.24 | −1.98 | 74.3 | 6 | 155.4 | 3.8 | 1126 |
| Example 28 | 2.5 | 1.9 | 1.95 | −1.94 | 54.7 | 9 | 154.9 | 6.4 | 986 |
| Example 29 | 2.4 | 1.8 | 1.98 | −1.95 | 68.4 | 7 | 155.6 | 4.5 | 1047 |

As seen in Table 9, compared to the Comparative Examples, the Examples achieve smaller lattice change rates, smaller Li/Mn anti-site defect concentrations, larger compaction densities, surface oxygen valence states closer to a valence state of −2, less post-cycle Mn and Fe exsolution, and better cell performance, such as belier high-temperature storage performance and high-temperature cycling performance.

TABLE 10

Thickness of each layer of cathode active material and weight ratio of manganese element to phosphorus element prepared in Examples 1-14 and Comparative Examples 3-4 and 12.

| Number | Core | First coating layer | Second coating layer | Third coating layer | Thickness of first coating layer (nm) | Thickness of second coating layer (nm) | Thickness of third coating layer (nm) | Mn content (wt %) | Mn to P weight ratio |
|---|---|---|---|---|---|---|---|---|---|
| Comparative Example 3 | LiMn$_{0.80}$Fe$_{0.20}$PO$_4$ | 2% amorphous Li$_2$FeP$_2$O$_7$ | — | 2% carbon | 4 | — | 10 | 26.1 | 1.383 |

TABLE 10-continued

Thickness of each layer of cathode active material and weight ratio of manganese element to phosphorus element prepared in Examples 1-14 and Comparative Examples 3-4 and 12.

| Number | Core | First coating layer | Second coating layer | Third coating layer | Thickness of first coating layer (nm) | Thickness of second coating layer (nm) | Thickness of third coating layer (nm) | Mn content (wt %) | Mn to P weight ratio |
|---|---|---|---|---|---|---|---|---|---|
| Comparative Example 4 | $LiMn_{0.70}Fe_{0.295}V_{0.005}PO_4$ | — | | 1% carbon | — | — | 5 | 24.3 | 1.241 |
| Comparative Example 12 | $Li_{0.999}Mn_{0.60}Fe_{0.393}V_{0.004}Co_{0.003}P_{0.999}S_{0.001}O_4$ | — | 3% crystalline $LiFePO_4$ | 1% carbon | — | 7.5 | 5 | 19.6 | 1.034 |
| Example 1 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon | 2 | 7.5 | 5 | 19.0 | 1.023 |
| Example 2 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 3% carbon | 2 | 7.5 | 15 | 18.3 | 1.023 |
| Example 3 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 4% carbon | 2 | 7.5 | 20 | 18.0 | 1.023 |
| Example 4 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 5% carbon | 2 | 7.5 | 25 | 17.9 | 1.023 |
| Example 5 | $Li_{0.997}Mn_{0.60}Fe_{0.393}V_{0.004}Co_{0.003}P_{0.997}S_{0.003}O_4$ | 2% $Li_2FeP_2O_7$ | 3% $LiFePO_4$ | 1% carbon | 4 | 7.5 | 5 | 18.7 | 1.011 |
| Example 6 | $Li_{0.997}Mn_{0.60}Fe_{0.393}V_{0.004}Co_{0.003}P_{0.997}S_{0.003}O_4$ | 3% $Li_2FeP_2O_7$ | 3% $LiFePO_4$ | 1% carbon | 6 | 7.5 | 5 | 18.3 | 0.999 |
| Example 7 | $Li_{0.997}Mn_{0.60}Fe_{0.393}V_{0.004}Co_{0.003}P_{0.997}S_{0.003}O_4$ | 5% $Li_2FeP_2O_7$ | 3% $LiFePO_4$ | 1% carbon | 10 | 7.5 | 5 | 17.6 | 0.975 |
| Example 8 | $Li_{0.997}Mn_{0.60}Fe_{0.393}V_{0.004}Co_{0.003}P_{0.997}S_{0.003}O_4$ | 1% $Li_2FeP_2O_7$ | 1% $LiFePO_4$ | 1% carbon | 2 | 2.5 | 5 | 19.8 | 1.043 |
| Example 9 | $Li_{0.997}Mn_{0.60}Fe_{0.393}V_{0.004}Co_{0.003}P_{0.997}S_{0.003}O_4$ | 1% $Li_2FeP_2O_7$ | 4% $LiFePO_4$ | 1% carbon | 2 | 10 | 5 | 18.7 | 1.014 |
| Example 10 | $Li_{0.997}Mn_{0.60}Fe_{0.39}3V_{0.004}Co_{0.003}P_{0.997}S_{0.003}O_4$ | 1% $Li_2FeP_2O_7$ | 5% $LiFePO_4$ | 1% carbon | 2 | 12.5 | 5 | 18.4 | 1.004 |
| Example 11 | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon | 2 | 6.3 | 7.5 | 19.0 | 1.026 |
| Example 13 | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% carbon | 4 | 5 | 10 | 18.7 | 1.108 |
| Example 14 | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon | 5 | 8.8 | 12.5 | 17.8 | 1.166 |

As can be seen from Table 10, by doping the manganese and phosphorus sites of lithium manganese iron phosphate (containing 35% manganese and about 20% phosphorus) and the three-layer coating, the content of manganese element and the weight content ratio of manganese element to phosphorus element in the cathode active material were significantly reduced; in addition, comparing Examples 1-14 with Comparative Examples 3, 4 and 12, and combining with Table 9, it can be seen that the reduction of manganese element and phosphorus element in the cathode active material and phosphorus in the cathode active material leads to a decrease in the amount of exsolved ferromanganese and an increase in the battery performance of the secondary batteries prepared by the material.

TABLE 11 performance of cathode active materials powder in Examples 28-40 and performance of the prepared batteries.

| | Performance of cathode active material powder | | | | | Battery Performance | | | |
| --- | --- | --- | --- | --- | --- | --- | --- | --- | --- |
| Example number | Lattice change rate (%) | Li/Mn-antisite defect concentration (%) | Compaction density (g/cm³) | Surface oxygen valence state | 3 C charging constant current ratio (%) | Amount of Mn and Fe exsolved after cycling (ppm) | Button cell capacity at 0.1 C (mAh/g) | Cell expansion after 30 d storage at 60° C. (%) | 45° C. cycle number |
| Example 1 | 2.5 | 1.8 | 2.35 | −1.93 | 70.3 | 7 | 157.2 | 4.2 | 1128 |
| Example 28 | 2.4 | 1.9 | 2.36 | −1.97 | 68.7 | 15 | 156.2 | 4.8 | 1018 |
| Example 29 | 2.5 | 1.7 | 2.36 | −1.96 | 70.1 | 12 | 155.6 | 4.6 | 1087 |
| Example 30 | 2.5 | 1.7 | 2.38 | −1.97 | 69.1 | 14 | 155.9 | 4.3 | 1054 |
| Example 31 | 2.6 | 1.8 | 2.39 | −1.98 | 69.4 | 23 | 156.2 | 5.3 | 997 |
| Example 32 | 2.6 | 1.9 | 2.34 | −1.96 | 71.3 | 16 | 156.4 | 4.6 | 1004 |
| Example 33 | 2.4 | 1.7 | 2.36 | −1.94 | 70.9 | 11 | 157.5 | 5.1 | 1102 |
| Example 34 | 2.5 | 1.9 | 2.33 | −1.92 | 71.6 | 14 | 155.8 | 5.4 | 1024 |
| Example 35 | 2.5 | 1.7 | 2.34 | −1.92 | 68.4 | 18 | 156.1 | 4.9 | 1054 |
| Example 36 | 2.4 | 1.9 | 2.33 | −1.95 | 67.5 | 27 | 154.7 | 5.9 | 954 |
| Example 37 | 2.2 | 1.8 | 2.36 | −1.94 | 69.4 | 24 | 156.4 | 5.7 | 1017 |
| Example 38 | 2.4 | 1.9 | 2.37 | −1.91 | 71.6 | 31 | 155.8 | 5.3 | 991 |
| Example 39 | 2.6 | 1.9 | 2.38 | −1.94 | 70.8 | 27 | 154.8 | 5.1 | 975 |
| Example 40 | 2.4 | 1.9 | 2.36 | −1.92 | 71.5 | 15 | 156.8 | 4.2 | 1154 |

As can be seen from Table 11, by adopting the first coating layer and the second coating layer containing other elements within the scope of the present application, cathode active materials with good performance were also obtained and good battery performance results were achieved.

TABLE 12

Crystal plane spacing and angle of the first coating layer material and the second coating layer material.

| Number | Crystal surface spacing of first coating layer material | Angle in crystal direction (111) of first coating layer material | Crystal surface spacing of second coating layer material | Angle in crystal direction (111) of second coating layer material |
| --- | --- | --- | --- | --- |
| Example 1 | 0.303 | 29.496 | 0.348 | 25.562 |
| Example 42 | 0.451 | 19.668 | 0.348 | 25.562 |
| Example 43 | 0.297 | 30.846 | 0.348 | 25.562 |
| Example 44 | 0.457 | 19.456 | 0.348 | 25.562 |
| Example 45 | 0.437 | 20.257 | 0.348 | 25.562 |
| Example 46 | 0.462 | 19.211 | 0.348 | 25.562 |
| Example 47 | 0.450 | 19.735 | 0.348 | 25.562 |
| Example 48 | 0.372 | 23.893 | 0.348 | 25.562 |
| Example 51 | 0.303 | 29.496 | 0.374 | 23.789 |
| Example 52 | 0.303 | 29.496 | 0.360 | 24.710 |
| Example 53 | 0.303 | 29.496 | 0.350 | 25.428 |
| Example 54 | 0.303 | 29.496 | 0.425 | 20.885 |

TABLE 12-continued

Crystal plane spacing and angle of the first coating layer material and the second coating layer material.

| Number | Crystal surface spacing of first coating layer material | Angle in crystal direction (111) of first coating layer material | Crystal surface spacing of second coating layer material | Angle in crystal direction (111) of second coating layer material |
| --- | --- | --- | --- | --- |
| Example 55 | 0.303 | 29.496 | 0.356 | 24.993 |
| Example 57 | 0.303 | 29.496 | 0.244 | 36.808 |

From Table 12, it can be seen that the crystal surface spacing and angle in the first coating layer and the second coating layer of the present application are within the range described in the present application.

III. Examination of the Effect of Sintering Method of Coating Layer on the Performance of Cathode Active Material and Secondary Battery Performance The Examples and Comparative Examples in the table below were prepared similarly to Example 1, with the differences using the method parameters in the table below. See Table 13 below for the test results.

TABLE 13

Effect of sintering temperature and sintering time on secondary batteries in steps S4, S6 and S8.

| Number | Sintering temperature in S4 (° C.) | Sintering time in S4 (h) | Sintering temperature in S6 (° C.) | Sintering time in S6 (h) | Sintering temperature in S8 (° C.) | Sintering time in S8 (h) | Lattice change rate (%) | Li/Mn-antisite-defect concentration (%) |
|---|---|---|---|---|---|---|---|---|
| Example 1 | 650 | 6 | 700 | 8 | 700 | 10 | 2.5 | 1.8 |
| Example II-1 | 750 | 4 | 600 | 6 | 700 | 6 | 3.0 | 2.4 |
| Example II-2 | 800 | 4 | 600 | 6 | 700 | 6 | 3.1 | 2.4 |
| Example II-3 | 700 | 2 | 600 | 6 | 700 | 6 | 2.9 | 2.3 |
| Example II-4 | 700 | 3 | 600 | 6 | 700 | 6 | 2.7 | 2.1 |
| Example II-5 | 700 | 4 | 500 | 6 | 700 | 6 | 2.5 | 1.8 |
| Example II-6 | 700 | 4 | 700 | 6 | 700 | 6 | 2.5 | 1.8 |
| Example II-7 | 700 | 4 | 600 | 8 | 700 | 6 | 2.5 | 1.8 |
| Example II-8 | 700 | 4 | 600 | 10 | 700 | 6 | 2.5 | 1.8 |
| Example II-9 | 700 | 4 | 600 | 6 | 750 | 6 | 2.5 | 1.8 |
| Example II-10 | 700 | 4 | 600 | 6 | 800 | 6 | 2.5 | 1.8 |
| Example II-11 | 700 | 4 | 600 | 6 | 700 | 8 | 2.5 | 1.8 |
| Example II-12 | 700 | 4 | 600 | 6 | 700 | 10 | 2.5 | 1.8 |
| Comparative Example II-1 | 600 | 3 | 600 | 8 | 750 | 8 | 4.8 | 5.3 |
| Comparative Example II-2 | 850 | 3 | 600 | 8 | 750 | 8 | 5.3 | 4.7 |
| Comparative Example II-3 | 750 | 1.5 | 600 | 8 | 750 | 8 | 4.7 | 4.5 |
| Comparative Example II-4 | 750 | 4.5 | 600 | 8 | 750 | 8 | 4.1 | 4.0 |
| Comparative Example II-5 | 750 | 3 | 450 | 8 | 750 | 8 | 4.8 | 4.6 |
| Comparative Example II-6 | 750 | 3 | 750 | 8 | 750 | 8 | 3.9 | 4.8 |
| Comparative Example II-7 | 750 | 3 | 600 | 5.5 | 750 | 8 | 4.4 | 4.2 |
| Comparative Example II-8 | 750 | 3 | 600 | 10.5 | 750 | 8 | 4.1 | 3.9 |
| Comparative Example II-9 | 750 | 3 | 600 | 8 | 650 | 8 | 5.2 | 4.1 |
| Comparative Example II-10 | 750 | 3 | 600 | 8 | 850 | 8 | 5.0 | 4.0 |
| Comparative Example II-11 | 750 | 3 | 600 | 8 | 750 | 5.5 | 4.3 | 4.2 |
| Comparative Example II-12 | 750 | 3 | 600 | 8 | 750 | 10.5 | 50 | 4.9 |

TABLE 13-continued

Effect of sintering temperature and sintering time on secondary batteries in steps S4, S6 and S8.

| Number | Compaction density (g/cm³) | 3 C charging constant current ratio (%) | Amount of Mn and Fe exsolved after cycling (ppm) | Surface oxygen valence state | 0.1 C button cell capacity (mAh/g) | Cell expansion after 30 d storage at 60° C. (%) | 45° C. cycle number |
|---|---|---|---|---|---|---|---|
| Example 1 | 2.35 | 70.3 | 7 | −1.93 | 157.2 | 4.2 | 1128 |
| Example II-1 | 2.24 | 64.2 | 12 | −1.95 | 154.2 | 6.4 | 894 |
| Example II-2 | 2.21 | 67.3 | 12 | −1.95 | 153.2 | 6.2 | 904 |
| Example II-3 | 2.20 | 62.3 | 15 | −1.96 | 151.1 | 5.8 | 846 |
| Example II-4 | 2.23 | 64.3 | 14 | −1.96 | 152.8 | 5.4 | 908 |
| Example II-5 | 2.31 | 62.4 | 28 | −1.95 | 153.1 | 4.7 | 798 |
| Example II-6 | 2.34 | 63.5 | 14 | −1.96 | 154.3 | 5.1 | 867 |
| Example II-7 | 2.31 | 67.3 | 11 | −1.95 | 156.8 | 4.7 | 959 |
| Example II-8 | 2.34 | 68.5 | 10 | −1.96 | 156.2 | 4.5 | 1045 |
| Example II-9 | 2.35 | 70.3 | 7 | −1.93 | 157.2 | 4.2 | 1128 |
| Example II-10 | 2.35 | 70.1 | 7 | −1.93 | 1563 | 4.4 | 1097 |
| Example II-11 | 2.35 | 68.4 | 8 | −1.91 | 155.4 | 4.7 | 964 |
| Example II-12 | 2.35 | 66.7 | 10 | −1.95 | 154.7 | 5 | 897 |
| Comparative Example II-1 | 2.28 | 54.1 | 86 | −1.90 | 140.7 | 10.6 | 615 |
| Comparative Example II-2 | 2.38 | 57.2 | 84 | −1.91 | 145.3 | 9.0 | 684 |
| Comparative Example II-3 | 2.25 | 53.1 | 87 | −1.91 | 141.9 | 8.8 | 691 |
| Comparative Example II-4 | 2.31 | 58.1 | 79 | −1.92 | 1401 | 8.1 | 711 |
| Comparative Example II-5 | 2.28 | 52.1 | 78 | −1.90 | 141.2 | 8.7 | 601 |
| Comparative Example II-6 | 2.35 | 49.7 | 78 | −1.95 | 142.4 | 8.8 | 604 |
| Comparative Example II-7 | 2.24 | 45.4 | 81 | −1.93 | 142.9 | 8.8 | 614 |
| Comparative Example II-8 | 2.34 | 49.1 | 79 | −1.92 | 141.1 | 7.9 | 684 |
| Comparative Example II-9 | 2.31 | 48.4 | 81 | −1.93 | 141.8 | 10.2 | 567 |
| Comparative Example II-10 | 2.34 | 49.1 | 78 | −1.95 | 141.2 | 8.7 | 678 |
| Comparative Example II-11 | 2.27 | 47.8 | 84 | −1.91 | 142.9 | 9.4 | 521 |
| Comparative Example II-12 | 2.35 | 49.8 | 78 | −1.94 | 141.7 | 9.5 | 655 |

From the above, it can be seen that when the sintering temperature was in a range of 650-800° C. and the sintering time was 2-6 hrs in step S4, the sintering temperature was 500-700° C. and the sintering time was 6-10 hrs in step S6, the sintering temperature was 700-800° C. and the sintering time was 6-10 hrs step S8, a smaller lattice change rate, smaller Li/Mn-antisite defect concentration, less Mn and Fe exsolution, belier 3C charging constant current ratio, higher battery capacity, belier cycling performance, belier high-temperature storage stability could be achieved.

In addition, compared to Example 11-4 (when the sintering temperature in step S4 was 750° C. and the sintering time was 4 hrs), a belier cathode active material performance and battery performance were achieved in Example II-1 (when the sintering temperature in step S4 was 750° C. and the sintering time was 4.5 hrs), which indicated the need to control the sintering time to be less than 4.5 hrs when sintering temperature in step S4 was 750° C. or higher.

IV. Investigation of the Effects of Reaction Temperature and Reaction Time on the Performance of Cathode Active Material and Battery Performance in the Preparation of Cores The cathode active material and cell preparation for Examples III-1 to 111-17 in the table below were similar to Example 1, see the method parameters in the table below for differences in cathode active material preparation. The results are also shown in the table below.

TABLE 14

Effect of reaction temperature and reaction time in core preparation on the performance of cathode active material and secondary battery.

| Number | Step S1 Reaction temperature (° C.) | Step S1 Reaction time (h) | Step S2 Reaction temperature (° C.) | Step S2 Reaction time (h) | Lattice change rate (%) | Li/Mn-antisite-defect concentration (%) | Compaction density (g/cm3) | 3 C charging constant current ratio (%) | Amount of Mn and Fe exsolved after cycling (ppm) | Surface Oxygen valence state | 0.1 C button cell capacity (mAh/g) | Cell expansion after 30 d storage at 60° C. (%) | 45° C. cycle number |
|---|---|---|---|---|---|---|---|---|---|---|---|---|---|
| Example 1 | 80 | 6 | 80 | 10 | 2.5 | 1.8 | 2.35 | 70.3 | 7 | −1.93 | 157.2 | −4.2 | 1128 |
| Example III-1 | 70 | 6 | 80 | 10 | 2.8 | 3.4 | 2.30 | 60.1 | 34 | −1.93 | 155.4 | 5.8 | 876 |
| Example III-2 | 60 | 6 | 80 | 10 | 3.1 | 3.1 | 2.33 | 64.2 | 18 | −1.92 | 156.2 | 5.1 | 997 |
| Example III-4 | 100 | 6 | 80 | 10 | 2.3 | 2.4 | 2.37 | 71.3 | 7 | −1.94 | 156.8 | 4.1 | 1137 |
| Example III-5 | 120 | 6 | 80 | 10 | 2.1 | 2.2 | 2.38 | 72.1 | 5 | −1.92 | 155.4 | 4.0 | 1158 |
| Example III-6 | 80 | 2 | 80 | 10 | 2.8 | 3.2 | 2.27 | 68.4 | 24 | −1.90 | 1549 | 5.1 | 895 |
| Example III-7 | 80 | 3 | 80 | 10 | 2.6 | 2.7 | 2.29 | 69.7 | 17 | −1.92 | 1561 | 4.7 | 967 |
| Example III-8 | 80 | 5 | 80 | 10 | 2.4 | 1.9 | 2.34 | 70.6 | 8 | −1.94 | 156.8 | 4.3 | 1137 |
| Example III-9 | 80 | 7 | 80 | 10 | 2.5 | 1.8 | 2.35 | 68.3 | 11 | −1.94 | 156.4 | 4.8 | 987 |
| Example III-10 | 80 | 9 | 80 | 10 | 2.6 | 1.8 | 2.36 | 67.2 | 15 | −1.93 | 155.9 | 5.2 | 921 |
| Example III-11 | 80 | 6 | 40 | 10 | 3.2 | 3.4 | 2.28 | 67.8 | 35 | −1.94 | 156.8 | 5.4 | 894 |
| Example III-12 | 80 | 6 | 60 | 10 | 2.8 | 2.9 | 2.31 | 68.7 | 18 | 11.95 | 157.0 | 4.9 | 927 |
| Example III-13 | 80 | 6 | 80 | 10 | 2.5 | 2.7 | 2.35 | 70.3 | 7 | −1.93 | 157.2 | 4.2 | 1128 |
| Example III-14 | 80 | 6 | 100 | 10 | 2.7 | 2.8 | 2.33 | 69.4 | 15 | −1.93 | 156.7 | 4.6 | 957 |
| Example III-15 | 80 | 6 | 120 | 10 | 2.8 | 3.1 | 2.32 | 68.1 | 24 | −1.94 | 156.2 | 4.8 | 914 |
| Example III-16 | 80 | 6 | 90 | 1 | 3.7 | 3.8 | 2.26 | 67.9 | 38 | 1.93 | 155.8 | 5.2 | 885 |
| Example III-17 | 80 | 6 | 90 | 3 | 3.4 | 3.4 | 2.31 | 68.2 | 32 | −1.94 | 156.1 | 4.8 | 915 |
| Example III-18 | 80 | 6 | 90 | 5 | 3.1 | 3.1 | 2.33 | 69.1 | 27 | −1.92 | 156.4 | 4.6 | 934 |

TABLE 14-continued

Effect of reaction temperature and reaction time in core preparation on the performance of cathode active material and secondary battery.

| Number | Step S1 Reaction temperature (° C.) | Step S1 Reaction time (h) | Step S2 Reaction temperature (° C.) | Step S2 Reaction time (h) | Lattice change rate (%) | Li/Mn-antisite defect concentration (%) | Compaction density (g/cm3) | 3 C charging constant current ratio (%) | Amount of Mn and Fe exsolved after cycling (ppm) | Surface Oxygen valence state | 0.1 C button cell capacity (mAh/g) | 30 d storage at 60° C. (%) | Cell expansion after 45° C. cycle number |
|---|---|---|---|---|---|---|---|---|---|---|---|---|---|
| Example III-19 | 80 | 6 | 90 | 7 | 2.8 | 2.9 | 2.34 | 69.4 | 15 | −1.93 | 156.8 | 4.5 | 971 |
| Example III-20 | 80 | 6 | 90 | 9 | 2.5 | 2.7 | 2.35 | 70.3 | 7 | −1.93 | 157.2 | 4.2 | 1128 |

As can be seen from Table 14, when the reaction temperature range in step S51 was 60-120° C. and the reaction time was 2-9 hrs and the reaction temperature range in step S2 was 40-120° C. and the reaction time was 1-10 hrs, the performance of the cathode active material powder (lattice change rate, Li/Mn-antisite defect concentration, surface oxygen valence, compaction density) and the performance of the prepared cells (electric capacity, high-temperature cycling performance, high-temperature storage performance) were excellent.

Cathode slurries, cathode plates and full cells were prepared using the cathode active materials prepared in respective above-mentioned Examples and Comparative Examples, and the performance tests of the slurries and cells were performed.

In the following Examples and Comparative Examples, the preparation of the electrode plates and cells, and the performance tests for the slurries and the cells were carried out according to the following methods:

1) Preparation of Cathode Plate

The cathode active material was mixed with a conductive agent of acetylene black, a binder of polyvinylidene fluoride (PVDF), an infiltrant and a dispersant in a N-methyl pyrrolidone solvent system, and then coated on an aluminum foil with an under-coating and dried and cold pressed to obtain a cathode plate. The weight ratio between the cathode active material, the conductive agent of acetylene black, the binder of polyvinylidene fluoride (PVDF), the dispersant and the infiltrant was $(92-Y_1-Y_2):2.5:5.5:Y_1:Y_2$. The coating amount was 0.02 g/cm², and the compaction density was 2.4 g/cm³.

The aluminum foil with a conductive under-coating was prepared according to the following method:

preparation of a conductive under-coating slurry: polyacrylic acid-acrylate copolymers (weight average molar mass of 340,000) and a conductive agent (Super P) were formulated at a weight ratio of 40:60 and were dissolved/dispersed in deionized water, and were prepared into a conductive under-coating slurry.

The conductive under-coating slurry was applied to both sides of an aluminum foil, and after drying, a conductive under-coating with a thickness of 2 μm was formed on each side. An aluminum foil with a conductive under-coating was obtained.

2) Preparation of Anode Plate

An anode active material of artificial graphite, hard carbon and conductive agent acetylene black, a binder of styrene rubber (SBR), and a thickener of sodium carboxymethyl cellulose (CMC) were mixed well in deionized water at a weight ratio of 90:5:2:2:1, then coated on a copper foil and dried and cold pressed to obtain an anode plate. The coating amount was 0.01 g/cm², and the compaction density was 1.7 g/cm³.

3) Assembly of Full Battery

A polyethylene (PE) porous polymer film was used as the separator, and the cathode plate, the separator, and the anode plate were stacked in order, so that the separator was between the cathode and anode plates for separation, and a bare cell was obtained by winding. The bare cell was placed in an outer packaging, filled with an electrolyte and encapsulated to obtain a full battery (also referred to as "full cell" below).

The weight of the cathode active material in a single full cell was 11.85 g; and the weight of the anode active material was 6.73 g.

4) Slurry Viscosity Test a. A viscometer was placed on a designated operating table, the bracket was adjusted so that the horizontal bubble was centered and the viscometer was in a horizontal state;

b. sampling: 500 mL of the sample to be tested was placed in a 500 mL glass beaker and tested at a constant temperature of 25° C.; and c. testing: a corresponding rotor and speed were selected, the rotor was tilted after visual inspection of the rotor for no deformation/stains and was slowly infiltrated until all parts below the rotor groove was infiltrated, the slurry was not allowed to be stirred by the rotor during the infiltration process, test was activated by pressing the start button and performed for 10 minutes, the data was read and recorded every minute, the final viscosity was the average value of 10 groups of data.

Figure 8:
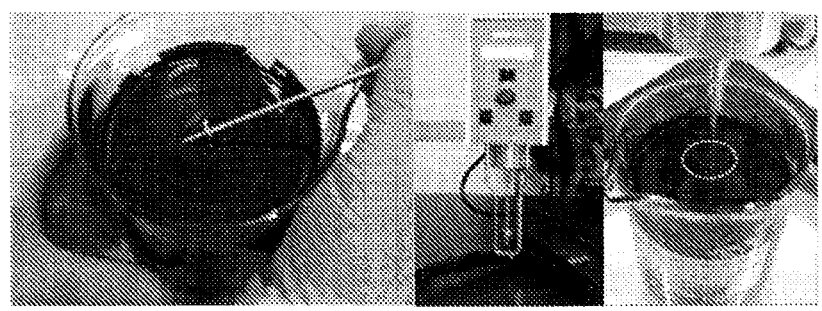
FIG. 8 exemplarily shows the instrumentation used and test procedure for the cathode slurry viscosity test in an embodiment of the present application.

FIG. 8 exemplarily shows the instrumentation and test procedure used for the slurry viscosity test.

5) Slurry Flowability Test (Gel Test)

Test method: 500 mL of the sample to be tested was contained in a 500 mL glass beaker, a steel ruler of 25 cm long, 2 cm wide with a scale was vertically positioned along the edge of the beaker, slowly immersed into the liquid until a position 4-5 cm below the liquid surface, and the slurry was slowly picked up, and the flow of the slurry brought out by the steel ruler was examined, and photos were taken for recording. The slurry was determined to be unqualified if gel was present.

6) Slurry Filtration Performance Test

Figure 9:
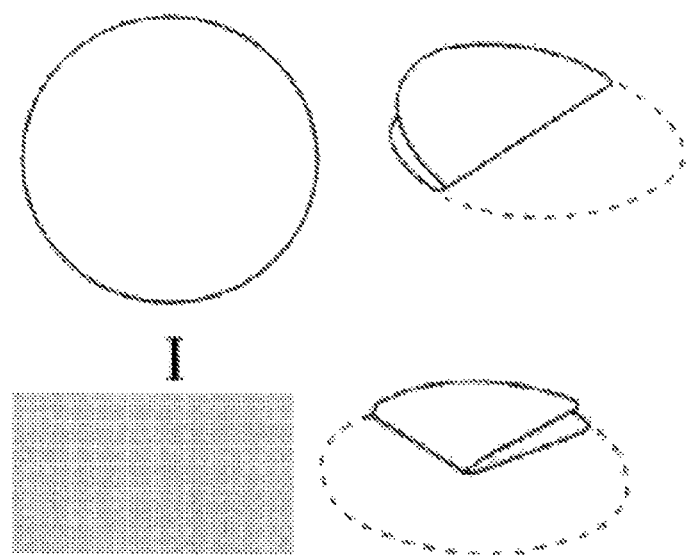
FIG. 9 exemplarily shows the method of folding a filter in the slurry filtration performance tests in an embodiment of the present application.

A 200-mesh filter of 25 cm*25 cm was folded into a triangle, as shown in FIG. 9; 500 mL of the slurry was taken and poured quickly along one side of the three-layer filter, the timing was started as the slurry was completely poured into the filter, and the filtration time was recorded when the amount of slurry passing through the filter was 300 mL. The slurry was determined to be unqualified if the filtration time was greater than 2 minutes.

7) Discharge DC Impedance Test

At 25° C., 1.0 C constant current and constant voltage were used to charge the lithium-ion battery to 4.3 V (1.0 C refers to the nominal capacity); the battery power was adjusted to 50% SoC at a rate of 1.0 C and left for 5 minutes, and then was discharged at 4 C constant current for 30 s (voltage data was collected every 1 s), the impedance of the 30 s discharging was calculated as the test data.

8) The Number of Cycles of Capacity Retention Rate of 80% at 45° C. (Referred to as "45° C. Cycle Number")

The full battery was charged to 4.3 V at a constant temperature of 45° C., at 2.5-4.3 V, then charged at the constant voltage of 4.3 V until the current was less than or equal to 0.05 mA, left for 5 minutes, then discharged to 2.5 V at 1 C, and the discharge capacity was recorded as D0. The charge/discharge cycle was repeated until the discharge capacity was reduced to 80% of D0. The number of cycles the battery has undergone at this point was recorded.

TABLE 15

Cathode active material composition in Examples 1'-40', Example 28", Example 29", and Comparative Examples 1'-21'.

| Number | Core | First coating layer | Second coating layer | Third coating layer |
|---|---|---|---|---|
| Comparative Example 1' | $LiMnPO_4$ | / | / | 1% carbon |
| Comparative Example 2' | $LiMn_{0.60}Fe_{0.40}PO_4$ | / | / | 2% carbon |
| Comparative Example 3' | $LiMn_{0.80}Fe_{0.20}PO_4$ | 2% amorphous $Li_2FeP_2O_7$ | / | 2% carbon |
| Comparative Example 4' | $LiMn_{0.70}Fe_{0.295}V_{0.005}PO_4$ | / | / | 1% carbon |
| Comparative Example 5' | $LiMn_{0.60}Fe_{0.395}Mg_{0.005}PO_4$ | / | / | 1.5% carbon |
| Comparative Example 6' | $LiMn_{0.60}Fe_{0.35}Ni_{0.05}PO_4$ | / | / | 2.5% carbon |
| Comparative Example 7' | $LiMn_{0.60}Fe_{0.395}V_{0.002}Ni_{0.003}PO_4$ | / | / | 1% carbon |
| Comparative Example 8' | $LiMn_{0.60}Fe_{0.395}V_{0.002}Mg_{0.003}PO_4$ | / | / | 1.5% carbon |
| Comparative Example 9' | Same as Comparative Example 7' | / | / | 1% carbon |
| Comparative Example 10' | Same as Example 1' | / | / | 1% carbon |
| Comparative Example 11' | Same as Example 1' | 1% $Li_2FeP_2O_7$ | / | 1% carbon |
| Comparative Example 12' | Same as Example 1' | / | 3% $LiFePO_4$ | 1% carbon |
| Comparative Example 13' | $LiMnPO_4$ | 2% $Li_2FeP_2O_7$ | 4% $LiCoPO_4$ | 1% carbon |
| Comparative Example 14' | $Li_{1.2}MnP_{0.8}Si_{0.2}O_4$ | 2% $Li_2FeP_2O_7$ | 4% $LiCoPO_4$ | 1% carbon |
| Comparative Example 15' | $LiMn_{0.60}Fe_{0.395}Mg_{0.005}PO_4$ | 2% $Li_2FeP_2O_7$ | 4% $LiCoPO_4$ | 1% carbon |
| Comparative Example 16' | Same as Example 1' | 2% amorphous $Li_2FeP_2O_7$ | 4% $LiCoPO_4$ | 1% carbon |
| Comparative Example 17' | Same as Example 1' | 2% $Li_2FeP_2O_7$ | 4% amorphous $LiCoPO_4$ | 1% carbon |
| Example 18' Comparative Example 19' Comparative Example 20' Comparative Example 21' | | Same as Example 1' | | |
| Example 1' | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon |
| Example 2' | Same as Example 1' | 1% $Li_2FeP_2O_7$ | 3% $LiFePO_4$ | 3% carbon |
| Example 3' | Same as Example 1' | 1% $Li_2FeP_2O_7$ | 3% $LiFePO_4$ | 4% carbon |
| Example 4' | Same as Example 1' | 1% $Li_2FeP_2O_7$ | 3% $LiFePO_4$ | 5% carbon |
| Example 5' | Same as Example 1' | 2% $Li_2FeP_2O_7$ | 3% $LiFePO_4$ | 1% carbon |
| Example 6' | Same as Example 1' | 3% $Li_2FeP_2O_7$ | 3% $LiFePO_4$ | 1% carbon |

TABLE 15-continued

Cathode active material composition in Examples 1'-40', Example 28", Example 29", and Comparative Examples 1'-21'.

| Number | Core | First coating layer | Second coating layer | Third coating layer |
|---|---|---|---|---|
| Example 7' | Same as Example 1' | 5% $Li_2FeP_2O_7$ | 3% $LiFePO_4$ | 1% carbon |
| Example 8' | Same as Example 1' | 1% $Li_2FeP_2O_7$ | 1% $LiFePO_4$ | 1% carbon |
| Example 9' | Same as Example 1' | 1% $Li_2FeP_2O_7$ | 4% $LiFePO_4$ | 1% carbon |
| Example 10' | Same as Example 1' | 1% $Li_2FeP_2O_7$ | 5% $LiFePO_4$ | 1% carbon |
| Example 11' | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon |
| Example 12' | $LiMn_{0.60}Fe_{0.393}V_{0.004}Co_{0.003}P_{0.998}N_{0.002}O_4$ | 1% $Li_2FeP_2O_7$ | 3% $LiFePO_4$ | 2% carbon |
| Example 13' | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% carbon |
| Example 14' | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon |
| Example 15' | $LiMn_{0.60}Fe_{0.393}V_{0.004}Co_{0.003}P_{0.999}N_{0.001}O_4$ | 2% $Al_4(P_2O_7)_3$ | 2.5% $LiCoPO_4$ | 2% carbon |
| Example 16' | $Li_{0.997}Mn_{0.60}Fe_{0.393}V_{0.004}Co_{0.003}P_{0.997}S_{0.003}O_4$ | 3% $Al_4(P_2O_7)_3$ | 3% $LiNiPO_4$ | 1% carbon |
| Example 17' | $LiMn_{0.60}Fe_{0.393}V_{0.004}Co_{0.003}P_{0.999}N_{0.001}O_4$ | 1.5% $Li_2NiP_2O_7$ | 2.5% $LiCoPO_4$ | 1.5% carbon |
| Example 18' | $LiMn_{0.60}Fe_{0.393}V_{0.004}Mg_{0.003}P_{0.995}N_{0.005}O_4$ | 1% $Li_2NiP_2O_7$ | 3% $LiFePO_4$ | 1% carbon |
| Example 19' | $Li_{0.999}Mn_{0.60}Fe_{0.393}V_{0.004}Mg_{0.003}P_{0.999}S_{0.001}O_4$ | 2% $Li_2FeP_2O_7$ | 4% $LiFePO_4$ | 1.5% carbon |
| Example 20' | $Li_{0.998}Mn_{0.60}Fe_{0.393}V_{0.004}Ni_{0.003}P_{0.998}S_{0.002}O_4$ | 1% $Li_2NiP_2O_7$ | 3% $LiCoPO_4$ | 1.5% carbon |
| Example 21' | $Li_{1.001}Mn_{0.60}Fe_{0.393}V_{0.004}Ni_{0.003}P_{0.999}Si_{0.001}O_4$ | 2% $Li_2FeP_2O_7$ | 4% $LiCoPO_4$ | 1% carbon |
| Example 22' | Same as Example 21' | 2% $Li_2FeP_2O_7$ | 4% $LiCoPO_4$ | 1% carbon |
| Example 23' | Same as Example 21' | 2% $Li_2FeP_2O_7$ | 5.50% $LiCoPO_4$ | 1% carbon |
| Example 24' | Same as Example 21' | 2% $Li_2FeP_2O_7$ | 4% $LiCoPO_4$ | 5.5% carbon |
| Example 25' | $Li_{1.001}Mn_{0.50}Fe_{0.493}V_{0.004}Ni_{0.003}P_{0.999}Si_{0.001}O_4$ | 1% $Li_2FeP_2O_7$ | 3% $LiFePO_4$ | 1% carbon |
| Example 26' | $Li_{1.001}Mn_{0.999}Fe_{0.001}P_{0.999}S1_{0.001}O_4$ | 1% $Li_2FeP_2O_7$ | 3% $LiFePO_4$ | 1% carbon |
| Example 27' | $LiMn_{0.60}Fe_{0.393}V_{0.004}Ni_{0.003}P_{0.9}N_{0.100}O_4$ | 1% $Li_2FeP_2O_7$ | 3% $LiFePO_4$ | 1.5% carbon |
| Example 28' | $Li_{1.001}Mn_{0.40}Fe_{0.593}V_{0.004}Ni_{0.003}P_{0.999}Si_{0.001}O_4$ | 2% $Li_2FeP_2O_7$ | 4% $LiCoPO_4$ | 1% carbon |
| Example 29' | $Li_{1.001}Mn_{0.40}Fe_{0.393}V_{0.204}Ni_{0.003}P_{0.999}Si_{0.001}O_4$ | 2% $Li_2FeP_2O_7$ | 4% $LiCoPO_4$ | 1% carbon |
| Example 28" | Same as Example 1' | $Li_2MgP_2O_7$ | Same as Example 1' | Same as Example 1' |
| Example 29" | Same as Example 1' | $Li_2CoP_2O_7$ | Same as Example 1' | Same as Example 1' |
| Example 30' | Same as Example 1' | $Li_2CuP_2O_7$ | Same as Example 1' | Same as Example 1' |
| Example 31' | Same as Example 1' | $Li_2ZnP_2O_7$ | Same as Example 1' | Same as Example 1' |
| Example 32' | Same as Example 1' | $TiP_2O_7$ | Same as Example 1' | Same as Example 1' |
| Example 33' | Same as Example 1' | $Ag_4P_2O_7$ | Same as Example 1' | Same as Example 1' |
| Example 34' | Same as Example 1' | $ZrP_2O_7$ | Same as Example 1' | Same as Example 1' |
| Example 35' | Same as Example 1' | Same as Example 1' | $Cu_3(PO_4)_2$ | Same as Example 1' |
| Example 36' | Same as Example 1' | Same as Example 1' | $Zn_3(PO_4)_2$ | Same as Example 1' |
| Example 37' | Same as Example 1' | Same as Example 1' | $Ti_3(PO_4)_4$ | Same as Example 1' |
| Example 38' | Same as Example 1' | Same as Example 1' | $Ag_3PO_4$ | Same as Example 1' |
| Example 39' | Same as Example 1' | Same as Example 1' | $Zr_3(PO_4)_4$ | Same as Example 1' |
| Example 40' | Same as Example 1' | Same as Example 1' | $AlPO_4$ | Same as Example 1' |

TABLE 16

Dispersants and infiltrant used in Example 1' and Comparative Example 21'.

| Example number | Dispersant Type | M1 | M2 | M3 | Weight average molar mass (million) | X1 | Infiltrant Type | X2 | X1/X2 |
|---|---|---|---|---|---|---|---|---|---|
| Comparative Example 21' | NBR | 0.4 | 0.5 | 0.1 | 20 | 0.2% | Same as Example 1' | Same as Example 1' | Same as Example 1' |
| Example 1' | HNBR | 0.4 | 0.599 | 0.001 | 20 | 0.2% | Maleic anhydride-styrene copolymer (molar mass of 5000) | 0.005 | 0.4 |

The types of dispersants and infiltrants, the weight average molar mass and the monomer content of the dispersants (M1, M2, and M3), and the mass percentages X1, X2, and X1/X2 were the same as in Example 1'.

No infiltrants and dispersants were used in Comparative Examples 1' to 18'.

A dispersant was used but no infiltrant was used in Comparative Example 19', the type of the dispersant, the weight average molar mass, monomer content (M1, M2, M3), and the mass percentage content X1 of the dispersant were the same as in Example 1'.

An infiltrant was used but no dispersant was used in Comparative Example 20', and both the type and the mass percent X2 of the infiltrant were the same as in Example 1'.

TABLE 17

Slurry performance and cell performance for Examples 1'-40', Example 28", Example 29", and Comparative Examples 1'-21'.

| Number | Cathode Slurry Performance Flowability | Viscosity mPa·s | Filterability | Battery Performance DCR (w.r.t. Example 1') | 45° C. cycle number |
|---|---|---|---|---|---|
| Comparative Example 1' | Unqualified | 12000 | Unqualified | 140% | 187 |
| Comparative Example 2' | Unqualified | 10300 | Unqualified | 128% | 253 |
| Comparative Example 3' | Unqualified | 11000 | Unqualified | 135% | 387 |
| Comparative Example 4' | Unqualified | 10000 | Unqualified | 125% | 541 |
| Comparative Example 5' | Unqualified | 12300 | Unqualified | 121% | 669 |
| Comparative Example 6' | Unqualified | 12500 | Unqualified | 120% | 677 |
| Comparative Example 7' | Unqualified | 12000 | Unqualified | 119% | 670 |
| Comparative Example 8' | Unqualified | 12600 | Unqualified | 119% | 653 |
| Comparative Example 9' | Unqualified | 11000 | Unqualified | 118% | 662 |
| Comparative Example 10' | Unqualified | 11300 | Unqualified | 110% | 680 |
| Comparative Example 11' | Unqualified | 11200 | Unqualified | 107% | 985 |
| Comparative Example 12' | Unqualified | 11100 | Unqualified | 107% | 800 |
| Comparative Example 13' | Unqualified | 11100 | Unqualified | 134% | 567 |
| Comparative Example 14' | Unqualified | 9500 | Unqualified | 121% | 636 |
| Comparative Example 15' | Unqualified | 12000 | Unqualified | 115% | 1124 |
| Comparative Example 16' | Unqualified | 21000 | Unqualified | 116% | 1022 |
| Comparative Example 17' | Unqualified | 10000 | Unqualified | 116% | 900 |
| Comparative Example 18' | Unqualified | 10500 | Unqualified | 115% | 1102 |
| Comparative Example 19' | Unqualified | 11400 | Qualified | 116% | 1047 |
| Comparative Example 20' | Qualified | 8700 | Unqualified | 114% | 1139 |
| Comparative Example 21' | Qualified | 9800 | Qualified | 116% | 568 |
| Example 1' | Qualified | 7500 | Qualified | 100% | 1439 |
| Example 2' | Qualified | 8000 | Qualified | 100% | 1455 |
| Example 3' | Qualified | 8400 | Qualified | 100% | 1574 |
| Example 4' | Qualified | 8250 | Qualified | 100% | 1578 |
| Example 5' | Qualified | 7650 | Qualified | 100% | 1659 |
| Example 6' | Qualified | 7950 | Qualified | 101% | 1690 |
| Example 7' | Qualified | 8100 | Qualified | 103% | 1753 |
| Example 8' | Qualified | 8000 | Qualified | 102% | 1200 |
| Example 9' | Qualified | 7800 | Qualified | 96% | 1434 |
| Example 10' | Qualified | 9500 | Qualified | 93% | 1632 |
| Example 11' | Qualified | 10800 | Qualified | 97% | 1122 |
| Example 12' | Qualified | 11000 | Qualified | 94% | 1302 |
| Example 13' | Qualified | 10000 | Qualified | 93% | 1428 |
| Example 14' | Qualified | 10000 | Qualified | 92% | 1520 |
| Example 15' | Qualified | 12000 | Qualified | 95% | 1253 |
| Example 16' | Qualified | 10000 | Qualified | 96% | 1199 |
| Example 17' | Qualified | 9000 | Qualified | 93% | 1426 |
| Example 18' | Qualified | 9300 | Qualified | 92% | 1520 |
| Example 19' | Qualified | 8200 | Qualified | 92% | 1497 |
| Example 20' | Qualified | 8000 | Qualified | 93% | 1585 |
| Example 21' | Qualified | 10500 | Qualified | 92% | 1512 |
| Example 22' | Qualified | 8050 | Qualified | 98% | 1633 |
| Example 23' | Qualified | 8000 | Qualified | 92% | 1748 |

TABLE 17-continued

Slurry performance and cell performance for Examples 1'-40', Example 28'', Example 29'', and Comparative Examples 1'-21'.

| | Cathode Slurry Performance | | | Battery Performance | |
|---|---|---|---|---|---|
| | | | | DCR | |
| Number | Flowability | Viscosity mPa·s | Filterability | (w.r.t. Example 1') | 45° C. cycle number |
| Example 24' | Qualified | 9000 | Qualified | 92% | 1622 |
| Example 25' | Qualified | 9500 | Qualified | 90% | 1743 |
| Example 26' | Qualified | 10000 | Qualified | 96% | 1200 |
| Example 27' | Qualified | 7800 | Qualified | 95% | 1320 |
| Example 28' | Qualified | 10000 | Qualified | 129% | 1276 |
| Example 29' | Qualified | 9300 | Qualified | 103% | 1190 |
| Example 28'' | Qualified | 9800 | Qualified | 102% | 1394 |
| Example 29'' | Qualified | 8900 | Qualified | 100% | 1247 |
| Example 30' | Qualified | 7900 | Qualified | 102% | 1245 |
| Example 31' | Qualified | 10500 | Qualified | 101% | 1097 |
| Example 32' | Qualified | 11000 | Qualified | 99% | 1105 |
| Example 33' | Qualified | 11000 | Qualified | 99% | 1202 |
| Example 34' | Qualified | 12000 | Qualified | 98% | 1194 |
| Example 35' | Qualified | 10800 | Qualified | 103% | 1255 |
| Example 36' | Qualified | 10900 | Qualified | 104% | 1154 |
| Example 37' | Qualified | 11000 | Qualified | 101% | 1145 |
| Example 38' | Qualified | 11000 | Qualified | 98% | 1094 |
| Example 39' | Qualified | 13000 | Qualified | 99% | 1095 |
| Example 40' | Qualified | 12100 | Qualified | 98% | 1296 |

As can be seen from the above table, the processability of the slurries without both dispersant and infiltrant, or with only an infiltrant but without a dispersant, was poor and affected the battery performance. The use of dispersant and infiltrant, especially hydrogenated nitrile butadiene rubber and maleic anhydride-styrene copolymer as the dispersant and the infiltrant, respectively, can lead to significant improvements in the processability and/or battery performance of the slurries.

Based on the hydrogenated nitrile butadiene rubber used in Example 1', the content of each monomer was adjusted to obtain hydrogenated nitrile butadiene rubber with different hydrogenation degrees and used as a dispersant for the preparation of cathode slurries, as shown in Examples 3-1 to 3-7. The weight average molar mass of HNBR, the type of infiltrant, the mass percentages X1 and X2, and XT/X2 were the same as those in Example 1'.

TABLE 18

Dispersant parameters, slurry performance and battery performance for Examples 3-1 to 3-7.

| | Dispersant | | | | | Cathode Slurry Performance | | | Battery Performance | |
|---|---|---|---|---|---|---|---|---|---|---|
| | | | | | | | Viscosity | | DCR (w.r.t. | 45° C. cycle |
| Number | Type | M1 | M2 | M3 | M3/(M2 + M3) | Flowability | mPa·s | Filterability | Example 1') | number |
| Example 1' | HNBR | 0.4 | 0.599 | 0.001 | 0.0017 | Qualified | 7500 | Qualified | 100% | 1439 |
| Example 3-1 | HNBR | 0.45 | 0.55 | 0 | 0 | Qualified | 11000 | Qualified | 101% | 1456 |
| Example 3-2 | HNBR | 0.45 | 0.54725 | 0.00275 | 0.005 | Qualified | 10600 | Qualified | 97% | 1459 |
| Example 3-3 | HNBR | 0.45 | 0.5445 | 0.0055 | 0.01 | Qualified | 10000 | Qualified | 99% | 1470 |
| Example 3-4 | HNBR | 0.45 | 0.539 | 0.011 | 0.02 | Qualified | 9800 | Qualified | 103% | 1498 |
| Example 3-5 | HNBR | 0.45 | 0.5335 | 0.0165 | 0.03 | Qualified | 11800 | Qualified | 103% | 1404 |
| Example 3-6 | HNBR | 0.45 | 0.5225 | 0.0275 | 0.05 | Qualified | 11500 | Qualified | 106% | 1432 |
| Example 3-7 | HNBR | 0.45 | 0.506 | 0.044 | 0.08 | Qualified | 10000 | Qualified | 205% | 423 |

As shown in Table 18, the HNBR used in Example 3-7 had a lower hydrogenation degree compared to the other examples, resulting in poorer battery performance despite the lower viscosity of the cathode slurry.

On the basis of Example 1', the proportional relationship between the content of dispersant and infiltrant was adjusted to prepare cathode slurries, as shown in Examples 4-1 to 4-10. The parameters of dispersant and infiltrant were the same as Example 1 except that the mass percentages of X % and X2, and XT/X2 were different from Example 1'.

TABLE 19

Ratio of dispersant to infiltrant, slurry performance and battery performance for Examples 4-1 to 4-10.

| Number | Dispersant X1 (%) | Infiltrant X2 (%) | X1/X2 | Cathode slurry Performance | | | Battery Performance | |
|---|---|---|---|---|---|---|---|---|
| | | | | Flowability | Viscosity mPa·s | Filterability | DCR (w.r.t. Example 4-1) | 45° C. cycle number |
| Example 4-1 | 0.05 | 0.5 | 0.10 | Qualified | 11800 | Qualified | 1 | 1402 |
| Example 4-2 | 0.1 | 0.5 | 0.20 | Qualified | 10000 | Qualified | 1.05 | 1400 |
| Example 4-3 | 0.5 | 0.5 | 1.00 | Qualified | 12500 | Qualified | 1.1 | 1390 |
| Example 4-4 | 1 | 0.5 | 2.00 | Qualified | 7100 | Qualified | 1.13 | 1390 |
| Example 4-5 | 0.25 | 0.05 | 5.00 | Unqualified | 36000 | Qualified | 1.07 | 1189 |
| Example 4-6 | 0.25 | 0.2 | 1.25 | Unqualified | 44000 | Qualified | 1 | 1201 |
| Example 4-7 | 0.25 | 0.3 | 0.83 | Qualified | 10200 | Qualified | 0.95 | 1073 |
| Example 4-8 | 0.25 | 0.8 | 0.31 | Qualified | 13000 | Qualified | 1.12 | 1290 |
| Example 4-9 | 0.25 | 2 | 0.13 | Qualified | 5000 | Qualified | 1.08 | 1230 |
| Example 4-10 | 0.05 | 2 | 0.03 | Unqualified | 32500 | Unqualified | 1.23 | 672 |

As shown in Table 19, compared to other Examples, the XT/X2 of Examples 4-10 were too small and the slurry performance and battery performance were poor.

On the basis of Example 1', the type of infiltrant was changed and the cathode slurries were prepared as shown in Examples 5-1 to 5-6.

TABLE 20

Types of infiltrant, slurry performance and battery performance of Examples 5-1 to 5-6.

| | Infiltrant | | | Cathode slurry Performance | | | Battery Performance | |
|---|---|---|---|---|---|---|---|---|
| | Type | X2 | X1/X2 | Flowability | Viscosity mPa·s | Filterability | DCR (w.r.t. Example 51) | 45° C. cycle number |
| Example 5-1 | No infiltrant added | / | | Unqualified | 40000 | Unqualified | 100% | 1332 |
| Example 5-2 | PVP (polyvinylpyrrolidone) | 0.005 | 0.4 | Qualified | 16000 | Qualified | 110% | 1340 |
| Example 5-3 | Isopropanolamine | 0.01 | 0.2 | Qualified | 11100 | Qualified | 105% | 1400 |
| Example 5-4 | 2-Amino-2methyl-1-propanol | 0.01 | 0.2 | Qualified | 9800 | Qualified | 104% | 1453 |

TABLE 20-continued

Types of infiltrant, slurry performance and battery performance of Examples 5-1 to 5-6.

| | Infiltrant | | | Cathode slurry Performance | | | Battery Performance | |
| --- | --- | --- | --- | --- | --- | --- | --- | --- |
| | | | | | Viscosity | | DCR (w.r.t. Example 51) | 45° C. cycle number |
| | Type | X2 | X1/X2 | Flowability | mPa·s | Filterability | | |
| Example 5-5 | Styrene-maleic anhydride copolymer | 0.005 | 0.4 | Qualified | 7900 | Qualified | 108% | 1411 |
| Example 5-6 | Styrene-maleic anhydride copolymer | 0.003 | 0.67 | Qualified | 8100 | Qualified | 93% | 1530 |

As shown in the table above, HNBR was compounded with PVP, isopropanolamine, 2-amino-2methyl-1-propanol, or styrene-maleic anhydride copolymer, respectively, to obtain a good processability of the slurries and/or battery performance.

It should be noted that the present application is not limited to the above-mentioned embodiments. The above-mentioned embodiments are merely exemplary examples, and embodiments that have substantially the same configuration as the technical idea and exert the same effects within the scope of the technical proposals of the present application are included in the technical scope of the present application. In addition, without departing from the scope of the present application, various modifications added to the embodiments that are conceivable by those skilled in the art, and other forms constructed by combining some components in the embodiments are also included in the scope of the present application.

What is claimed is:

1. A cathode active material composition comprising a cathode active material and a dispersant, wherein,
   the cathode active material comprises a core and a shell coating the core,
   the core has a chemical formula of $Li_{1+x}Mn_{1-y}A_yP_{1-z}R_zO_4$, wherein x is any value in a range of $-0.100$-$0.100$, y is any value in a range of $0.001$-$0.500$, and z is any value in a range of $0.001$-$0.100$; the A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg; the R is one or more elements selected from B, Si, N, and S, optionally the R is one element of B, Si, N, and S; values of x, y, and z satisfy a condition that: an entire core is electrically neutral; and
   the shell comprises a first coating layer coating the core, a second coating layer coating the first coating layer, and a third coating layer coating the second coating layer, wherein,
   the first coating layer comprises a crystalline pyrophosphate $MP_2O_7$ and/or $M_b(P_2O_7)_c$, wherein $0 \leq a \leq 2$, $1 \leq b \leq 4$, $1 \leq c \leq 6$, and values of a, b, and c satisfy a condition that the crystalline pyrophosphate $MP_2O_7$ or $M_b(P_2O_7)_c$ is electrically neutral; the M in the crystalline pyrophosphate $MP_2O_7$ and $M_b(P_2O_7)_c$ is respectively independently one or more elements selected from Fe, Ni, Mg, Co, Cu, Zn, Ti, Ag, Zr, Nb, or Al;
   the second coating comprises a crystalline phosphate $XPO_4$, wherein the X is one or more elements selected from Li, Fe, Ni, Mg, Co, Cu, Zn, Ti, Ag, Zr, Nb, or Al; and
   the third coating layer is carbon;
   the dispersant comprises a polymer, the polymer comprising:
   a first monomeric unit represented by Formula 1;
   a second monomeric unit, being at least one selected from the group consisting of a monomeric unit represented by Formula 2 and a monomeric unit represented by Formula 3; and
   a third monomeric unit, being at least one selected from the group consisting of a monomeric unit represented by Formula 4 and a monomeric unit represented by Formula 5;

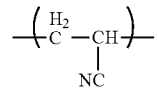

Formula 1

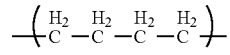

Formula 2

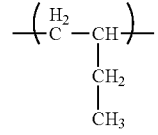

Formula 3

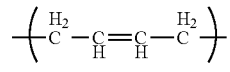

Formula 4

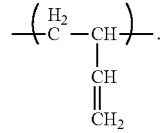

Formula 5

2. The cathode active material composition according to claim 1,
   wherein with respect to a total mass of the polymer, the first monomeric unit has a mass percentage content of M1, M1 being 10%-55%;
   the second monomeric unit has a mass percentage content of M2, M2 being 40%-80%; and/or the third monomeric unit has a mass percentage content of M3, M3 being 0%-10%.

3. The cathode active material composition according to claim 2, wherein M3/(M2+M3) is 0%-5%.

4. The cathode active material composition according to claim 1, wherein,
the polymer is hydrogenated nitrile butadiene rubber;
the polymer has a weight average molar mass of 50,000-500,000; and/or
with respect to a total mass of the cathode active material, the dispersant has a mass percentage content of X1, with X1 being 0.05%-1%.

5. The cathode active material composition according to claim 1, wherein the cathode active material composition further comprises an infiltrant, the infiltrant has a surface tension of 20 mN/m-40 mN/m, and a molecular structure of the infiltrant comprises at least one of following functional groups: —CN, —NH$_2$, —NH—, —N—, —OH, —C=O, —COO—, and —C(=O)—O—C(=O)—.

6. The cathode active material composition according to claim 5, wherein,
the infiltrant comprises one or more selected from an alcohol amine compound, an alcohol compound, a nitrile compound, a maleic anhydride-styrene copolymer, polyvinylpyrrolidone, and polysiloxane.

7. The cathode active material composition according to claim 5, wherein with respect to a total mass of the cathode active material, the infiltrant has a mass percentage content of X2, with X2 being 0.05%-2%.

8. The cathode active material composition according to claim 5, wherein X1/X2 is 0.05-20.

9. The cathode active material composition according to claim 1, wherein the crystalline pyrophosphate in the first coating layer has a crystal plane spacing of 0.293-0.470 nm and an angle of 18.00°-32.00° in a crystal direction (111); and the crystalline phosphate of the second coating layer has a crystal plane spacing of 0.244-0.425 nm and an angle of 20.00°-37.00° in a crystal direction (111).

10. The cathode active material composition according to claim 1, wherein a ratio of y to 1−y in the core is 1:10 to 10:1.

11. The cathode active material composition according to claim 1, wherein a ratio of z to 1−z in the core is 1:9 to 1:999.

12. The cathode active material composition according to claim 1, wherein the carbon of the third coating layer is a mixture of SP2 form carbon and SP3 form carbon.

13. The cathode active material composition according to claim 1, wherein the first coating layer has a coating amount greater than 0 and less than or equal to 6 wt %;
the second coating layer has a coating amount greater than 0 and less than or equal to 6 wt %; and/or
the third coating layer has a coating amount greater than 0 and less than or equal to 6 wt %.

14. The cathode active material composition according to claim 1, wherein,
the first coating layer has a thickness of 1-10 nm;
the second coating layer has a thickness of 2-15 nm; and/or
the third coating layer has a thickness of 2-25 nm.

15. The cathode active material composition according to claim 1, wherein with respect to a weight of the cathode active material, a content of manganese element is in a range of 10 wt %-35 wt %.

16. The cathode active material composition according to claim 1, wherein the cathode active material having a core-shell structure has a lattice change rate of less than 4%.

17. The cathode active material composition according to claim 1, wherein the cathode active material having a core-shell structure has a Li/Mn-antisite-defect concentration of 4% or less.

18. The cathode active material composition according to claim 1, wherein the cathode active material having a core-shell structure has a compaction density at 3 T of 2.2 g/cm$^3$ or more.

19. The cathode active material composition according to claim 1, wherein the cathode active material having a core-shell structure has a surface oxygen valence state of −1.90 or less.

20. A secondary battery, comprising a cathode plate wherein a cathode current collector and a cathode film layer disposed on at least one surface of the cathode current collector, wherein the cathode film layer comprises the cathode active material composition according to claim 1.

* * * * *